United States Patent
Norimatsu et al.

(10) Patent No.: US 7,243,061 B2
(45) Date of Patent: Jul. 10, 2007

(54) MULTISTAGE INVERSE QUANTIZATION HAVING A PLURALITY OF FREQUENCY BANDS

(75) Inventors: Takeshi Norimatsu, Kobe (JP); Shuji Miyasaka, Neyagawa (JP); Yoshihisa Nakatoh, Katano (JP); Mineo Tsushima, Katano (JP); Tomokazu Ishikawa, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 333 days.

(21) Appl. No.: 10/954,589

(22) Filed: Oct. 1, 2004

(65) Prior Publication Data

US 2005/0060147 A1    Mar. 17, 2005

Related U.S. Application Data

(63) Continuation of application No. 09/277,189, filed on Mar. 26, 1999, which is a continuation-in-part of application No. 09/171,266, filed on Oct. 16, 1998.

(30) Foreign Application Priority Data

| Jul. 1, 1996 | (JP) | ................... | 8-171296 |
| Apr. 10, 1997 | (JP) | ................... | 9-092406 |
| May 15, 1997 | (JP) | ................... | 9-125844 |
| Mar. 13, 1998 | (JP) | ................... | 10-62413 |

(51) Int. Cl.
*G10L 19/02* (2006.01)
(52) U.S. Cl. ...................... 704/205; 704/230
(58) Field of Classification Search ................. None
See application file for complete search history.

(56) References Cited

U.S. PATENT DOCUMENTS 5,398,069 A    3/1995    Huang et al.

(Continued)

FOREIGN PATENT DOCUMENTS

EP    0673014    9/1995

(Continued)

OTHER PUBLICATIONS

Multiple-Stage Vector Excitation Coding of Speech Waveforms, Grant Davidson and Allen Gersho, Department of Electrical and Computer Engineering, University of California, Santa Barbara, CA 93106, CH2561-9/88/0000-0163, 1988 IEEE pp. 163-166.

(Continued)

*Primary Examiner*—David D. Knepper
(74) *Attorney, Agent, or Firm*—Wenderoth, Lind & Ponack, L.L.P.

(57) ABSTRACT

With respect to audio signal coding and decoding apparatuses, there is provided a coding apparatus that enables a decoding apparatus to reproduce an audio signal even through it does not use all of data from the coding apparatus, and a decoding apparatus corresponding to the coding apparatus. A quantization unit constituting a coding apparatus includes a first sub-quantization unit comprising sub-quantization units for low-band, intermediate-band, and high-band; a second sub-quantization unit for quantizing quantization errors from the first sub-quantization unit; and a third sub-quantization unit for quantizing quantization errors which have been processed by the first sub-quantization unit and the second sub-quantization unit.

3 Claims, 41 Drawing Sheets

U.S. PATENT DOCUMENTS

| | | | |
|---|---|---|---|
| 5,666,465 | A | 9/1997 | Ozawa |
| 5,717,821 | A | 2/1998 | Tsutsui et al. |
| 5,778,335 | A | 7/1998 | Ubale et al. |
| 5,809,459 | A | 9/1998 | Bergstrom et al. |
| 5,819,212 | A | 10/1998 | Matsumoto et al. |
| 5,822,722 | A | 10/1998 | Ozawa |
| 5,864,794 | A | 1/1999 | Tasaki |
| 5,966,688 | A | 10/1999 | Nandkumar et al. |
| 6,122,338 | A | 9/2000 | Yamauchi |
| 2006/0195314 | A1* | 8/2006 | Taleb et al. .............. 704/200.1 |

FOREIGN PATENT DOCUMENTS

| | | |
|---|---|---|
| EP | 0709827 | 5/1996 |
| EP | 0 780 831 | 4/2002 |
| JP | 03-228433 | 10/1991 |
| JP | 04-171500 | 6/1992 |
| JP | 05-165499 | 7/1993 |
| JP | 5-257498 | 10/1993 |
| JP | 06-077840 | 3/1994 |
| JP | 6-118998 | 4/1994 |
| JP | 06-169449 | 6/1994 |
| JP | 6-291674 | 10/1994 |
| JP | 7-64599 | 3/1995 |
| JP | 8-137498 | 5/1996 |
| JP | 9-194497 | 7/1996 |
| JP | 09-034499 | 2/1997 |
| JP | 09-127987 | 5/1997 |
| JP | 09-130260 | 5/1997 |
| JP | 09-281995 | 10/1997 |
| JP | 10-020898 | 1/1998 |
| WO | 97/15983 | 5/1997 |

OTHER PUBLICATIONS

P.C. Loizoi et al. "Vector Quantization of Principal Spectral Components for Speech Coding at 4800 BPS", Conference Record. Twenty-Fourth Asilomar Conference on Signals, Systems and Computers, 1990, Maple Press, San Jose, CA, vol. 2, pp. 654-658.

G. Davidson et al., "Multiple-Stage Vector Excitation Coding of Speech Waveforms", International Conference on Acoustics, Speech & Signal Processing, ICASSP, US, New York, IEEE, vol. CONF. 13, 1988, pp. 163-166.

M. Iwadare et al., "A 128 kb/s Hi-Fi Audio CODEC Based on Adaptive Transform Coding with Adaptive Block Size MDCT", IEEE Journal on Selected Areas in Communications, US, IEEE Inc., New York, vol. 10, No. 1, Jan. 1, 1992, pp. 138-144.

D.H. Lee et al., "Cell-Conditioned Multistage Vector Quantization", International Conference on Acoustics, Speech & Signal Processing, ICASSP, US, New York, IEEE, vol. CONF. 16, 1991, pp. 653-656.

A. Moreno et al., "Envelope and Instantaneous Phase in Residual Representation", Proceedings of the European Signal Processing Conference (EUSIPCO), NL, Amsterdam, North Holland, vol. CONF. 4, 1988, pp. 167-170.

O. Gautherot et al., "LPC Residual Phase Investigation", Proceedings of the European Conference on Speech Communication and Technology (EUROSPEECH), GB, Edinburgh, CEP Consultants, vol. CONF. 1, 1989, pp. 35-38.

Allen Gersho and Robert M. Gray, "Vector Quantization and Signal Compression", pp. 427-459.

* cited by examiner

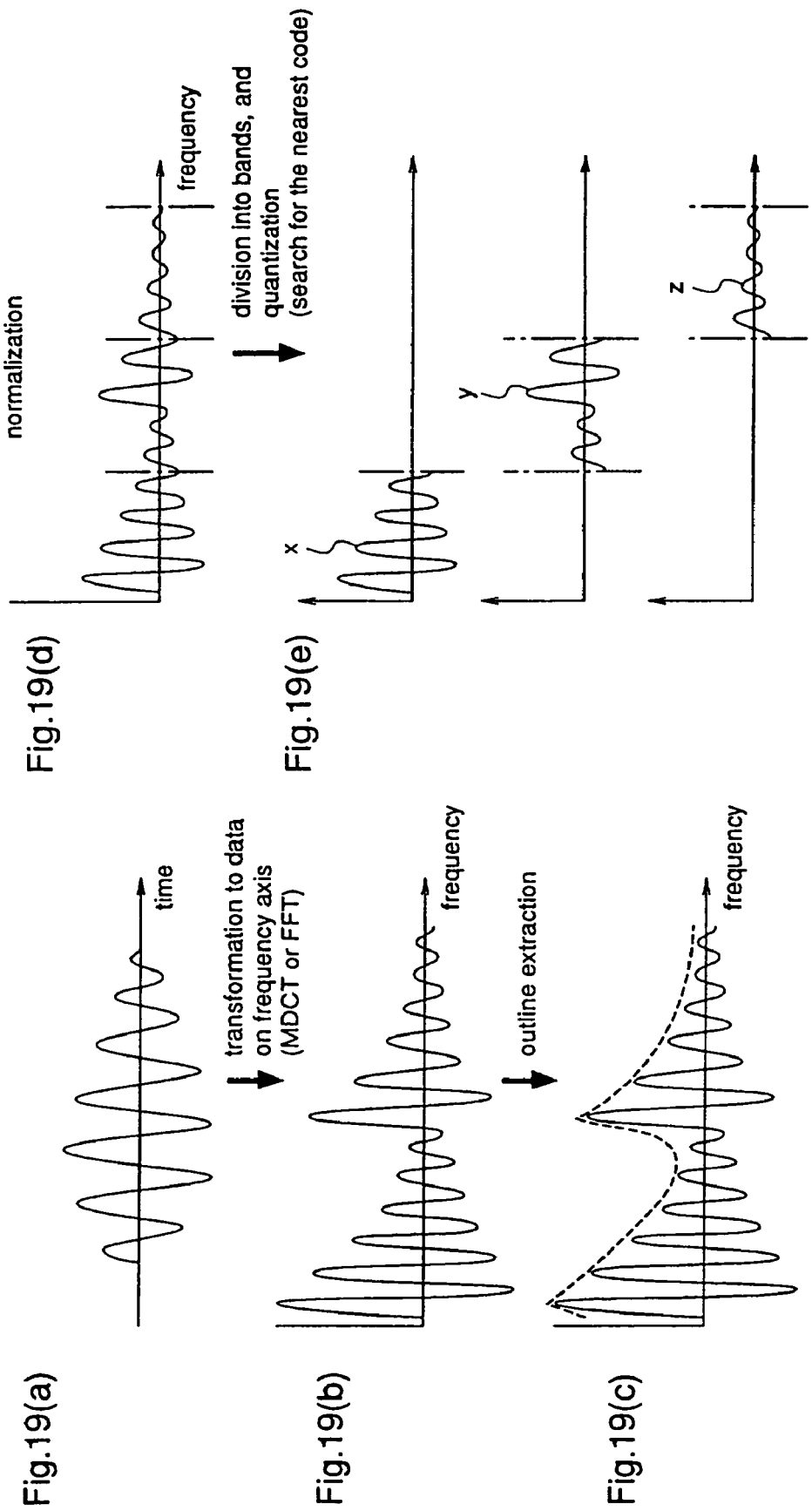

quantized output = A ( x + y + z )

quantized output = $\alpha x + \beta y + \gamma z$ quantized output = $\alpha x + \beta y + \gamma z$ Elements of each sub-vector are arranged in low→high order of frequency.
NS and quantized bit number are decided on the basis of a required compression ratio.

Fig. 29(a)
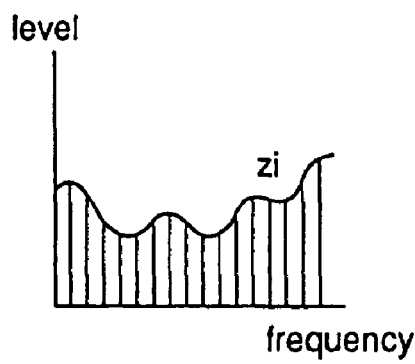
Fig. 29(b)
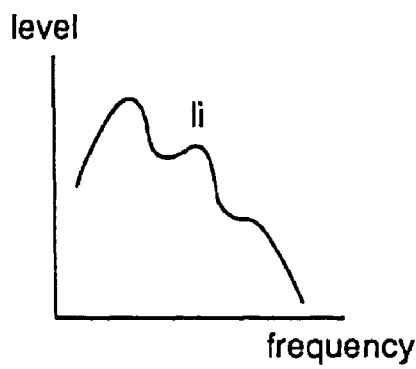
Fig. 29(c)
minimum audible limit characteristics
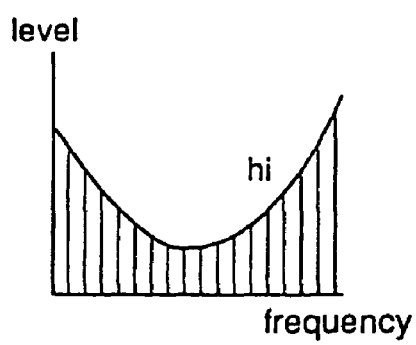
area is inaudible for human beings.

A selection scale of each window section, and a window section showing a maximum selection scale are selected.

| element A | element B |
|---|---|
| positive | positive |
| positive | negative |
| negative | positive |
| negative | negative |

…

MULTISTAGE INVERSE QUANTIZATION HAVING A PLURALITY OF FREQUENCY BANDS

This is a Continuation application of Ser. No. 09/277,189, filed Mar. 26, 1999, which is a Continuation In Part (CIP) application of Ser. No. 09/171,266, filed Oct. 16, 1998, the disclosures of both applications are herein incorporated by reference.

TECHNICAL FIELD

The present invention relates to an audio signal coding apparatus for coding an audio signal, such as a voice signal or a music signal and, more particularly, to an apparatus for transforming an audio signal from time-domain to frequency-domain using a method like orthogonal transformation, and efficiently coding the transformed signal so that it is expressed with less code streams as compared with the original audio signal, and to a decoding apparatus having a structure capable of decoding a high-quality and broad-band audio signal using all or only a portion of the coded streams which are coded signals. Furthermore, the invention relates to an audio signal coding and decoding method.

BACKGROUND ART

Various methods for efficiently coding and decoding audio signals have been proposed. Especially for an audio signal having a frequency band exceeding 20 kHz such as a music signal, an MPEG audio method has been proposed in recent years. In the coding method represented by the MPEG method, a digital audio signal on the time axis is transformed to data on the frequency axis using orthogonal transform such as cosine transform, and data on the frequency axis are coded from auditively important one by using the auditive sensitivity characteristic of human beings, whereas auditively unimportant data and redundant data are not coded. In order to express an audio signal with a data quantity considerably smaller than the data quantity of the original digital signal, there is a coding method using a vector quantization method, such as TC-WVQ. The MPEG audio and the TC-WVQ are described in "ISO/IEC standard IS-11172-3" and "T. Moriya, H. Suga: An 8 Kbits transform coder for noisy channels, Proc. ICASSP 89, pp. 196-199", respectively. Hereinafter, the structure of a conventional audio coding apparatus will be explained using FIG. 24. In FIG. 24, reference numeral 1601 denotes an FFT unit which frequency-transforms an input signal; 1602 denotes an adaptive bit allocation calculating unit which performs calculation of adaptive bit allocation by calculating a minimum audible limit and masking characteristic so that a specific band of the frequency-transformed input signal is coded; 1603 denotes a sub-band division unit which divides the input signal into plural bands; 1604 denotes a scale factor normalization unit which normalizes each component of the band divided in plural, using a scale factor; and 1605 denotes a scalar quantization unit which performs scalar quantization of the normalized output from the scale factor normalization unit 1604, according to the bit allocation from the adaptive bit allocation calculating unit 1602.

A description is given of the operation. An input signal is input to the FFT unit 1601 and the sub-band division unit 1603. In the FFT unit 1601, the input signal is subjected to frequency conversion, and the output is input to the adaptive bit allocation unit 1602. In the adaptive bit allocation unit 1602, how much data quantity is to be given to a specific band component is calculated on the basis of the minimum audible limit, which is defined according to the auditive characteristic of human beings, and the masking characteristic, and the data quantity allocation for each band is coded as an index.

On the other hand, in the sub-band division unit 1603, the input signal is divided into, for example, 32 bands, to be output. In the scale factor normalization unit 1604, for each band component obtained in the sub-band division unit 1603, normalization is carried out with a representative value. The normalized value is quantized as an index. In the scalar quantization unit 1605, on the basis of the bit allocation calculated by the adaptive bit allocation calculating unit 1602, the output from the scale factor normalization unit 1604 is scalar-quantized, and the quantized value is coded as an index IND2.

Meanwhile, various methods of efficiently coding an acoustic signal have been proposed. Especially in recent years, a signal having a frequency band of about 20 kHz, such as a music signal, is coded using the MPEG audio method or the like. In the methods represented by the MPEG method, a digital audio signal on the time axis is transformed to the frequency axis using an orthogonal transform, and data on the frequency axis are given data quantities, which a priority to auditively important one, while considering the auditive sensitivity characteristic of human beings. In order to express a signal having a data quantity considerably smaller than the data quantity of the original digital signal, employed is a coding method using a vector quantization method, such as TCWVQ (Transform Coding for Weighted Vector Quantization). The MPEG audio and the TCWVQ are described in "ISO/IEC Standard IS-11172-3" and "T. Moriya, H. Suga: An 8 Kbits Transform Coder for Noisy Channels, Proc. ICASSP 89, pages 196-199", respectively.

In the conventional audio signal coding apparatus constructed as described above, it is general that the MPEG audio method is used so that coding is carried out with a data quantity of 64000 bits/sec for each channel. With a data quantity smaller than this, the reproducible frequency band width and the subjective quality of decoded audio signal are sometimes degraded considerably. The reason is as follows. As in the example shown in FIG. 24, the coded data are divided into three main parts, i.e., the bit allocation obtained by the adaptive bit allocation unit 1602, the band representative value obtained by the scale factor normalization unit 1604, and the quantized value obtained by the scalar quantization unit 1605. So, when the compression ratio is high, a sufficient data quantity is not allocated to the quantized value. Further, in the conventional audio signal coding apparatus, it is general that a coder and a decoder are constructed with the data quantity to be coded and the data quantity to be decoded being equal to each other. For example, in a method where a data quantity of 128000 bits/sec is coded, a data quantity of 128000 bits is decoded in the decoder.

However, in the conventional audio signal coding and decoding apparatuses, coding and decoding must be carried out with a fixed data quantity to obtain a satisfactory sound quality and, therefore, it is impossible to obtain a high-quality sound at a high compression ratio.

The present invention is made to solve the above-mentioned problems and has for its object to provide audio signal coding and decoding apparatuses and an audio signal coding and decoding method, in which a high quality and a broad reproduction frequency band are obtained even when coding and decoding are carried out with a small data quantity and, further, the data quantity in the coding and decoding can be variable, not fixed.

Furthermore, in the conventional audio signal coding apparatus, quantization is carried out by outputting a code index corresponding to a code that provides a minimum auditive distance between each code possessed by a code block and an audio feature vector. However, when the number of codes possessed by the code book is large, the calculation amount significantly increases when retrieving an optimum code. Further, when the data quantity possessed by the code book is large, a large quantity of memory is required when the coding apparatus is constructed by hardware, and this uneconomical. Further, on the receiving end, retrieval and memory quantity corresponding to the code indices are required.

The present invention is made to solve the above-mentioned problems and has for its object to provide an audio signal coding apparatus that reduces the number of times of code retrieval, and efficiently quantizes an audio signal with a code book having less number of codes, and an audio signal decoding apparatus that can decode the audio signal.

Furthermore, the present invention has for its object to provide audio signal coding and decoding apparatuses, and an audio signal coding and decoding method, that can significantly improve the quantization efficiency.

DISCLOSURE OF THE INVENTION

An audio signal coding method according to the present invention is a method for coding a data quantity by vector quantization using a multiple-stage quantization method comprising a first-stage vector quantization process for vector-quantizing a frequency characteristic signal sequence which is obtained by frequency transformation of an input audio signal, and second-and-onward-stages of vector quantization processes for vector-quantizing a quantization error component in the previous-stage vector quantization process: wherein, among the multiple stages of quantization processes according to the multiple-stage quantization method, at least one vector quantization process performs vector quantization using, as weighting coefficients for quantization, weighting coefficients on frequency, calculated on the basis of the spectrum of the input audio signal and the auditive sensitivity characteristic showing the auditive nature of human beings.

In order to solve the above-described problems, according to the invention, there is provided an audio signal coding apparatus for coding an audio signal by performing vector quantization to a frequency characteristic signal sequence which is obtained by subjecting an input audio signal to frequency transformation, and the apparatus comprises: multiple-stage quantization means comprising, at least, a first-stage vector quantizer for vector-quantizing the frequency characteristic signal sequence or a portion thereof, and a second-stage vector quantizer for vector-quantizing a quantization error component generated by the first-stage vector quantizer; and each quantization means in each stage of the multiple-stage quantization means having at least one divided vector quantizer which vector-quantizes a coefficient stream in any of plural frequency bands obtained by dividing the frequency characteristic signal sequence into, at least, two frequency bands which can have an overlapped portion between the plural stages, using a division manner for each stage.

The audio signal coding apparatus further comprises a normalization means for normalizing the frequency characteristic signal sequence, and adding its output to the multiple-stage quantization means.

In the audio signal coding apparatus, the quantization means in each stage appropriately selects, as a frequency band divided from the frequency characteristic signal sequence to be quantized, a band having a large energy-addition-sum of the quantization error, and quantizes the selected band.

The quantization means in each stage can be operable to select a frequency band, as a frequency band divided from the frequency characteristic signal sequence to be quantized, on the basis of the auditive sensitivity characteristic showing the auditive nature of human beings, and quantizes the selected band, which frequency band selected has a large energy-addition-sum of a quantization error weighted by giving a large value to a band having a high importance of the auditive sensitivity characteristic.

The audio signal coding apparatus can further comprise: a first quantization band selection unit between the first-stage vector quantizer and the second-stage vector quantizer which are constituents of the multiple-stage quantization means; and a second quantization band selection unit between the second-stage vector quantizer and the third-stage vector quantizer; wherein the first quantization band selection unit receives, as an input, the quantization error output from the first-stage vector quantizer, and selects a band to be quantized by the second-stage vector quantizer; and the second quantization band selection means receives, as an input, the quantization error output from the second-stage vector quantizer, and selects a band to be quantized by the third-stage vector quantizer.

The multiple-stage quantization means comprises: a plurality of i-th stage divided vector quantizers which quantize, independently, the respective coefficient streams in the respective frequency bands into which the frequency characteristic signal sequence is divided; and a j-th stage vector quantizer which serves as an entire-band quantizer for quantizing, once at least, all of the respective frequency bands of the input signal to be quantized.

In the multiple-stage quantization means, the previous-stage vector quantizer calculates a quantization error in vector quantization using a vector quantization method with a code book, and the subsequent-stage vector quantizer performs further vector quantization to the calculated quantization error.

In the multiple-stage quantization means, the previous-stage vector quantizer can be operable to calculate a quantization error in vector quantization using a vector quantization method with a code book, and the subsequent-stage vector quantizer performs further vector quantization to the calculated quantization error.

When calculating distances between codes used for retrieving an optimum code in the code book during vector quantization, the vector quantizer in the multiple-stage quantization means calculates the distances using, as weights, normalized components of the input signal output from the normalization means, and extracts a code having a minimum distance.

The vector quantizer in the multiple-stage quantization means can be operable to calculate the distances using, as weights, both of the normalized component of the frequency characteristic signal sequence output from the normalization means and a value in view of the auditive characteristic showing the auditive nature of human beings, and to extract a code having a minimum distance.

The normalization means can be provided with a frequency outline normalization unit which roughly normalizes the outline of the frequency characteristic signal sequence.

The normalization means can be provided with a band amplitude normalization unit which divides the frequency characteristic signal sequence into a plurality of components of continuous unit frequency bands, and normalizes the coefficient stream in each unit band by dividing it with a single value.

The multiple-stage quantization means can comprise: a vector quantizer which quantizes the respective coefficient streams of the respective frequency bands into which the frequency characteristic signal sequence is divided, independently by divided vector quantizers; and a vector quantizer which serves as an entire-band quantizer for quantizing, once at least, all of the respective frequency bands of the input signal to be quantized.

The multiple-stage quantization means can comprise: a first vector quantizer comprising a low-band divided vector quantizer, an intermediate-band divided vector quantizer, and a high-band divided vector quantizer; a second vector quantizer connected after the first vector quantizer; and a third vector quantizer connected after the second vector quantizer; wherein a frequency characteristic signal sequence input to the multiple-stage quantization means is divided into three bands, and the frequency characteristic signal sequence of low-band component among the three bands is quantized by the low-band divided vector quantizer, the frequency characteristic signal sequence of intermediate-band component among the three bands is quantized by the intermediate-band divided vector quantizer, and the frequency characteristic signal sequence of high-band component among the three bands is quantized by the high-band divided vector quantizer, independently; each of the divided vector quantizers constituting the first vector quantizer calculates a quantization error with respect to the frequency characteristic signal sequence, and outputs this error toward the subsequent second vector quantizer; the second vector quantizer performs quantization for a band width to be quantized by the second vector quantizer, calculates a quantization error with respect to the input to the second vector quantizer, and outputs this error toward the third vector quantizer; and the third vector quantizer performs quantization for a band width to be quantized by the third vector quantizer.

The audio signal coding apparatus defined can further comprises a first quantization band selection unit disposed between the first vector quantizer and the second vector quantizer which are constituents of the multiple-stage quantization means, and a second quantization band selection unit disposed between the second vector quantizer and the third vector quantizer; wherein the first quantization band selection unit receives, as an input, the output from the first vector quantizer, and selects a band to be quantized by the second vector quantizer; the second vector quantizer performs quantization for a band width to be quantized by the second vector quantizer, with respect to the quantization errors from the first vector quantizer comprising the three vector quantizers, in the band selected by the first quantization band selection unit, calculates a quantization error with respect to the input to the second vector quantizer, and outputs this error toward the second quantization band selection unit; the second quantization band selection unit receives, as an input, the quantization error from the second vector quantizer, and selects a band to be quantized by the third vector quantizer; and the third vector quantizer performs quantization for a band width to be quantized by the third vector quantizer, with respect to the quantization error from the second vector quantizer in the band selected by the second quantization band selection unit.

In place of the first vector quantizer, the second vector quantizer or the third vector quantizer can be constructed using the low-band divided vector quantizer, the intermediate-band divided vector quantizer, and the high-band divided vector quantizer.

According to the present invention, there is provided an audio signal decoding apparatus receiving, as an input, codes output from the audio signal coding apparatus, and decoding these codes to output a signal corresponding to the original input audio signal, and the decoding apparatus comprises: an inverse quantization unit for performing inverse quantization using at least a portion of the codes output from the quantization means of the audio signal coding apparatus; and an inverse frequency transformation unit for transforming a frequency characteristic signal sequence output from the inverse quantization unit to a signal corresponding to the original audio input signal.

The decoding apparatus can comprise: an inverse quantization unit for reproducing a frequency characteristic signal sequence; an inverse normalization unit for reproducing normalized components on the basis of the codes output from the audio signal coding apparatus, using the frequency characteristic signal sequence output from the inverse quantization unit, and multiplying the frequency characteristic signal sequence and the normalized components; and an inverse frequency transformation unit for receiving the output from the inverse normalization unit and transforming the frequency characteristic signal to a signal corresponding to the original audio signal.

The decoding apparatus can comprise: an inverse quantization unit which performs inverse quantization using the output codes whether the codes are output from all of the vector quantizers constituting the quantization means in the audio signal coding apparatus, or from some of them.

Subsequent to inverse quantization of quantized codes in a prescribed band in a specific stage, the inverse quantization unit can execute, alternately, inverse quantization of quantized codes in the prescribed band in a next stage, and inverse quantization of quantized codes in a band different from the prescribed band in the specific stage; when there are no quantized codes in the prescribed band in the next stage, the inverse quantization unit continuously executes inverse quantization of quantized codes in another different band; and when there are no quantized codes in the band different from the prescribed band, the inverse quantization unit continuously executes inverse quantization of quantized codes in a next stage.

The decoding apparatus can comprise: an inverse quantization unit which performs inverse quantization using only codes output from the low-band divided vector quantizer as a constituent of the first vector quantizer even though all or some of the three divided vector quantizers constituting the first vector quantizer in the audio signal coding apparatus output codes.

The inverse quantization unit can be operable to perform inverse quantization using codes output from the second vector quantizer, in addition to the codes output from the low-band divided vector quantizer as a constituent of the first vector quantizer.

The inverse quantization unit can be operable to perform inverse quantization using codes output from the intermediate-band divided vector quantizer as a constituent of the first vector quantizer, in addition to the codes output from the low-band divided vector quantizer as a constituent of the first vector quantizer and the codes output from the second vector quantizer.

The inverse quantization unit can be operable to perform inverse quantization using codes output from the third vector quantizer, in addition to the codes output from the low-band divided vector quantizer as a constituent of the first vector quantizer, the codes output from the second vector quantizer, and the codes output from the intermediate-band divided vector quantizer as a constituent of the first vector quantizer.

The inverse quantization unit can be operable to perform inverse quantization using codes output from the high-band divided vector quantizer as a constituent of the first vector quantizer, in addition to the codes output from the low-band divided vector quantizer as a constituent of the first vector quantizer, the codes output from the second vector quantizer, the codes output from the intermediate-band divided vector quantizer as a constituent of the first vector quantizer, and the codes output from the third vector quantizer.

According to the present invention, there is also provided an audio signal coding and decoding method receiving a frequency characteristic signal sequence obtained by frequency transformation of an input audio signal, coding and outputting this signal, and decoding the output coded signal to reproduce a signal corresponding to the original input audio signal, wherein: the frequency characteristic signal sequence is divided into coefficient streams corresponding to at least two frequency bands, and these coefficient streams are independently quantized and output; and from the quantized signal received, data of an arbitrary band corresponding to the divided band are inversely quantized, thereby to reproduce a signal corresponding to the original input audio signal.

The quantization can be performed by stages so that a calculated quantization error is further quantized; and the inverse quantization can be performed by repeating, alternately, quantization directed at expanding the band, and quantization directed at deepening the quantization stages at the quantization.

The inverse quantization directed at expanding the band can be carried out by extending the band in the order with regard to the auditive psychological characteristic of human beings.

At the coding end, after the frequency characteristic signal sequence is normalized, the frequency characteristic signal sequence can be divided into coefficient streams corresponding to at least two frequency bands, and the respective coefficient streams can be independently quantized and output; and at the decoding end, using the codes relating to normalization from the coding end, the codes from the coding end can be subjected to inverse normalization and, thereafter, the inversely normalized codes can be subjected to inverse quantization so that data in an arbitrary band corresponding to the divided band can be inversely quantized, thereby to reproduce a signal corresponding to the original audio input signal.

According to the present invention, there is also provided an audio signal coding apparatus for coding an audio signal by performing normalization and vector quantization to a frequency characteristic signal sequence which is obtained by subjecting an input audio signal to frequency transformation, and the apparatus comprises: multiple-stage quantization means comprising, at least, a first-stage normalization and vector-quantization unit which normalizes and vector-quantizes the frequency characteristic signal sequence or a portion thereof, and a second-stage normalization and vector-quantization unit which normalizes and vector-quantizes a quantization error component generated by the first-stage vector-quantization unit; and each quantization means in each stage of the multiple-stage quantization means having at least one divided normalization and vector-quantization unit which normalizes and vector-quantizes a coefficient stream of any of plural frequency bands obtained by dividing the frequency characteristic signal sequence into, at least, two frequency bands which can have an overlapped portion between the plural stages, using a division manner for each stage.

The audio signal coding apparatus defined can further comprise: a first quantization band selection unit between the first-stage normalization and vector-quantization unit and the second-stage normalization and vector-quantization unit which are constituents of the multiple-stage quantization means; and a second quantization band selection unit between the second-stage normalization and vector-quantization unit and a third-stage normalization and vector-quantization unit; wherein the first quantization band selection unit receives, as an input, the quantization error output from the first-stage normalization and vector-quantization unit, selects a band to be quantized by the second-stage normalization and vector-quantization unit, and outputs a quantization error in the selected band toward the second-stage normalization and vector-quantization unit; and the second quantization band selection means receives, as an input, the quantization error output from the second-stage normalization and vector-quantization unit, selects a band to be quantized by the third-stage normalization and vector-quantization unit, and outputs a quantization error in the selected band toward the third-stage normalization and vector-quantization unit.

Each of the normalization and vector-quantization units in and after the second stage of the multiple-stage quantization means appropriately selects a frequency band having a large energy-addition-sum of the quantization error output from the previous-stage normalization and vector-quantization unit, from the frequency bands divided from the frequency characteristic signal sequence to be normalized and quantized, and then the unit normalizes and quantizes the selected band.

Each of the normalization and vector-quantization units in and after the second stage of the multiple-stage quantization means can appropriately select a frequency band from the frequency bands divided from the frequency characteristic signal sequence to be normalized and quantized, on the basis of the auditive sensitivity characteristic showing the auditive nature of human beings, which frequency band selected has a large energy-addition-sum of the quantization error that is output from the previous-stage normalization and vector-quantization unit and weighted by giving a large value to a band having a high importance of the auditive sensitivity characteristic, and then the unit normalizes and quantizes the selected band.

According to the present invention, there is provided an audio signal decoding apparatus receiving, as an input, codes output from an audio signal coding apparatus, and decoding the codes to output a signal corresponding to the original input audio signal, and the decoding apparatus comprises: inverse quantization units for receiving signals from the respective quantizers of the quantization unit in the audio signal coding apparatus, and reproducing signals corresponding to the coefficient streams of the respective frequency bands into which the frequency characteristic signal sequence is divided; a plurality of inverse normalization units provided correspondingly to the respective inverse quantization units, for multiplying the coefficient streams of the frequency characteristic signal sequence output from the respective inverse quantization units by normalized components reproduced on the basis of the codes relating to normalization and output from the audio signal coding apparatus, and outputting signals corresponding to the respective coefficient streams of the frequency characteristic signal sequence before being coded; and an inverse frequency transformation unit for receiving the outputs from the plural inverse normalization units, and transforming them to a signal corresponding to the original audio signal.

According to the present invention, there is also provided an audio signal coding and decoding method receiving a frequency characteristic signal sequence obtained by frequency transformation of an input audio signal, coding and outputting this signal, and decoding the output coded signal to reproduce a signal corresponding to the original input audio signal, wherein: the frequency characteristic signal sequence is divided into coefficient streams corresponding to at least two frequency bands, and these coefficient streams are independently normalized, quantized, and output; and, from the quantized signal received, using the codes relating to normalization and output from the coding end, data of an arbitrary band corresponding to the divided band are inversely normalized and quantized, thereby to reproduce a signal corresponding to the original input audio signal.

The normalization and quantization can be carried out by stages so that the calculated quantization errors are further normalized and quantized; and the inverse normalization and quantization can be carried out by repeating, alternately, inverse normalization and quantization directed at extending the band, and inverse normalization and quantization directed at deepening the quantization stages at the quantization.

The inverse normalization and quantization directed at extending the band can be performed by extending the band in the order in view of the auditive psychological characteristic of human beings.

According to the present invention, there is also provided an audio signal coding apparatus for coding an audio signal by performing vector quantization to a frequency characteristic signal sequence which is obtained by subjecting an input audio signal to frequency transformation, and the apparatus comprises: multiple-stage quantization means comprising, at least, a first-stage vector quantizer for vector-quantizing the frequency characteristic signal sequence, and a second-stage vector quantizer for vector-quantizing a quantization error component generated by the first-stage vector quantizer; and each quantization means in each stage of the multiple-stage quantization means comprising an entire-band vector quantizer for vector-quantizing all of the frequency characteristic signal sequence or all of the quantization error components output from the previous-stage quantization means.

Another audio signal coding method according to the present invention is a method for coding a data quantity by vector quantization using a multiple-stage quantization method comprising a first vector quantization process for vector-quantizing a frequency characteristic signal sequence which is obtained by frequency transformation of an input audio signal, and a second vector quantization process for vector-quantizing a quantization error component in the first vector quantization process: wherein, on the basis of the spectrum of the input audio signal and the auditive sensitivity characteristic showing the auditive nature of human beings, a frequency block having a high importance for quantization is selected from frequency blocks of the quantization error component in the first vector quantization process and, in the second vector quantization process, the quantization error component of the first quantization process is quantized with respect to the selected frequency block.

Another audio signal coding method according to the present invention is a method for coding a data quantity by vector quantization using a multiple-stage quantization method comprising a first-stage vector quantization process for vector-quantizing a frequency characteristic signal sequence which is obtained by frequency transformation of an input audio signal, and second-and-onward-stages of vector quantization processes for vector-quantizing a quantization error component in the previous-stage vector quantization process: wherein, among the multiple stages of quantization processes according to the multiple-stage quantization method, at least one vector quantization process performs vector quantization using, as weighting coefficients for quantization, weighting coefficients on frequency, calculated on the basis of the spectrum of the input audio signal and the auditive sensitivity characteristic showing the auditive nature of human beings; and, on the basis of the spectrum of the input audio signal and the auditive sensitivity characteristic showing the auditive nature of human beings, a frequency block having a high importance for quantization is selected from frequency blocks of the quantization error component in the first-stage vector quantization process and, in the second-stage vector quantization process, the quantization error component of the first-stage quantization process is quantized with respect to the selected frequency block.

Another audio signal coding apparatus according to the present invention comprises: a time-to-frequency transformation unit for transforming an input audio signal to a frequency-domain signal; a spectrum envelope calculation unit for calculating a spectrum envelope of the input audio signal; a normalization unit for normalizing the frequency-domain signal obtained in the time-to-frequency transformation unit, with the spectrum envelope obtained in the spectrum envelope calculation unit, thereby to obtain a residual signal; an auditive weighting calculation unit for calculating weighting coefficients on frequency, on the basis of the spectrum of the input audio signal and the auditive sensitivity characteristic showing the auditive nature of human beings; and a multiple-stage quantization unit having multiple stages of vector quantization units connected in columns, to which the normalized residual signal is input, at least one of the vector quantization units performing quantization using weighting coefficients obtained in the weighting unit.

Another audio signal coding apparatus according to the present invention includes plural quantization units among the multiple stages of the multiple-stage quantization unit that perform quantization using the weighting coefficients obtained in the weighting unit, and the auditive weighting calculation unit calculates individual weighting coefficients to be used by the multiple stages of quantization units, respectively.

Another audio signal coding apparatus according to the present invention is an audio signal coding apparatus wherein the multiple-stage quantization unit comprises: a first-stage quantization unit for quantizing the residual signal normalized by the normalization unit, using the spectrum envelope obtained in the spectrum envelope calculation unit as weighting coefficients in the respective frequency domains; a second-stage quantization unit for quantizing a quantization error signal from the first-stage quantization unit, using weighting coefficients calculated on the basis of the correlation between the spectrum envelope and the quantization error signal of the first-stage quantization unit, as weighting coefficients in the respective frequency domains; and a third-stage quantization unit for quantizing a quantization error signal from the second-stage quantization unit using, as weighting coefficients in the respective frequency domains, weighting coefficients which are obtained by adjusting the weighting coefficients calculated by the auditive weighting calculating unit according to the input signal transformed to the frequency-domain signal by the time-to-frequency transformation unit and the auditive characteristic, on the basis of the spectrum envelope, the quantization error signal of the second-stage quantization unit, and the residual signal normalized by the normalization unit.

Another audio signal coding apparatus according to the present invention comprises: a time-to-frequency transformation unit for transforming an input audio signal to a frequency-domain signal; a spectrum envelope calculation unit for calculating a spectrum envelope of the input audio signal; a normalization unit for normalizing the frequency-domain signal obtained in the time-to-frequency transformation unit, with the spectrum envelope obtained in the spectrum envelope calculation unit, thereby to obtain a residual signal; a first vector quantizer for quantizing the residual signal normalized by the normalization unit; an auditive selection means for selecting a frequency block having a high importance for quantization among frequency blocks of the quantization error component of the first vector quantizer, on the basis of the spectrum of the input audio signal and the auditive sensitivity characteristic showing the auditive nature of human beings; and a second quantizer for quantizing the quantization error component of the first vector quantizer with respect to the frequency block selected by the auditive selection means.

Another audio signal coding apparatus according to the present invention is an audio signal coding apparatus, wherein the auditive selection means selects a frequency block using, as a scale of importance to be quantized, a value obtained by multiplying the quantization error component of the first vector quantizer, the spectrum envelope signal obtained in the spectrum envelope calculation unit, and an inverse characteristic of the minimum audible limit characteristic. A portion which has been satisfactorily quantized in the first vector quantizer is prevented from being quantized again to generate an error inversely, whereby quantization maintaining a high quality is carried out.

Another audio signal coding apparatus according to the present invention is an audio signal coding apparatus, wherein the auditive selection means selects a frequency block using, as a scale of importance to be quantized, a value obtained by multiplying the spectrum envelope signal obtained in the spectrum envelope calculation unit and an inverse characteristic of the minimum audible limit characteristic. Since the codes required for quantization can be decreased, the compression ratio is increased.

Another audio signal coding apparatus according to the present invention is an audio signal coding apparatus wherein the auditive selection means selects a frequency block using, as a scale of importance to be quantized, a value obtained by multiplying the quantization error component of the first vector quantizer, the spectrum envelope signal obtained in the spectrum envelope calculation unit, and an inverse characteristic of a characteristic obtained by adding the minimum audible limit characteristic and a masking characteristic calculated from the input signal.

Another audio signal coding apparatus according to the present invention is an audio signal coding apparatus wherein the auditive selection means selects a frequency block using, as a scale of importance to be quantized, a value obtained by multiplying the quantization error component of the first vector quantizer, the spectrum envelope signal obtained in the spectrum envelope calculation unit, and an inverse characteristic of a characteristic obtained by adding the minimum audible limit characteristic and a masking characteristic that is calculated from the input signal and corrected according to the residual signal normalized by the normalization unit, the spectrum envelope signal obtained in the spectrum envelope calculation unit, and the quantization error signal of the first-stage quantization unit. Therefore, satisfactory sound quality is obtained even though coding and decoding are carried out without a fixed data quantity. Further, a high-quality sound is obtained at a high compression ratio.

Another audio signal coding apparatus according to the present invention is an audio signal coding wherein the quantization means has a vector quantizer serving as an entire band quantization unit which quantizes, once at least, all of the frequency bands of the frequency characteristic signal sequence to be quantized.

Another audio signal coding apparatus according to the present invention is an audio signal coding apparatus wherein, as the vector quantization method, code vectors, all or a portion of which codes are inverted, are used for code retrieval.

Another audio signal coding apparatus according to the present invention comprises: a phase information extraction unit for receiving, as an input signal, a frequency characteristic signal sequence obtained by frequency transformation of an input audio signal, and extracting phase information of a portion of the frequency characteristic signal sequence corresponding to a prescribed frequency band; a code book for containing a plurality of audio codes being representative values of the frequency characteristic signal sequence, wherein an element portion of each audio code corresponding to the extracted phase information is shown by an absolute value; and an audio code selection unit for calculating the auditive distances between the frequency characteristic signal sequence and the respective audio codes in the code book, selecting an audio code having a minimum distance, adding phase information to the audio code having the minimum distance using the output from the phase information extraction unit as auxiliary information, and outputting a code index corresponding to the audio code having the minimum distance as an output signal. Therefore, the calculation amount in the audio code selection unit can be reduced without degrading the sensible sound quality. Further, the number of codes to be stored in the code book can be reduced.

Another audio signal coding apparatus according to the present invention is an audio signal coding apparatus wherein the phase information extraction unit extracts phase information of a prescribed number of elements on the low-frequency band side of the input frequency characteristic signal sequence.

Another audio signal coding apparatus according to the present invention is an audio signal coding apparatus further comprising an auditive psychological weight vector table which is a table of auditive psychological quantities relative to the respective frequencies in view of the auditive psychological characteristic of human beings: wherein the phase information extraction unit extracts phase information of an element which matches with a vector stored in the auditive psychological weight vector table, from the input frequency characteristic signal sequence.

Another audio signal coding apparatus according to the present invention is an audio signal coding apparatus further comprising a smoothing unit for smoothing the frequency characteristic signal sequence using a smoothing vector by division between vector elements: wherein, before selecting the audio code having the minimum distance and adding the phase information to the selected audio code, the audio code selecting unit converts the selected audio code to an audio code which has not been subjected to smoothing using smoothing information output from the smoothing unit, and outputs a code index corresponding to the audio code as an output signal. Therefore, the quantity of data per frequency, which data are stored in the code book and referred to when the audio code selection unit performs retrieval, can be reduced as a whole.

An audio signal coding apparatus according to the present invention is an audio signal coding apparatus further comprising: an auditive psychological weight vector table which is a table of auditive psychological quantities relative to the respective frequencies, in view of the auditive psychological characteristic of human beings; a smoothing unit for smoothing the frequency characteristic signal sequence using a smoothing vector by division between vector elements; and a sorting unit for selecting a plurality of values obtained by multiplying the values of the auditive psychological weight vector table and the values of the smoothing vector table, in order of auditive importance, and outputting these values toward the audio code selection unit. Therefore, it is possible to calculate a code index while considering both of an element which is important for the auditive characteric of human beings, and an element which is physically important, resulting in audio signal compression of higher quality.

Another audio signal coding apparatus according to the present invention is an audio signal coding apparatus wherein employed as the frequency characteristic signal sequence is a vector of which elements are coefficients obtained by subjecting the audio signal to frequency transformation. Another audio signal coding apparatus according to the present invention is an audio signal coding apparatus wherein employed as the frequency characteristic signal sequence is a vector of which elements are coefficients obtained by subjecting the audio signal to frequency transformation. Another audio signal coding apparatus according to the present invention is an audio signal coding apparatus wherein employed as the frequency characteristic signal sequence is a vector of which elements are coefficients obtained by subjecting the audio signal to frequency transformation. Another audio signal coding apparatus according to the present invention is an audio signal coding apparatus wherein employed as the frequency characteristic signal sequence is a vector of which elements are coefficients obtained by subjecting the audio signal to MDCT (Modified Discrete Cosine Transformation).

Another audio signal coding apparatus according to the present invention is an audio signal coding apparatus wherein employed as the frequency characteristic signal sequence is a vector of which elements are coefficients obtained by subjecting the audio signal to MDCT (Modified Discrete Cosine Transformation).

Another audio signal coding apparatus according to the present invention is an audio signal coding apparatus wherein employed as the frequency characteristic signal sequence is a vector of which elements are coefficients obtained by subjecting the audio signal to MDCT (Modified Discrete Cosine Transformation).

Another audio signal coding apparatus according to the present invention is an audio signal coding apparatus wherein employed as the smoothing vector is a vector of which elements are relative frequency responses in the respective frequencies, which are calculated from linear prediction coefficients obtained by subjecting the audio signal to linear prediction.

Another audio signal coding apparatus according to the present invention is an audio signal coding apparatus wherein employed as the smoothing vector is a vector of which elements are relative frequency responses in the respective frequencies, which are calculated from linear prediction coefficients obtained by subjecting the audio signal to linear prediction.

Another audio signal decoding apparatus according to the present invention comprises: a phase information extraction unit for receiving, as an input signal, one of code indices obtained by quantizing frequency characteristic signal sequences which are feature quantities of an audio signal, and extracting phase information of elements of the input code index corresponding to a prescribed frequency band; a code book for containing a plurality of frequency characteristic signal sequences corresponding to the code indices, wherein an element portion corresponding to the extracted phase information is shown by an absolute value; and an audio code selection unit for calculating the auditive distances between the input code index and the respective frequency characteristic signal sequences in the code book, selecting a frequency characteristic signal sequence having a minimum distance, adding phase information to the frequency characteristic signal sequence having the minimum distance using the output from the phase information extraction unit as auxiliary information, and outputting the frequency characteristic signal sequence corresponding to the input code index as an output signal. Therefore, the quantity of data stored in the code book used on the receiving end can be reduced and, further, the calculation amount on the receiving end can be reduced significantly.

As described above, according to the audio signal coding apparatus, and decoding apparatus, or coding and decoding method of the present invention, provided for quantization is a structure capable of performing quantization even at a high data compression ratio by using, for example, a vector quantization method, and employed for allocation of data quantity during quantization is to allocate, alternately, data quantity contributing to expansion of a reproduced band and data quantity contributing to improvement of quality. First of all, in the coding apparatus, as the first stage, an input audio signal is transformed to a signal in the frequency domain, and a portion of the frequency signal is coded; in the second stage, a portion of the frequency signal uncoded and a quantization error signal in the first stage are coded and added to the codes obtained in the first stage; in the third stage, the other portion of the frequency signal uncoded, and quantization error signals in the first and second stages are coded and added to the codes obtained in the first and second stages; followed by similar coding in forward stages. On the other hand, in the decoding apparatus, any of the following decoding manners is possible: decoding using only the codes coded in the first stage, decoding using the codes decoded in the first and second stages, and decoding using the codes decoded in stages from the first stage to the third or more stage. The decoding order is to decode, alternately, codes contributing to band expansion and codes contributing to quality improvement. Therefore, satisfactory sound quality is obtained even though coding and decoding are carried out without a fixed data quantity. Further, a high-quality sound is obtained at a high compression ratio.

Furthermore, according to the audio signal coding apparatus, and decoding apparatus, or coding and decoding method of the present invention, a normalization means is provided before the quantization means, and normalization of an input audio signal is carried out before quantization. Therefore, the normalization means and the quantization means perform coding while exhibiting their full abilities, whereby highly efficient quantization is carried out without losing the data quantity possessed by the original audio signal and, therefore, with less quantization error, and the effect is dramatically heightened according to the kind of the audio signal. Furthermore, as described above, allocation of data quantity during quantization is carried out so as to allocate, alternately, data quantity contributing to expansion of a reproduced band and data quantity contributing to improvement of quality. When the data quantity at the receiving end is limited, inverse quantization is carried out only in a narrow band and a shallow region. However, by expanding the inverse quantization alternately in the direction to broaden the band and the direction to increase the depth of the inverse quantization to increase the data quantity at the receiving end, a desired quantity of data of the coded audio signal can be decoded regardless of the quantity of data transmitted from the coding apparatus. Accordingly, by varying the quantity of data to be decoded according to the communication environment or the like on the receiving end, high-definition sound quality can be obtained stably even when an ordinary public telephone network is used.

Furthermore, according to the audio signal coding apparatus, and decoding apparatus, or coding and decoding method of the present invention, a normalization means is provided before each of quantization means performing multiple-stage quantization, and normalization is performed for each of divided frequencies and for each stage of quantization, followed by quantization. Therefore, normalization for each frequency domain enables appropriate coding according to the quantity of data possessed by the audio signal in each frequency domain, that is, the normalization means and the quantization means perform coding while exhibiting their full abilities, whereby quantization of high efficiency is performed without losing the data quantity possessed by the original audio signal and, therefore, with less quantization error, with the result that high-definition sound quality is obtained stably, and the effect is dramatically heightened according to the kind of the audio signal. Further, at the decoding end, when inverse normalization and inverse quantization are carried out in both of the direction to broaden the quantization band and the direction to increase the quantization depth, alternately, a desired quantity of data of the coded audio signal can be decoded regardless of the quantity of data transmitted from the coding apparatus. Accordingly, by varying the quantity of data to be decoded according to the communication environment or the like on the receiving end, high-definition sound quality can be obtained stably even when an ordinary public telephone network is used.

BRIEF DESCRIPTION OF THE DRAWINGS

FIGS. 19(a)-19(e) are waveform diagrams for explaining the entire operation of the audio signal coding apparatus according to the fifth embodiment of the present invention.

FIGS. 29a-29c are diagrams showing error signal zi, spectrum envelope I1, and minimum audible limit characteristic hi.

BEST MODES TO EXECUTE THE INVENTION

Hereinafter, embodiments of the present invention will be described using drawings.

Embodiment 1

Figure 1:
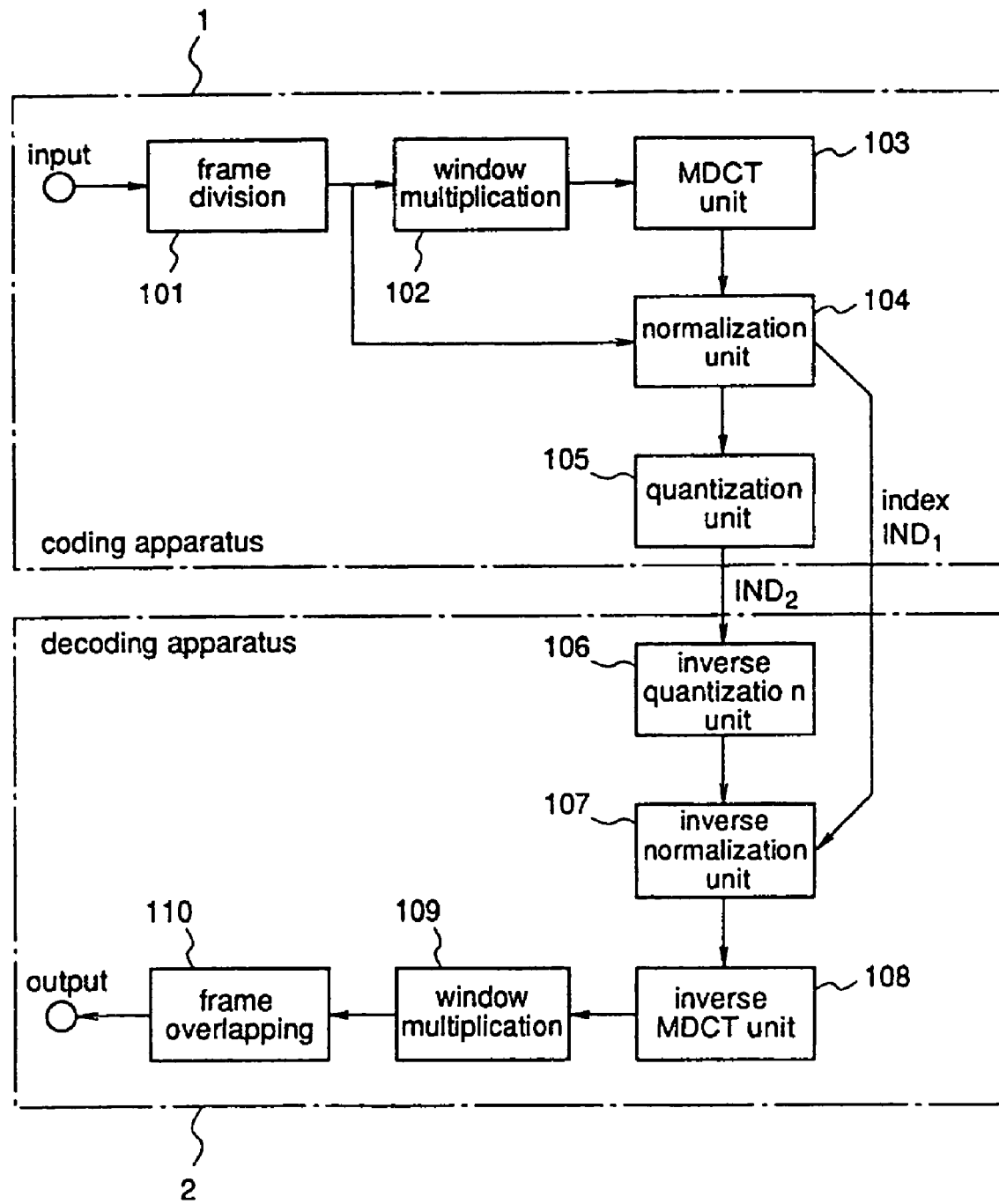
FIG. 1 is a diagram illustrating the entire structure of audio signal coding and decoding apparatuses according to a first embodiment of the present invention.

FIG. 1 is a diagram illustrating the entire structure of audio signal coding and decoding apparatuses according to a first embodiment of the invention. In FIG. 1, reference numeral 1 denotes a coding apparatus, and 2 denotes a decoding apparatus. In the coding apparatus 1, reference numeral 101 denotes a frame division unit that divides an input signal into a prescribed number of frames; 102 denotes a window multiplication unit that multiplies the input signal and a window function on the time axis; 103 denotes an MDCT unit that performs modified discrete cosine transform; 104 denotes a normalization unit that receives both of the time axis signal output from the frame division unit 101 and the MDCT coefficients output from the MDCT unit 103 and normalizes the MDCT coefficients; and 105 denotes a quantization unit that receives the normalized MDCT coefficients and quantizes them. Although the MDCT is employed for time-to-frequency transform in this embodiment, discrete Fourier transform (DFT) may be employed.

In the decoding apparatus 2, reference numeral 106 denotes an inverse quantization unit that receives a signal (index IND2) output from the coding apparatus 1 and inversely quantizes this signal; 107 denotes an inverse normalization unit that inversely normalizes the output from the inverse quantization unit 106 using an index IND1 from the normalization unit 104 of the coding apparatus 1; 108 denotes an inverse MDCT unit that performs modified discrete cosine transform to the output from the inverse normalization unit 107; 109 denotes a window multiplication unit that performs window multiplication to the output from the inverse MDCT unit 108; and 110 denotes a frame overlapping unit that performs frame overlapping to the output from the window multiplication unit 110.

A description is given of the operation of the audio signal coding and decoding apparatuses constructed as described above.

It is assumed that the signal input to the coding apparatus 1 is a digital signal sequence that is temporally continuous. For example, it is a digital signal obtained by quantizing an audio signal to 16 bits at a sampling frequency of 48 kHz. This input signal is accumulated in the frame division unit 101 until reaching a prescribed sample number, and it is output when the accumulated sample number reaches a defined frame length. Here, the frame length of the frame division unit 101 is, for example, any of 128, 256, 512, 1024, 2048, and 4096 samples. In the frame division unit 101, it is also possible to output the signal with the frame length being variable according to the feature of the input signal. Further, the frame division unit 101 is constructed to perform an output for each shift length specified. For example, in the case where the frame length is 4096 samples, when a shift length half as long as the frame length is set, the frame division unit 101 outputs latest 4096 samples every time the frame length reaches 2048 samples. Of course, even when the frame length or the sampling frequency varies, it is possible to have the structure in which the shift length is set at half of the frame length.

The output from the frame division unit 101 is input to the window multiplication unit 102 and to the normalization unit 104. In the window multiplication unit 102, the output signal from the frame division unit 101 is multiplied by a window function on the time axis, and the result is output from the window multiplication unit 102. This manner is shown by, for example, formula (1).

$$hx_i = h_i \cdot x_i \quad i=1,2,\ldots,N$$

$$h_i = \sin\left(\frac{\pi}{N}(i+0.5)\right) \quad (1)$$

where $x_i$ is the output from the frame division unit 101, $h_i$ is the window function, and $hx_i$ is the output from the window multiplication unit 102. Further, i is the suffix of time. The window function $h_i$ shown in formula (1) is an example, and the window function is not restricted to that shown in formula (1). Selection of a window function depends on the feature of the signal input to the window multiplication unit 102, the frame length of the frame division unit 101, and the shapes of window functions in frames which are located temporally before and after the frame being processed. For example, assuming that the frame length of the frame division unit 101 is N, as the feature of the signal input to the window multiplication unit 102, the average power of signals input at every N/4 is calculated and, when the average power varies significantly, the calculation shown in formula (1) is executed with a frame length shorter than N. Further, it is desirable to appropriately select the window function, according to the shape of the window function of the previous frame and the shape of the window function of the subsequent frame, so that the shape of the window function of the present frame is not distorted.

Next, the output from the window multiplication unit 102 is input to the MDCT unit 103, wherein modified discrete cosine transform is executed, and MDCT coefficients are output. A general formula of modified discrete cosine transform is represented by formula (2).

$$yk = \sum_{n=0}^{N-1} hx_n \cdot \cos\left(\frac{2\pi(k+1/2)(n+n_0)}{N}\right) \quad (2)$$

$$n_0 = N/4 = 1/2 \quad (k=0,1,\ldots,N/2-1)$$

Assuming that the MDCT coefficients output from the MDCT unit 103 are expressed by yk in formula (2), the output from the MDCT unit 103 shows the frequency characteristics, and it linearly corresponds to a lower frequency component as the variable k of yk approaches closer 0, while it corresponds to a higher frequency component as the variable k approaches closer N/2-1 from 0. The normalization unit 104 receives both of the time axis signal $x_i$ output from the frame division unit 101 and the MDCT coefficients yk output from the MDCT unit 103, and normalizes the MDCT coefficients using several parameters. To normalize the MDCT coefficients is to suppress variations in values of MDCT coefficients, which values are considerably different between the low-band component and the high-band component. For example, when the low-band component is considerably larger than the high-band component, a parameter having a large value in the low-band component and a small value in the high-band component is selected, and the MDCT coefficients are divided by this parameter to suppress the variations of the MDCT coefficients. In the normalization unit 104, the indices IND1 expressing the parameters used for the normalization are coded.

The quantization unit 105 receives the MDCT coefficients normalized in the normalization unit 104, and quantizes the MDCT coefficients. At this time, the quantization unit 105 outputs a code index having a minimum difference among differences between the quantized values and the respective quantized outputs corresponding to plural code indices in a code book. In this case, a difference between the value quantized by the quantization unit 105 and the value corresponding to the code index output from the quantization unit 105 is a quantization error.

On the other hand, in the decoding apparatus 2, decoding is carried out using the indices IND1 from the normalization unit 104 in the coding apparatus 1, and the indices IND2 from the quantization unit 105. In the inverse quantization unit 106, the normalized MDCT coefficients are reproduced using the indices IND2 from the quantization unit 105. In the inverse quantization unit 106, the reproduction of the MDCT coefficients may be carried out using all or some of the indices. Of course, the output from the normalization unit 104 and the output from the inverse quantization unit 106 are not always identical to those before the quantization because the quantization by the quantization unit 105 is attended with quantization errors.

In the inverse normalization unit 107, the parameters used for the normalization in the coding apparatus 1 are restored from the indices IND1 output from the normalization unit 104 of the coding apparatus 1, and the output from the inverse quantization unit 106 is multiplied by these parameters to restore the MDCT coefficients. In the inverse MDCT unit 108, the MDCT coefficients output from the inverse normalization unit 107 are subjected to inverse MDCT, whereby the frequency-domain signal is restored to the time-domain signal. The inverse MDCT calculation is represented by, for example, formula (3).

$$xx(n) = \frac{2}{N}\sum_{k=0}^{N-1} yy_k \cos\left(\frac{2\pi(k+1/2)(n=n_0)}{N}\right) \quad (3)$$

$$n_0 = N/4 + 1/2$$

where $yy_k$ is the MDCT coefficients restored in the inverse normalization unit 107, and xx(n) is the inverse MDCT coefficients which are output from the inverse MDCT unit 108.

The window multiplication unit 109 performs window multiplication using the output xx(n) from the inverse MDCT unit 108. The window multiplication is carried out using the same window as used by the window multiplication unit 102 of the coding apparatus 1, and a process shown by, for example, formula (4) is carried out.

$$z(i) = xx(i) \cdot h_i \quad (4)$$

where z(i) is the output from the window multiplication unit 109.

The frame overlapping unit 110 reproduces the audio signal using the output from the window multiplication unit 109. Since the output from the window multiplication unit 109 is a temporally overlapped signal, the frame overlapping unit 110 provides an output signal from the decoding apparatus 2 using, for example, formula (5).

$$\text{out}(i) = z_m(i) + z_{m-1}(i + \text{SHIFT}) \quad (5)$$

where zm(i) is the i-th output signal z(i) from the window multiplication unit 109 in the m-th time frame, zm-1(i) is the i-th output signal from the window multiplication unit 19 in the (m-1)th time frame, SHIFT is the sample number corresponding to the shift length of the coding apparatus, and out(i) is the output signal from the decoding apparatus 2 in the m-th time frame of the frame overlapping unit 110.

Figure 2:
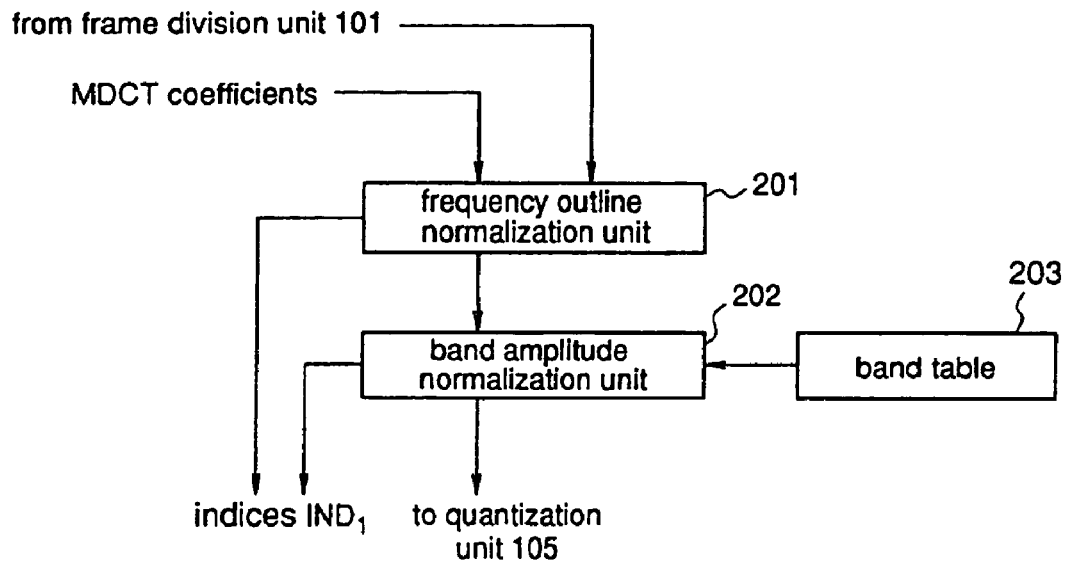
FIG. 2 is a block diagram illustrating an example of a normalization unit as a constituent of the above-described audio signal coding apparatus.

An example of the normalization unit 104 will be described in detail using FIG. 2. In FIG. 2, reference numeral 201 denotes a frequency outline normalization unit that receives the outputs from the frame division unit 101 and the MDCT unit 103; and 202 denotes a band amplitude normalization unit that receives the output from the frequency outline normalization unit 201 and performs normalization with reference to a band table 203.

A description is given of the operation. The frequency outline normalization unit 201 calculates a frequency outline, that is, a rough form of frequency, using the data on the time axis output from the frame division unit 101, and divides the MDCT coefficients output from the MDCT unit 103 by this. Parameters used for expressing the frequency outline are coded as indices IND1. The band amplitude normalization unit 202 receives the output signal from the frequency outline normalization unit 201, and performs normalization for each band shown in the band table 203. For example, assuming that the MDCT coefficients output from the frequency outline normalization unit 201 are dct(i) (i=0~2047) and the band table 203 is as shown by Table 1, an average value of amplitude in each band is calculated using, for example, formula (6).

TABLE 1

| j | bjlow | bjhigh |
|---|---|---|
| 0 | 0 | 10 |
| 1 | 11 | 22 |
| 2 | 23 | 33 |
| 3 | 34 | 45 |
| 4 | 46 | 56 |
| 5 | 57 | 68 |
| 6 | 69 | 80 |
| 7 | 81 | 92 |
| 8 | 93 | 104 |
| 9 | 105 | 116 |
| 10 | 117 | 128 |
| 11 | 129 | 141 |
| 12 | 142 | 153 |
| 13 | 154 | 166 |
| 14 | 167 | 179 |
| 15 | 180 | 192 |
| 16 | 193 | 192 |
| 17 | 206 | 219 |
| 18 | 220 | 233 |
| 19 | 234 | 247 |
| 20 | 248 | 261 |
| 21 | 262 | 276 |
| 22 | 277 | 291 |
| 23 | 292 | 307 |
| 24 | 308 | 323 |
| 25 | 324 | 339 |

TABLE 1-continued

| j | bjlow | bjhigh |
|---|---|---|
| 26 | 340 | 356 |
| 27 | 357 | 374 |
| 28 | 375 | 392 |
| 29 | 393 | 410 |
| 30 | 411 | 430 |
| 31 | 431 | 450 |
| 32 | 451 | 470 |
| 33 | 471 | 492 |
| 34 | 493 | 515 |
| 35 | 516 | 538 |
| 36 | 539 | 563 |
| 37 | 564 | 588 |
| 38 | 589 | 615 |
| 39 | 616 | 644 |
| 40 | 645 | 673 |
| 41 | 674 | 705 |
| 42 | 706 | 737 |
| 43 | 738 | 772 |
| 44 | 773 | 809 |
| 45 | 810 | 848 |
| 46 | 849 | 889 |
| 47 | 890 | 932 |
| 48 | 933 | 978 |
| 49 | 979 | 1027 |
| 50 | 1028 | 1079 |
| 51 | 1080 | 1135 |
| 52 | 1136 | 1193 |
| 53 | 1194 | 1255 |
| 54 | 1256 | 1320 |
| 55 | 1321 | 1389 |
| 56 | 1390 | 1462 |
| 57 | 1463 | 1538 |
| 58 | 1539 | 1617 |
| 59 | 1618 | 1699 |
| 60 | 1700 | 1783 |
| 61 | 1784 | 1870 |
| 62 | 1871 | 1958 |
| 63 | 1959 | 2048 |

$$\left. \begin{array}{l} sum_j = \displaystyle\sum_{i=bjlow}^{bjhigh} dct(i)^p \\ ave_j = \left( \dfrac{sum_j}{bjhigh - bjlow + 1} \right)^{-p} \end{array} \right\} bjlow \leq i \leq bjhigh \quad (6)$$

where bjlow and bjhigh are the lowest-band index i and the highest-band index i, respectively, in which the dct(i) in the j-th band shown in the band table 203 belongs. Further, p is the norm in distance calculation, which is desired to be 2, and avej is the average of amplitude in each band number j. The band amplitude normalization unit 202 quantizes the avej to obtain qavej, and normalizes it using, for example, formula (7).

$$n\_dct(i) = dct(i)/\text{qave}_j \quad bjlow \leq i \leq bjhigh \quad (7)$$

To quantize the avej, scalar quantization may be employed, or vector quantization may be carried out using the code book. The band amplitude normalization unit 202 codes the indices IND1 of parameters used for expressing the qavej.

Although the normalization unit 104 in the coding apparatus 1 is constructed using both of the frequency outline normalization unit 201 and the band amplitude normalization unit 202 as shown in FIG. 2, it may be constructed using either of the frequency outline normalization unit 201 and the band amplitude normalization unit 202. Further, when there is no significant variation between the low-band component and the high-band component of the MDCT coefficients output from the MDCT unit 103, the output from the MDCT unit 103 may be directly input to the quantization unit 105 without using the units 201 and 202.

Figure 3:
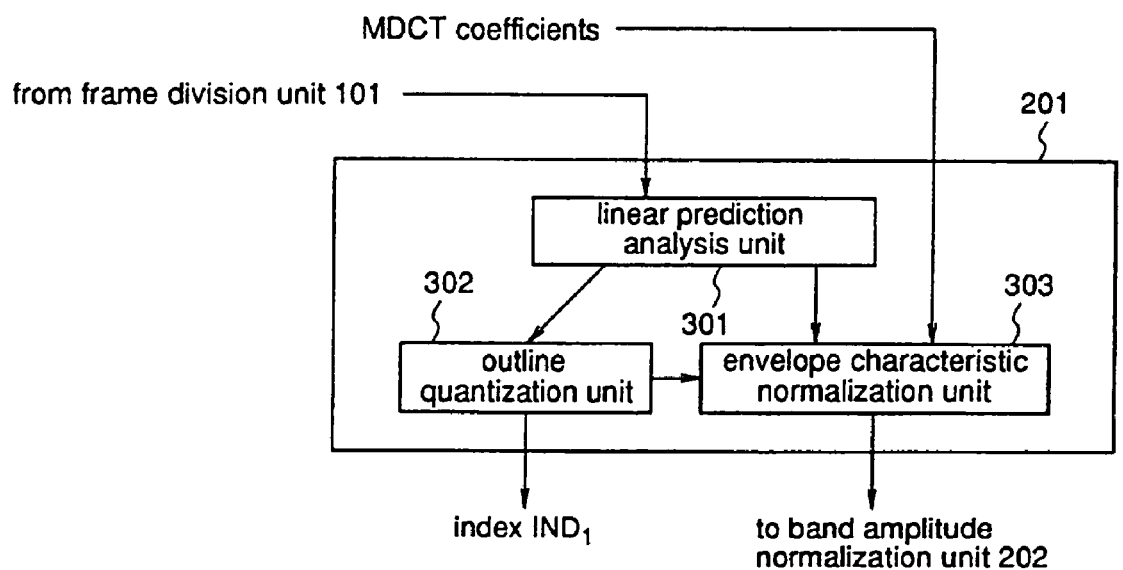
FIG. 3 is a block diagram illustrating an example of a frequency outline normalization unit as a constituent of the above-described audio signal coding apparatus.

The frequency outline normalization unit 201 shown in FIG. 2 will be described in detail using FIG. 3. In FIG. 3, reference numeral 301 denotes a linear predictive analysis unit that receives the output from the frame division unit 101; 302 denotes an outline quantization unit that receives the output from the linear predictive analysis unit 301; and 303 denotes an envelope characteristic normalization unit that receives the output from the MDCT unit 103.

A description is given of the operation of the frequency outline normalization unit 201. The linear predictive analysis unit 301 receives the audio signal on the time axis from the frame division unit 101, and performs linear predictive coding. Linear predictive coefficients (LPC coefficients) as the result of linear predictive coding can generally be obtained by calculating an autocorrelation function of a window-multiplied signal, such as Hamming window, and solving a normal equation or the like. The linear predictive coefficients so calculated are converted to linear spectral pair coefficients (LSP coefficients) or the like and quantized in the outline quantization unit 302. As a quantization method, vector quantization or scalar quantization may be employed. Then, frequency transfer characteristic expressed by the parameters quantized by the outline quantization unit 302 is calculated in the envelope characteristic normalization unit 303, and the MDCT coefficients output from the MDCT unit 103 are divided by the characteristic to be normalized. To be specific, when the linear predictive coefficients equivalent to the parameters quantized by the outline quantization unit 302 are qlpc(i), the frequency transfer characteristic calculated by the envelope characteristic normalization unit 303 is expressed by, for example, formula (8).

$$li = \begin{cases} qlpc(i) & 0 \leq i \leq \text{ORDER} \\ 0 & \text{ORDER} + 1 \leq i < N \end{cases} \quad (8)$$

$$env(i) = 1 / \mathit{fft}(li)$$

where ORDER is desired to be 10~40, and fft( ) means high-speed Fourier transform of fast Fourier transform. Using the calculated frequency transfer characteristic env(i), the envelope characteristic normalization unit 303 performs normalization using, for example, formula (9) as follows.

$$fdct(i) = mdct(i)/env(i) \quad (9)$$

where mdct(i) is the output signal from the MDCT unit 103, and fdct(i) is the normalized output signal from the envelope characteristic normalization unit 303.

Figure 4:
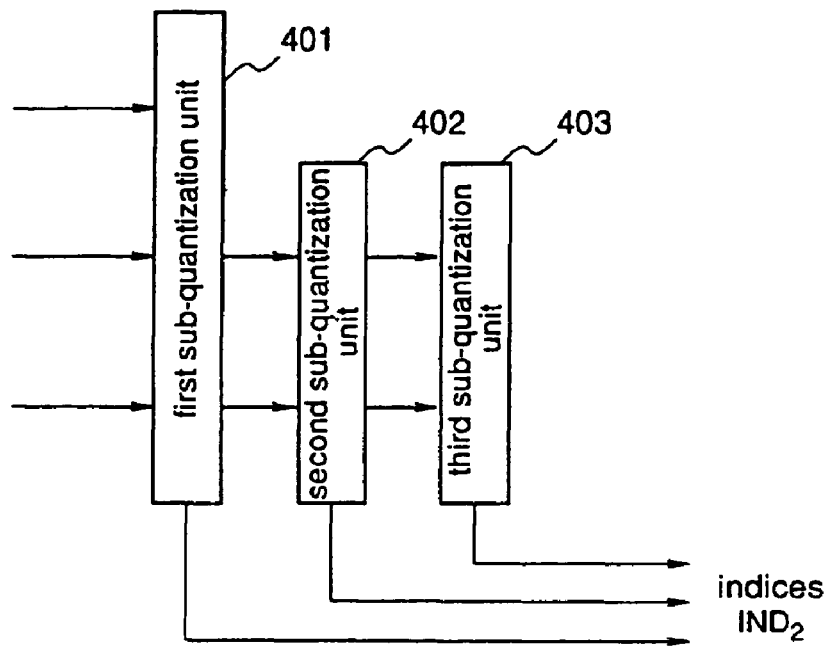
FIG. 4 is a block diagram illustrating a quantization unit as a constituent of the above-described audio signal coding apparatus, according to a first embodiment of the present invention.

Next, the quantization unit 105 in the coding apparatus 1 will be described in detail using FIG. 4. In FIG. 4, reference numeral 401 denotes a first sub-quantization unit, 402 denotes a second sub-quantization unit that receives the output from the first sub-quantization unit, and 403 denotes a third sub-quantization unit that receives the output from the second sub-quantization unit 402.

Next, the operation of the quantization unit 105 will be described. A signal input to the first sub-quantization unit 401 is the output from the normalization unit 104 of the coding apparatus, i.e., normalized MDCT coefficients. However, in the structure having no normalization unit 104, it is the output from the MDCT unit 103. In the first sub-quantization unit 401, the input MDCT coefficients are subjected to scalar quantization or vector quantization, and the indices expressing the parameters used for the quantization are coded. Further, quantization errors with respect to the input MDCT coefficients due to the quantization are calculated, and they are output to the second sub-quantization unit 402. In the first sub-quantization unit 401, all of the MDCT coefficients may be quantized, or only a portion of them may be quantized. Of course, when only a portion thereof is quantized, quantization errors in the bands which are not quantized by the first sub-quantization unit 401 will become input MDCT coefficients of the non-quantized bands.

Next, the second sub-quantization unit 402 receives the quantization errors of the MDCT coefficients obtained in the first sub-quantization unit 401, and quantizes them. For this quantization, like the first sub-quantization unit 401, scalar quantization or vector quantization may be used. The second sub-quantization unit 402 codes the parameters used for the quantization as indices. Further, it calculates quantization errors due to the quantization, and outputs them to the third sub-quantization unit 403. This third sub-quantization unit 403 is identical in structure to the second sub-quantization unit. The numbers of MDCT coefficients, i.e., band widths, to be quantized by the first sub-quantization unit 401, the second sub-quantization unit 402, and the third sub-quantization unit 403 are not necessarily equal to each other, and the bands to be quantized are not necessarily the same. Considering the auditive characteristic of human beings, it is desired that both of the second sub-quantization unit 402 and the third sub-quantization unit 403 are set so as to quantize the band of the MDCT coefficients showing the low-frequency component.

As described above, in the audio signal coding apparatus according to the first embodiment, when quantization is performed, the quantization unit is provided in stages, i.e., a multiple-stage quantization means is constituted, and the band width to be quantized by the quantization unit is varied between the adjacent stages, whereby coefficients in an arbitrary band among the input MDCT coefficients, for example, coefficients corresponding to the low-frequency component which is auditively important for human beings, are quantized preponderantly. Therefore, even when an audio signal is coded at a low bit rate, i.e., a high compression ratio, it is possible to perform high-definition audio reproduction at the receiving end.

Embodiment 2

Figure 5:
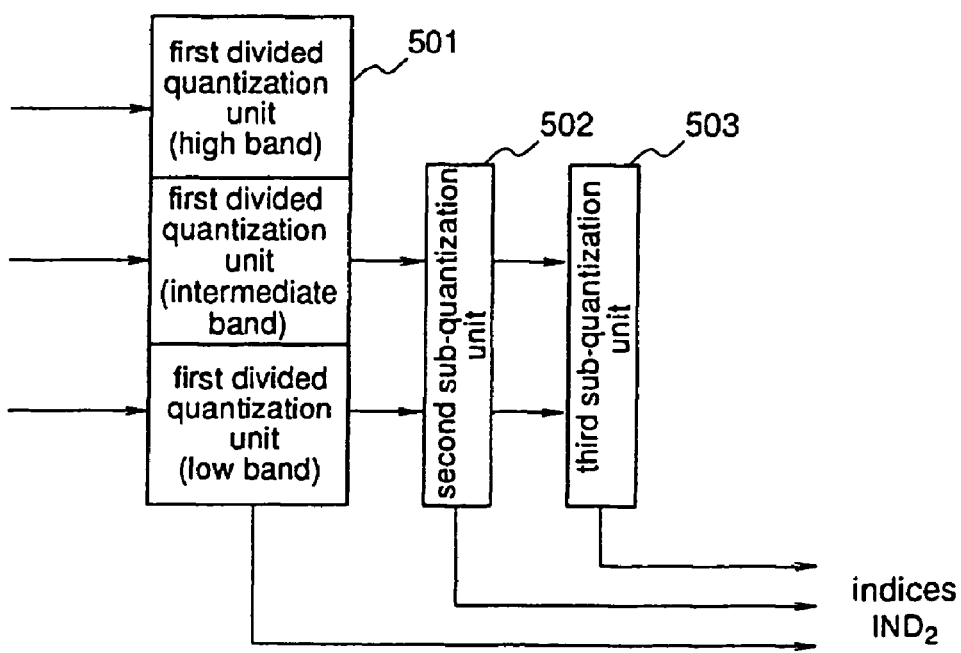
FIG. 5 is a block diagram illustrating a quantization unit as a constituent of the above-described audio signal coding apparatus, according to a second embodiment of the present invention.

Next, an audio signal coding apparatus according to a second embodiment of the invention will be described using FIG. 5. In this second embodiment, only the structure of the quantization unit 105 in the coding apparatus 1 is different from that of the first embodiment and, therefore, only the structure of the quantization unit will be described hereinafter. In FIG. 5, reference numeral 501 denotes a first sub-quantization unit, 502 denotes a second sub-quantization unit, and 503 denotes a third sub-quantization unit. This fifth embodiment is different in structure from the first embodiment in that the first quantization unit 501 divides the input MDCT coefficients into three bands (high-band, intermediate-band, low-band) and quantizes the respective bands independently, and quantization sections for the respective bands, which constitute the first sub-quantization unit 501, correspond to so-called "divided vector quantizers". Generally, when quantization is carried out using a method of vector quantization, a vector is constituted by extracting some elements from the input MDCT coefficients, whereby vector quantization is performed. In the first sub-quantization unit 501 according to this seventh embodiment, when constituting a vector by extracting some elements from the input MDCT coefficients, quantization of the low band is performed using only the elements in the low band, quantization of the intermediate band is performed using only the elements in the intermediate band, and quantization of the high band is performed using only the elements in the high band, whereby the respective bands are subjected to vector quantization.

Although in this second embodiment, a method of dividing the band to be quantized into three bands, i.e., low band, intermediate band, and high band, is described as an example, the number of divided bands may be other than three. Further, with respective to the second sub-quantization unit 502 and the third sub-quantization unit 503, as well as the first quantization unit 501, the band to be quantized may be divided into several bands.

As described above, according to the second embodiment of the invention, in the multiple-stage quantization means, initially in the first stage, the input MDCT coefficients are divided into three bands and quantized independently, so that the process of quantizing the auditively important band with priority can be performed in the first-time quantization. Further, in the subsequent quantization units 502 and 503, the MDCT coefficients in the auditively important band are further quantized by stages, whereby the quantization error is reduced furthermore, and higher-definition audio reproduction is realized on the receiving end.

Embodiment 3

Figure 6:
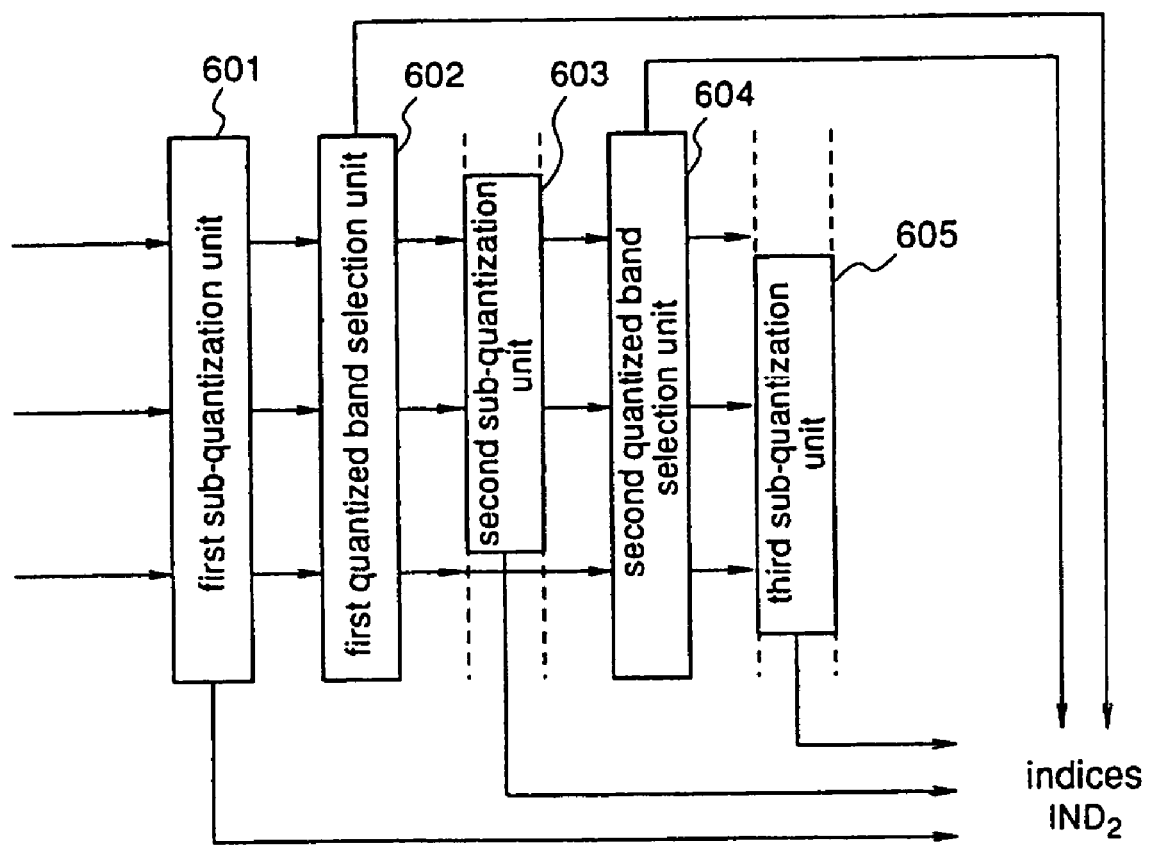
FIG. 6 is a block diagram illustrating a quantization unit as a constituent of the above-described audio signal coding apparatus, according to a third embodiment of the present invention.

An audio signal coding apparatus according to a third embodiment of the present invention will be described using FIG. 6. In this third embodiment, since only the structure of the quantization unit 105 in the coding apparatus 1 is different from that of the above-mentioned first embodiment, only the structure of the quantization unit will be explained. In FIG. 6, reference numeral 601 denotes a first sub-quantization unit, 602 denotes a first quantization band selection unit, 603 denotes a second sub-quantization unit, 604 denotes a second quantization band selection unit, and 605 denotes a third sub-quantization unit. This third embodiment is different in structure from the second embodiment in that the first quantization band selection unit 602 and the second quantization band selection unit 604 are added.

Hereinafter, the operation will be described. The first quantization band selection unit 602 calculates a band, of which MDCT coefficients are to be quantized by the second sub-quantization unit 602, using the quantization error (fdcterr(i)) output from the first sub-quantization unit 601.

For example, j which maximizes esum(j) given in formula (10) is calculated, and a band ranging from j*OFFSET to j*OFFSET+BANDWIDTH is quantized.

$$esum(j) = \sum_{i=j \cdot OFFSET}^{j-OFFSET+BANDWIDTH} fdct_{err}(i)^2 \qquad (10)$$

where OFFSET is the constant, and BANDWIDTH is the total sample corresponding to a band width to be quantized by the second sub-quantization unit 603. The first quantization band selection unit 602 codes, for example, the j which gives the maximum value in formula (10), as an index IND2. The second sub-quantization unit 603 receives the index IND2 and quantizes the band selected by the first quantization band selection unit 602. The second quantization band selection unit 604 is implemented by the same structure as the first selection unit 602 except that its input is the quantization error output from the second sub-quantization unit 603, and the band selected by the second quantization band selection unit 604 is input to the third sub-quantization unit 605.

Figure 45:
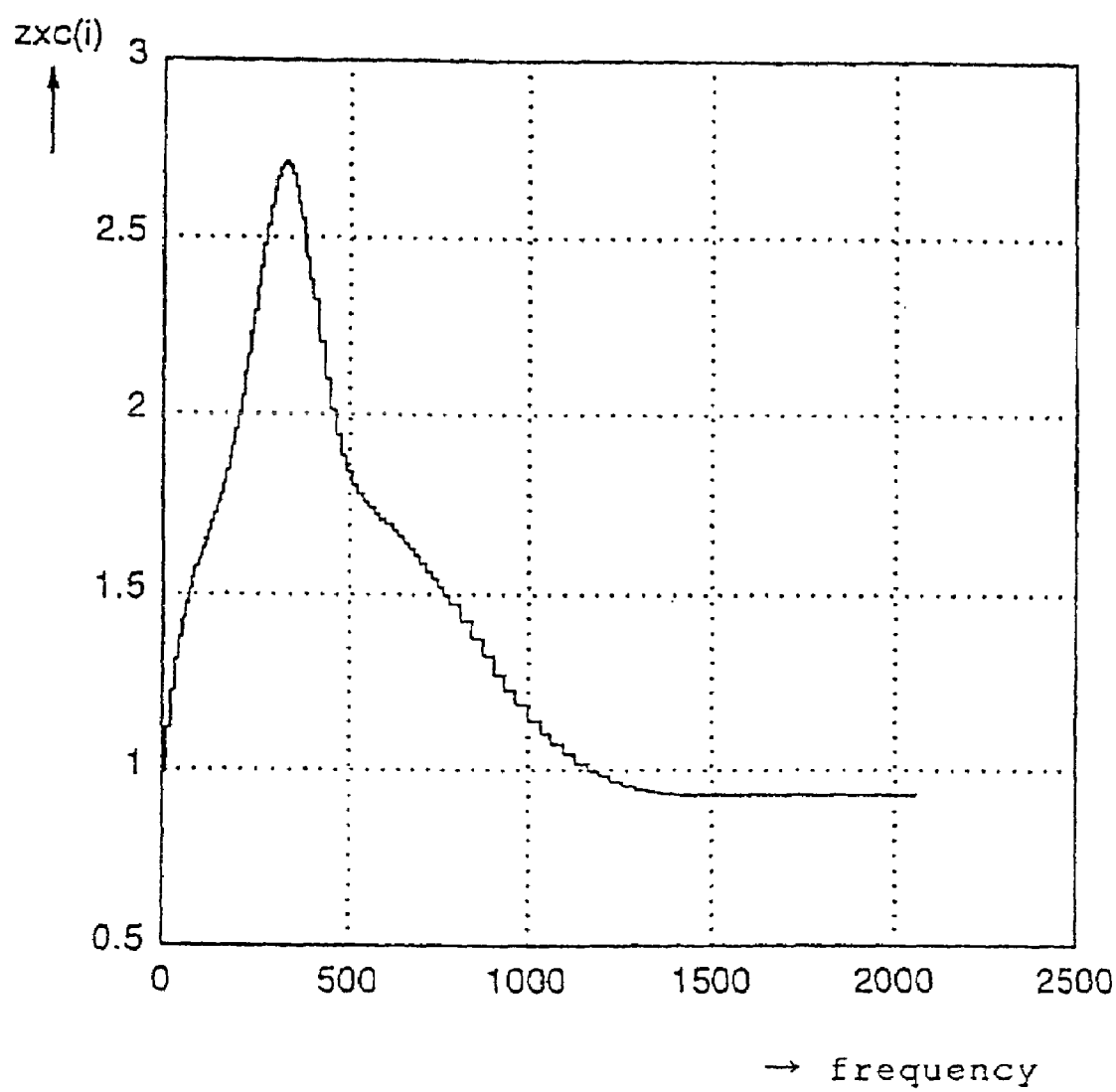
FIG. 45 is a graphical example of the auditive sensitivity characteristic of human beings relative to frequencies.

Although in the first quantization band selection unit 602 and the second quantization band selection unit 604, a band to be quantized by the next quantization unit is selected using formula (10), a band to be quantized may be calculated using a value obtained by multiplying a value used for normalization by the normalization unit 104 and a value in view of the auditive sensitivity characteristic of human beings relative to frequencies, as shown in formula (11).

$$esum(j) = \sum_{i=j \cdot OFFSET}^{j-OFFSET+BANDWIDTH} \{fdct_{err}(i) \cdot env(i) \cdot zxc(i)\}^2 \qquad (11)$$

where env(i) is obtained by dividing the output from the MDCT unit 103 with the output from the normalization unit 104, and zxc(i) is the table in view of the auditive sensitivity characteristic of human beings relative to frequencies, and an example thereof is shown in FIG. 45. In formula (11), zxc(i) may be always 1 so that it is not considered.

Further, it is not necessary to provide plural stages of quantization band selection units, i.e., only the first quantization band selection unit 602 or the second quantization band selection unit 604 may be used.

As described above, according to the third embodiment, when quantization is performed in multiple stages, a quantization band selection unit is disposed between adjacent stages of quantization units to make the band to be quantized variable and appropriately selectable. Therefore, the band to be quantized can be varied according to the input signal, and the degree of freedom in quantization is increased, whereby the quantization efficiency is significantly improved by preponderantly quantizing a portion which needs quantization.

Figure 13:
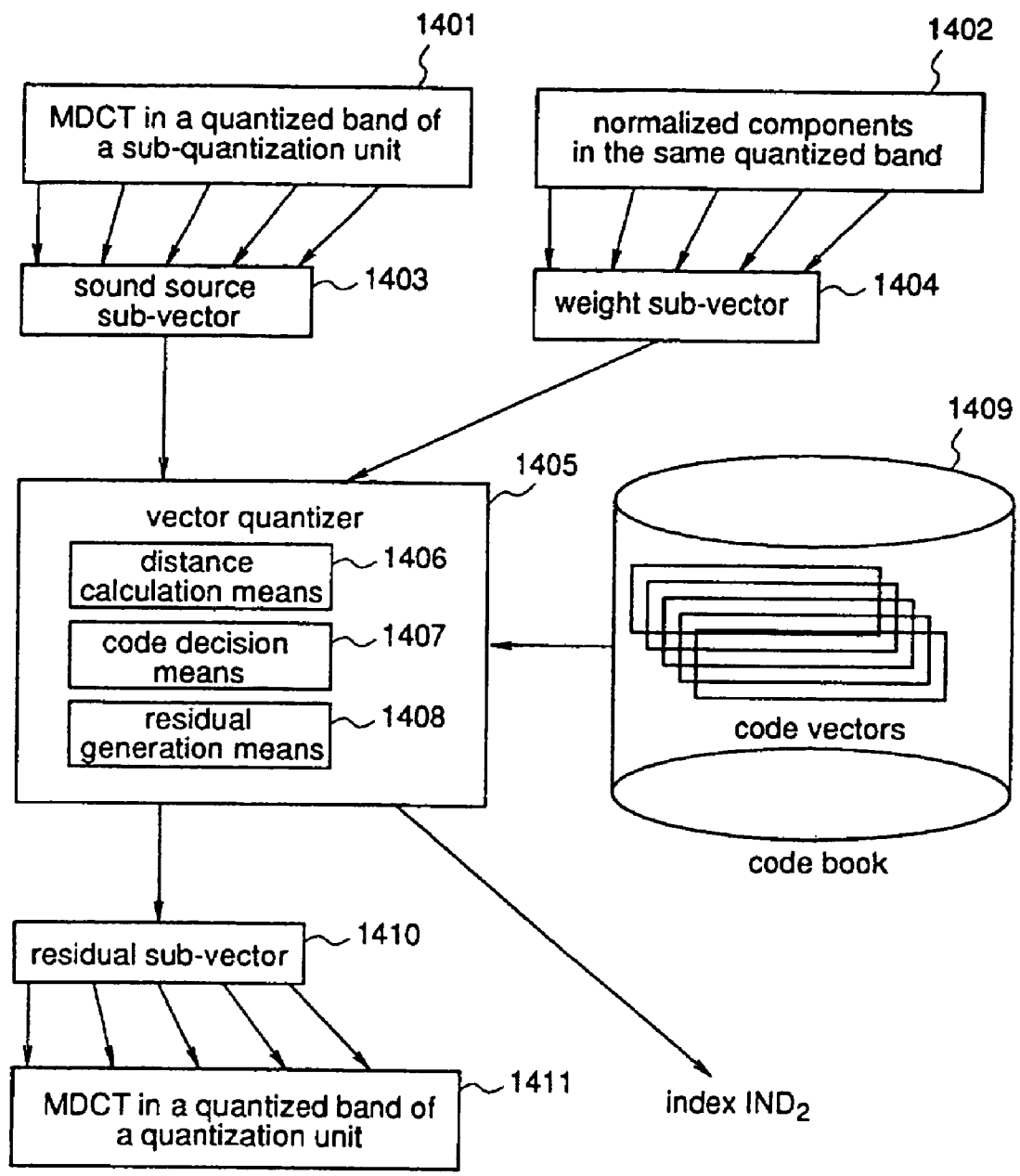
FIG. 13 is a diagram for explaining the detailed operation of the quantization unit in the coding apparatus.

Hereinafter, a description is given of the detailed operation by a quantization method of the quantization unit 106 included in the coding apparatus 1 according to any of the first to third embodiments, using FIG. 1 and FIG. 13. From the MDCT coefficients 1401 input to each sub-quantization unit, some of them are extracted to constitute sound source sub-vectors 1403. Likewise, assuming that the coefficient streams, which are obtained by dividing the MDCT coefficients input to the normalization unit 104 with the MDCT coefficients 1401 output from the normalization unit 104, are normalized components 1402, some of these components are extracted according to the same rule as that for extracting the sound source sub-vectors from the MDCT coefficients 1401, thereby to constitute weight sub-vectors 1404. The rule for extracting the sound source sub-vectors 1403 and the weight sub-vectors 1404 from the MDCT coefficients 1401 and the normalized components 1402, respectively, is shown in, for example, formula (12).

$$subvector_i(j) = \begin{cases} vector\left(\frac{VTOTAL}{CR} \cdot i + j\right) & \\ \frac{VTOTAL}{CR} \cdot i + j < TOTAL & \\ 0 & \\ \frac{VTOTAL}{CR} \cdot i + j \geq TOTAL & \end{cases} \quad (12)$$

where the j-th element of the i-th sound source sub-vector is subvector$_i$(j), the MDCT coefficients are vector( ), the total element number of the MDCT coefficients 1401 is TOTAL, the element number of the sound source sub-vectors 1403 is CR, and VTOTAL is set to a value equal to or larger than TOTAL and VTOTAL/CR should be an integer. For example, when TOTAL is 2048, CR=19 and VTOTAL=2052, or CR=23 and VTOTAL=2070, or CR=21 and VTOTAL=2079. The weight sub-vectors 1404 can be extracted by the procedure of formula (12).

The vector quantizer 1405 selects, from the code vectors in the code book 1409, a code vector having a minimum distance between it and the sound source sub-vector 1403 after being weighted by the weight sub-vector 1404. Then, the quantizer 1405 outputs an index IND2 of the code vector having the minimum distance, and a residual sub-vector 1410 which corresponds to a quantization error between the code vector having the minimum distance and the input sound source sub-vector 1403. An example of actual calculation procedure will be described on the premise that the vector quantizer 1405 is composed of three constituents: a distance calculating means 1406, a code decision means 1407, and a residual generating means 1408. The distance calculating means 1406 calculates the distance between the i-th sound source sub-vector 1403 and the k-th code vector in the code book 1409 using, for example, formula (13).

$$dik = \sum_{j=0}^{CR-1} w_j^R (subvector_i(j) - C_k(j))^S \quad (13)$$

where wj is the j-th element of the weight sub-vectors, ck(j) is the j-th element of the k-th code vector, R and S are norms for distance calculation, and the values of R and S are desired to be 1, 1.5, 2. These norms R and S for distance calculation may have different values. Further, dik is the distance of the k-th code vector from the i-th sound source sub-vector. The code decision means 1407 selects a code vector having a minimum distance among the distances calculated by formula (13) or the like, and codes the index thereof (IND2). For example, when diu is the minimum value, the index to be coded for the i-th sub-vector is u. The residual generating means 1408 generates the residual sub-vectors 1410 using the code vectors selected by the code decision means 1407, according to formula (14), $$res_i(j) = subvector_i(j) - C_u(j) \quad (14)$$

wherein the j-th element of the i-th residual sub-vector 1410 is resi(j), and the j-th element of the u-th code vector selected by the code decision means 1407 is cu(j). The residual sub-vectors 1410 are retained as MDCT coefficients to be quantized by the subsequent sub-quantization units, by executing the inverse process of formula (14) or the like. However, when a band being quantized does not influence on the subsequent sub-quantization units, i.e., when the subsequent sub-quantization units are not required to perform quantization, the residual generating means 1408, the residual sub-vectors 1410, and the generation of the MDCT 1411 are not necessary. Although the number of code vectors possessed by the code book 1409 is not specified, when the memory capacity, calculating time and the like are considered, the number is desired to be about 64.

As another embodiment of the vector quantizer 1405, the following structure is available. That is, the distance calculating means 1406 calculates the distance using formula (15).

$$dik = \begin{cases} \sum_{j=0}^{CR-1} w_j^R (subvector_i(j) - C_k(j))^S & k < K \\ \sum_{j=0}^{CR-1} w_j^R (subvector_i(j) - C_{K-k}(j))^S & k \geq K \end{cases} \quad (15)$$

wherein K is the total number of code vectors used for the code retrieval of the code book 1409.

The code decision means 1407 selects k that gives a minimum value of the distance dik calculated in formula (15), and codes the index thereof (IND2). Here, k is a value in a range from 0 to 2K−1. The residual generating means 1408 generates the residual sub-vectors 1410 using formula (16).

$$res_i(j) = \begin{cases} subvector_i(j) - C_u(j) & 0 \leq k < K \\ subvector_i(j) + C_u(j) & K \leq k < 2K \end{cases} \quad (16)$$

Although the number of code vectors possessed by the code book 1409 is not restricted, when the memory capacity, calculation time and the like are considered, it is desired to be about 64.

Further, although the weight sub-vectors 1404 are generated from the normalized components 1402, it is possible to generate weight sub-vectors by multiplying the weight sub-vectors 1404 by a weight in view of the auditive characteristic of human beings.

According to the third embodiment described above, the first quantization band selection unit is disposed between the first sub-quantization unit and the second sub-quantization unit, and the second quantization band selection unit is disposed between the second sub-quantization unit and the third sub-quantization unit, thereby to make the bands to be quantized by the second sub-quantization unit and the third sub-quantization unit variable and appropriately selectable. Therefore, the band to be quantized can be varied according to the input signal, and the degree of freedom in quantization is improved, whereby the quantization efficiency is significantly improved by preponderantly quantizing a portion which needs quantization.

Furthermore, according to the first to third embodiments described above, an audio signal coding apparatus for coding an audio signal by performing vector quantization to a frequency characteristic signal sequence obtained by frequency transformation of an input audio signal, is provided with a multiple-stage quantization means having, at least, a first-stage vector quantizer for vector-quantizing the frequency characteristic signal sequence or a portion thereof, and a second-stage vector quantizer for vector-quantizing a quantization error component from the first-stage vector quantizer; and each stage of the multiple-stage quantization means is provided with at least one divided vector quantizer which vector-quantizes coefficient streams of any of plural frequency bands which are obtained by dividing the frequency characteristic signal sequence into at least two frequency bands which may have an overlapped portion between the plural stages, according to a division manner for each stage. In this structure, among input MDCT coefficients, coefficients in an arbitrary band, for example, coefficients corresponding to a low-frequency-band component which is auditively important for human beings, are quantized preponderantly to a desired depth. On the other hand, at the decoding end, decoding can be carried out using codes decoded in multiple stages, and the decoding order can be alternately decoding codes contributing to band expansion and codes contributing to quality improvement. Therefore, even though the audio signal is coded at a low bit rate, i.e., a high compression ratio, or even though coding and decoding are carried out without a fixed data quantity, it is possible to perform high-definition audio reproduction on the receiving end.

Embodiment 4

Next, an audio signal decoding apparatus according to a fourth embodiment of the present invention will be described using FIG. 1 and FIGS. 7~11. The indices output from the coding apparatus 1 are broadly divided into the indices IND1 output from the normalization unit 104 and the indices IND2 output from the quantization unit 105. The indices IND1 output from the normalization unit 104 are decoded by the inverse normalization unit 107, and the indices IND2 output from the quantization unit 105 are decoded by the inverse quantization unit 106. The inverse quantization unit 106 can perform decoding using only a portion of the indices IND2 output from the quantization unit 105.

Figure 7:
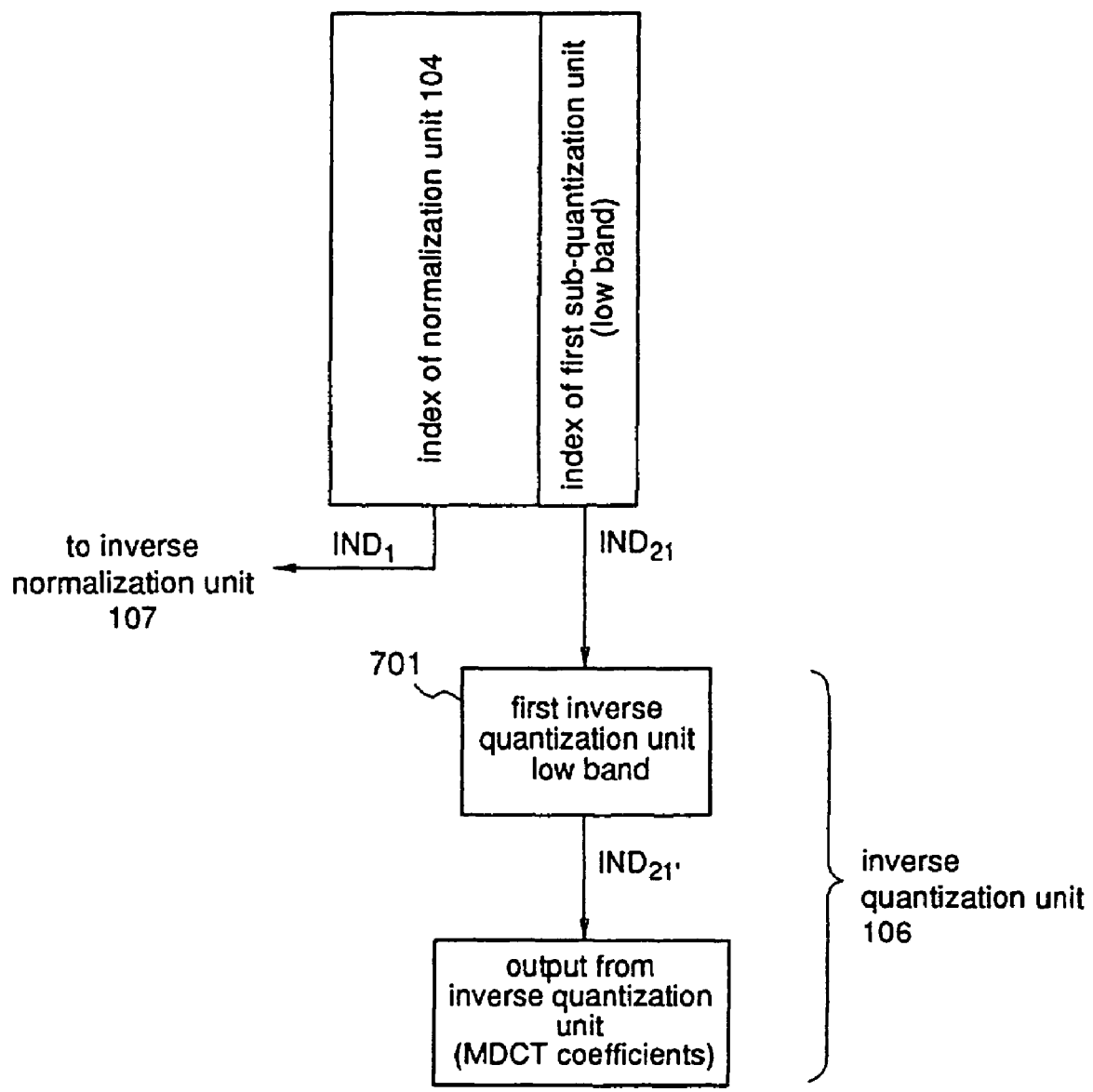
FIG. 7 is a block diagram illustrating an inverse quantization unit as a constituent of the above-described audio signal decoding apparatus, according to a fourth embodiment of the present invention.

That is, assuming that the quantization unit 105 of the coding apparatus 1 has the structure shown in FIG. 5, a description is given of the case where inverse quantization is carried out using the inverse quantization unit having the structure of FIG. 7 in the decoding apparatus 2. In FIG. 7, reference numeral 701 designates a first low-band-component inverse quantization unit. The first low-band-component inverse quantization unit 701 performs decoding using only the indices IND21 of the low-band component from the first sub-quantizer 501.

By the structure described above, i.e., by performing decoding using only the indices of the low-band component from the first sub-quantization unit 501 in the first low-band-component inverse quantization unit 701, a desired quantity of data of the coded audio signal can be decoded regardless of the quantity of data transmitted from the coding apparatus 1. That is, even when the quantity of data to be decoded at the receiving side is restricted, a desired quantity of data can be decoded by making the quantity of data to be coded different from the quantity of data to be decoded. Accordingly, the quantity of data to be decoded can be varied according to the communication environment or the like on the receiving end, and high-definition sound quality can be obtained stably even when an ordinary public telephone network is used.

Figure 8:
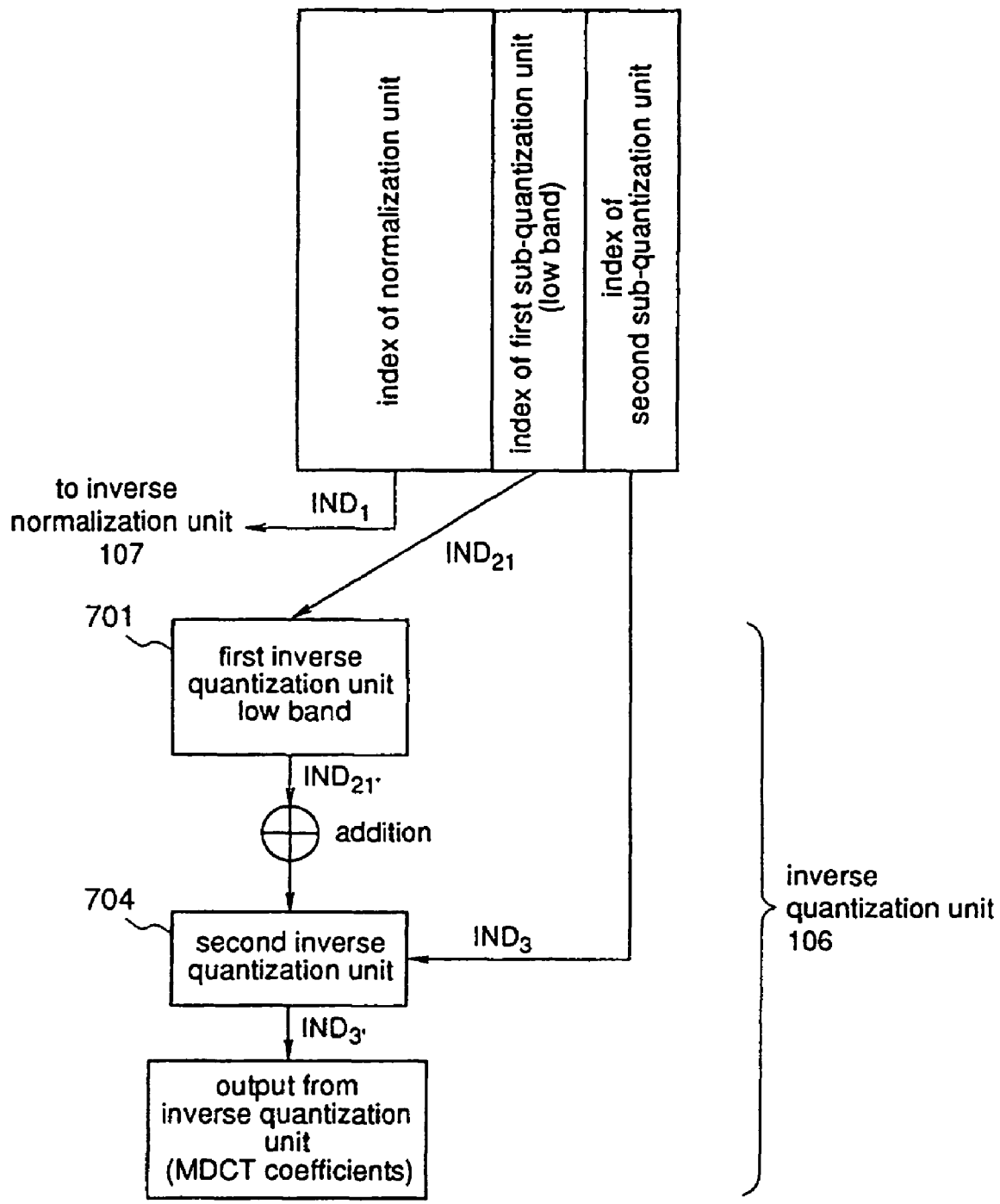
FIG. 8 is a block diagram illustrating an example of an inverse quantization unit as a constituent of the above-described audio signal decoding apparatus, according to the fourth embodiment of the present invention.

FIG. 8 is a diagram showing the structure of the inverse quantization unit included in the audio signal decoding apparatus, which is employed when inverse quantization is carried out in two stages. In FIG. 8, reference numeral 704 denotes a second inverse quantization unit. This second inverse quantization unit 704 performs decoding using the indices IND3 from the second sub-quantization unit 502. Accordingly, the output IND21' from the first low-band-component inverse quantization unit 701 and the output IND3' from the second inverse quantization unit 704 are added and their sum is output from the inverse quantization unit 106. This addition is performed to the same band as the band quantized by each sub-quantization unit in the quantization.

As described above, the indices IND21 from the first sub-quantization unit (low-band) are decoded by the first low-band-component inverse quantization unit 701 and, when the indices IND3 from the second sub-quantization unit are inversely quantized, the output IND21' from the first low-band-component inverse quantization unit 701 is added to the object of the inverse quantization, whereby the inverse quantization is carried out in two stages. Therefore, the audio signal quantized in multiple stages can be decoded accurately, resulting in a higher sound quality.

Figure 9:
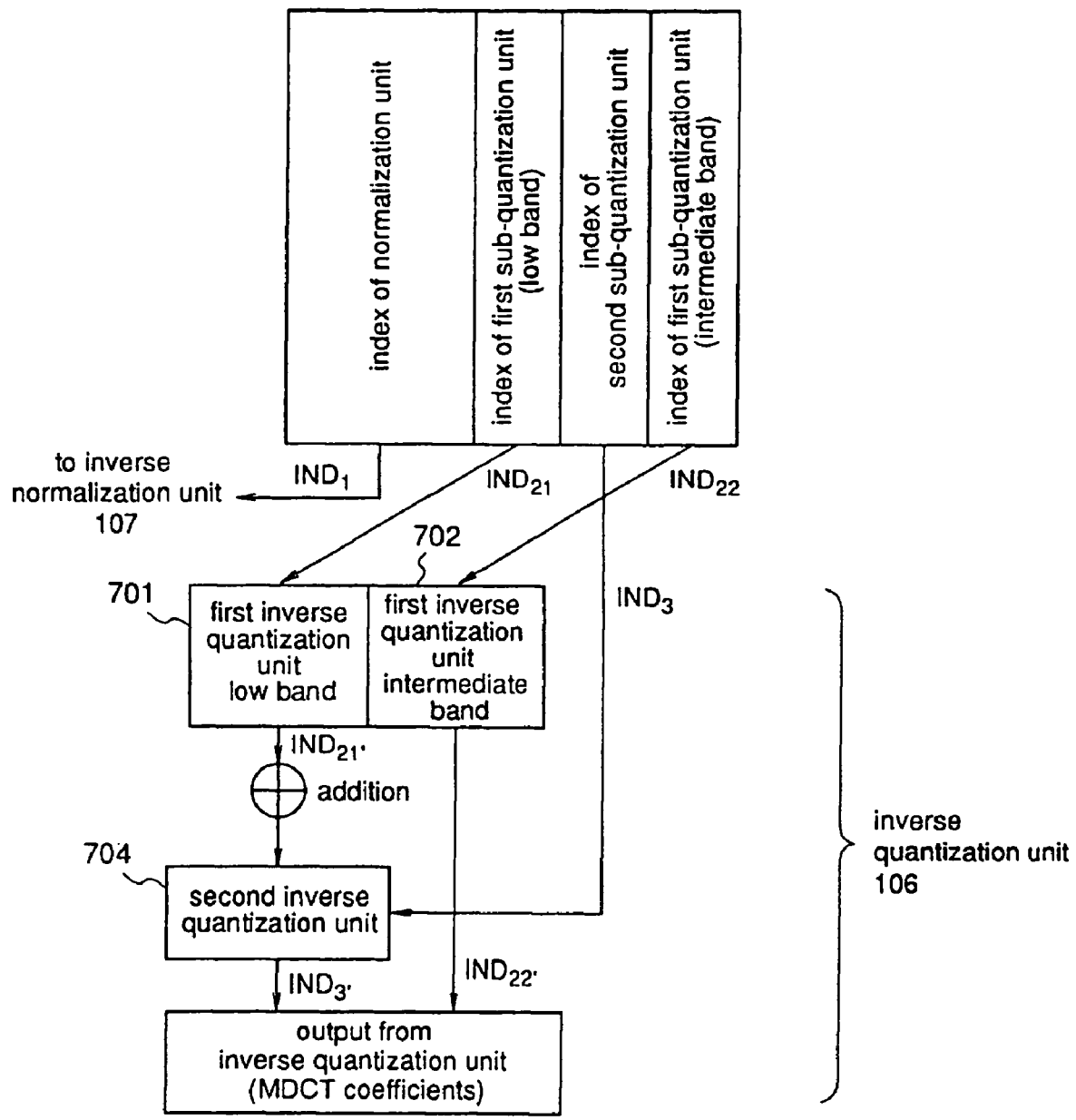
FIG. 9 is a block diagram illustrating another example of an inverse quantization unit as a constituent of the above-described audio signal decoding apparatus, according to the fourth embodiment of the present invention.

Further, FIG. 9 is a diagram illustrating the structure of the inverse quantization unit included in the audio signal decoding apparatus, in which the object band to be processed is extended when the two-stage inverse quantization is carried out. In FIG. 9, reference numeral 702 denotes a first intermediate-band-component inverse quantization unit. This first intermediate-band-component inverse quantization unit 702 performs decoding using the indices IND22 of the intermediate-band component from the first sub-quantization unit 501. Accordingly, the output IND21' from the first low-band-component inverse quantization unit 701, the output IND3' from the second inverse quantization unit 704, and the output IND22' from the first intermediate-band-component inverse quantization unit 702 are added and their sum is output from the inverse quantization unit 106. This addition is performed to the same band as the band quantized by each sub-quantization unit in the quantization. Thereby, the band of the reproduced sound is extended, and an audio signal of higher quality is reproduced.

Figure 10:
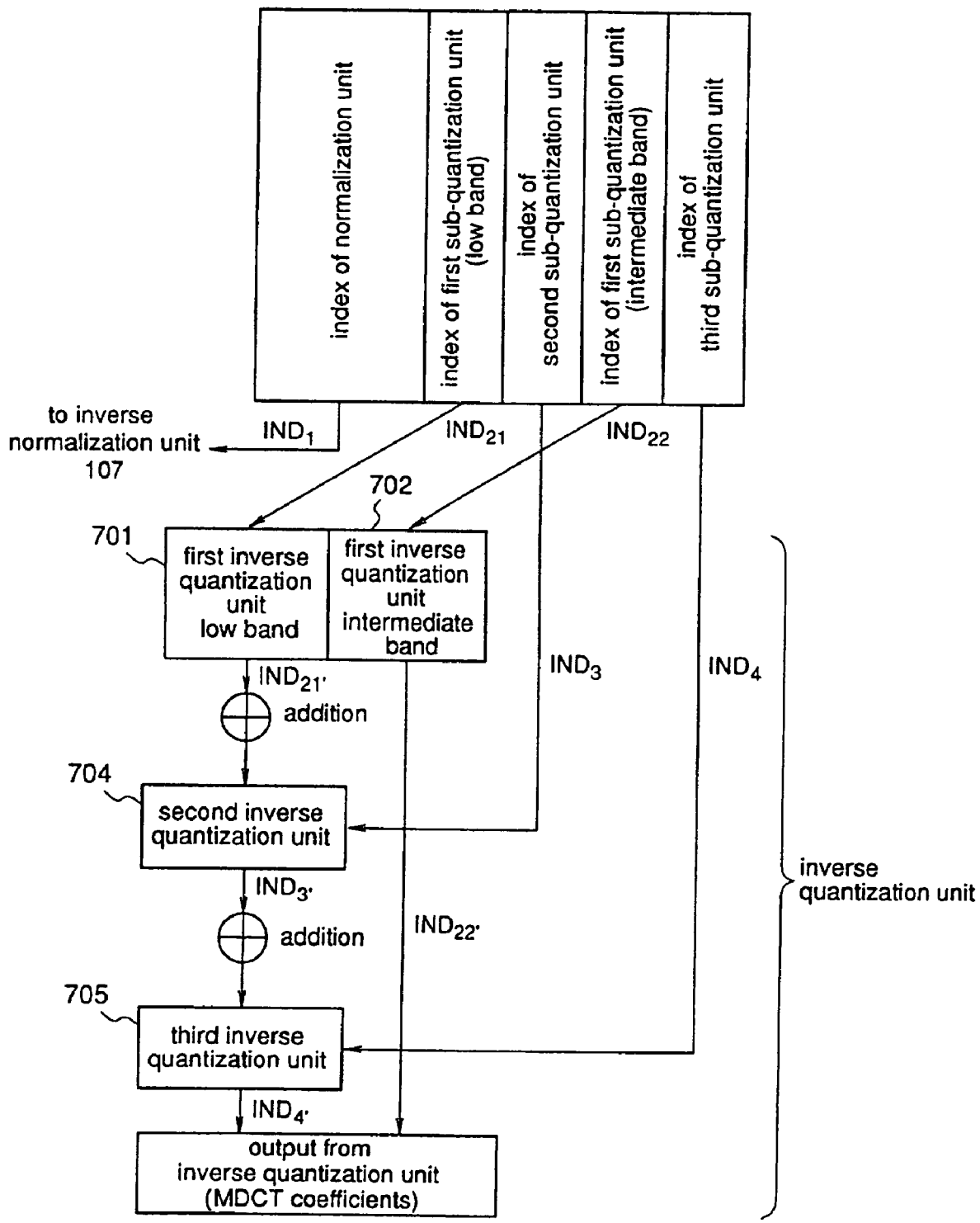
FIG. 10 is a block diagram illustrating still another example of an inverse quantization unit as a constituent of the above-described audio signal decoding apparatus, according to the fourth embodiment of the present invention.

Further, FIG. 10 is a diagram showing the structure of the inverse quantization unit included in the audio signal decoding apparatus, in which inverse quantization is carried out in three stages by the inverse quantization unit having the structure of FIG. 9. In FIG. 10, reference numeral 705 denotes a third inverse quantization unit. The third inverse quantization unit 705 performs decoding using the indices from the third sub-quantization unit 503. Accordingly, the output IND21' from the first low-band-component inverse quantization unit 701, the output IND3' from the second inverse quantization unit 704, the output IND22' from the first intermediate-band-component inverse quantization unit 702, and the output IND4' from the third inverse quantization unit 705 are added and their sum is output from the inverse quantization unit 106. This addition is performed to the same band as the band quantized by each sub-quantization unit in the quantization.

Figure 11:
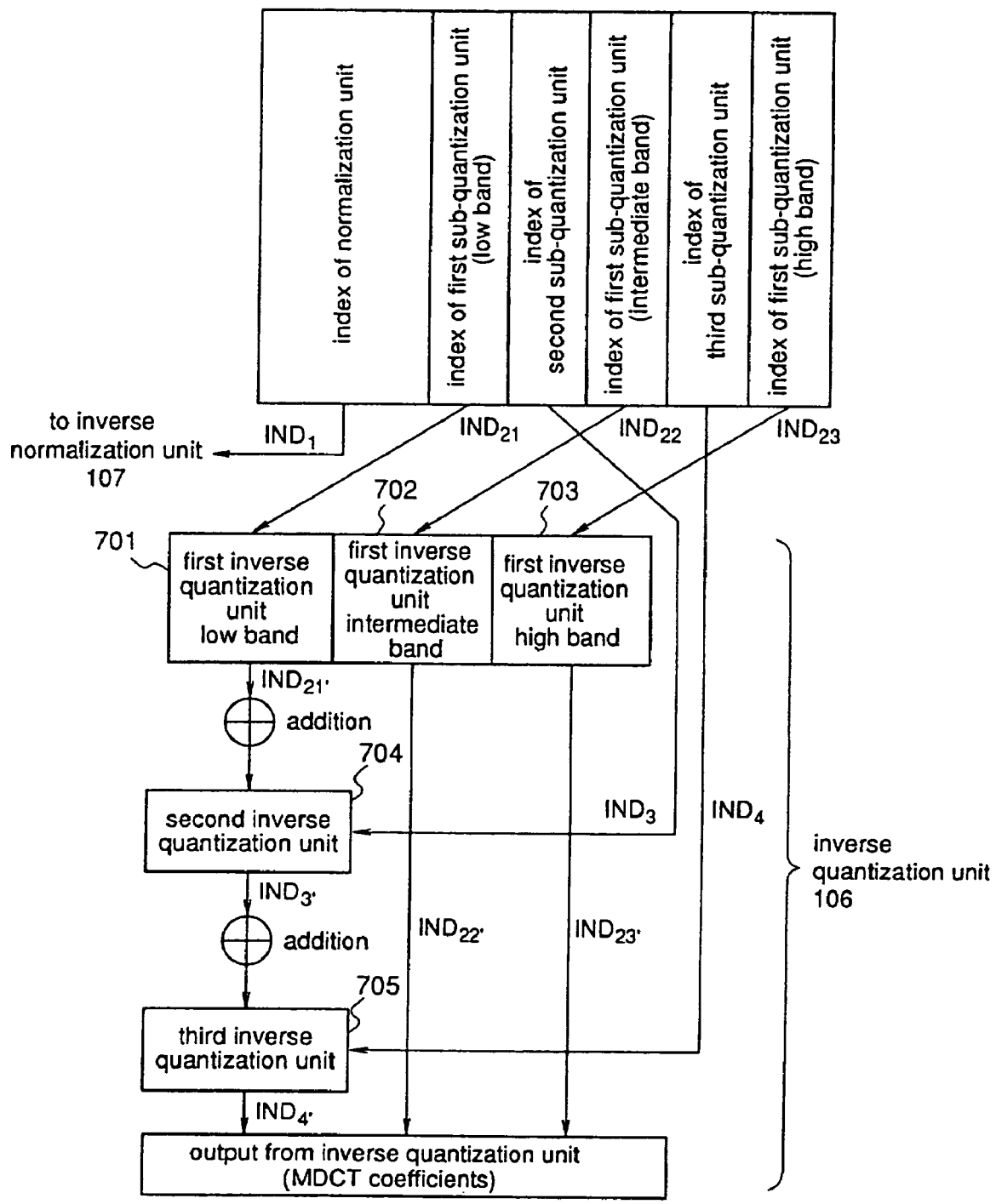
FIG. 11 is a block diagram illustrating a further example of an inverse quantization unit as a constituent of the above-described audio signal decoding apparatus, according to the fourth embodiment of the present invention.

Further, FIG. 11 is a diagram illustrating the structure of the inverse quantization unit included in the audio signal decoding apparatus, in which the object band to be processed is extended when the three-stage inverse quantization is carried out in the inverse quantization unit having the structure of FIG. 10. In FIG. 11, reference numeral 703 denotes a first high-band-component inverse quantization unit. This first high-band-component inverse quantization unit 703 performs decoding using the indices of the high-band component from the first sub-quantization unit 501. Accordingly, the output IND21' from the first low-band-component inverse quantization unit 701, the output IND3' from the second inverse quantization unit 704, the output IND22' from the first intermediate-band-component inverse quantization unit 702, the output IND4' from the third inverse quantization unit 705, and the output IND23' from the first high-band-component inverse quantization unit 703 are added and their sum is output from the inverse quantization unit 106. This addition is performed to the same band as the band quantized by each sub-quantization unit in the quantization.

While this fourth embodiment is described for the case where the decoding unit 106 inversely decodes the data quantized by the quantization unit 105 having the structure of FIG. 5, similar inverse quantization can be performed even when the quantization unit 105 has the structure shown in FIG. 4 or 6.

Figure 15:
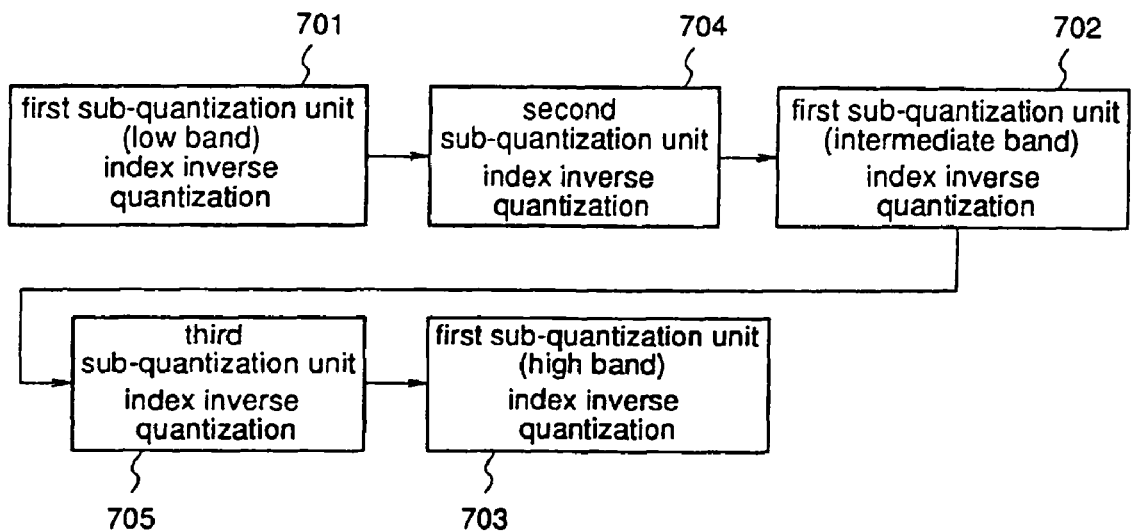
FIG. 15 is a diagram for explaining the operation of the inverse quantization procedure by the inverse quantization unit according to the fourth embodiment.

Furthermore, when coding is carried out using the quantization unit having the structure shown in FIG. 5 and decoding is carried out using the inverse quantization unit having the structure shown in FIG. 11, as shown in FIG. 15, after the low-band indices from the first sub-quantization unit are inversely quantized, the indices from the second sub-quantization unit 502 in the next stage are inversely quantized, and then the intermediate-band indices from the first sub-quantization unit are inversely quantized. In this way, the inverse quantization to extend the band and the inverse quantization to reduce the quantization error are alternatingly repeated. However, when a signal coded by the quantization unit having the structure shown in FIG. 4 is decoded using the inverse quantization unit having the structure shown in FIG. 11, since there is no divided bands in the structure of FIG. 4, the quantized coefficients are successively decoded by the inverse quantization unit in the next stage.

Figure 14:
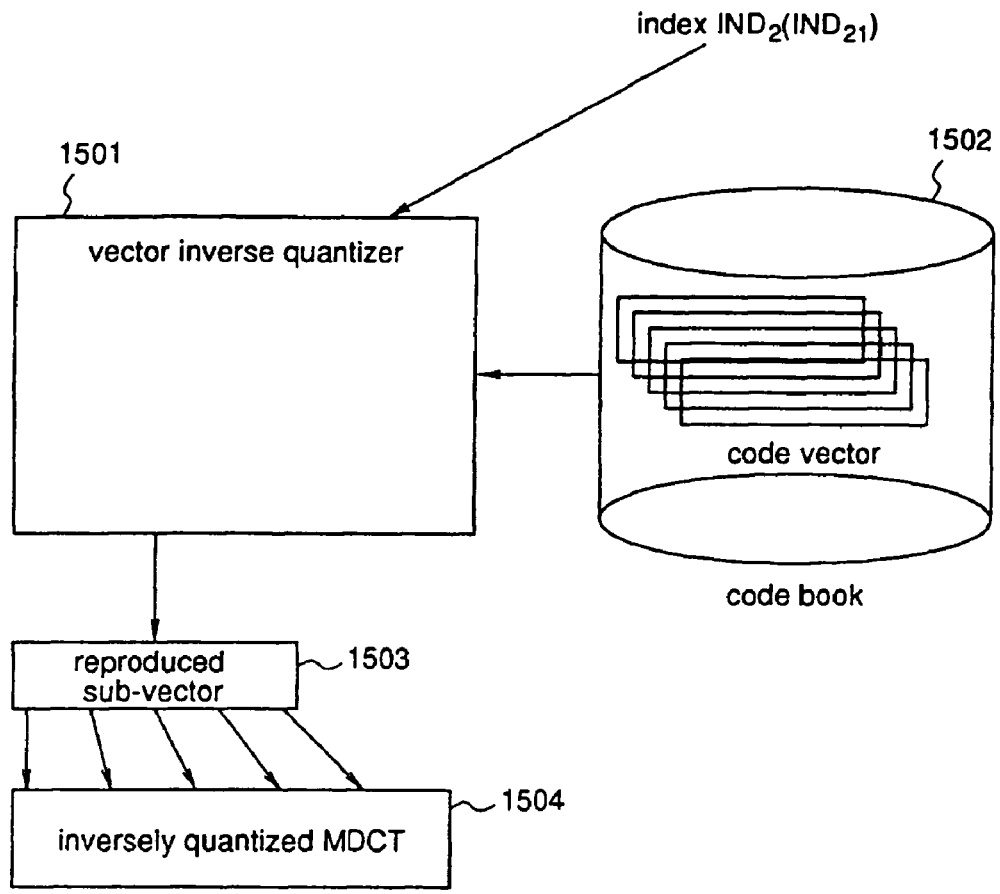
FIG. 14 is a diagram for explaining the detailed operation of the inverse quantization unit in the decoding apparatus.

A description is given of the detailed operation of the inverse quantization unit 106 as a constituent of the audio signal decoding apparatus 2, using FIG. 1 and FIG. 14. For example, the inverse quantization unit 106 is composed of the first low-band inverse quantization unit 701 when it has the inverse quantization unit shown in FIG. 7, and it is composed of two inverse quantization units, i.e., the first low-band inverse quantization unit 701 and the second inverse quantization unit 704, when it has the inverse quantization unit shown in FIG. 8.

The vector inverse quantizer 1501 reproduces the MDCT coefficients using the indices IND2 from the vector quantization unit 105 in the coding apparatus 1. When the sub-quantization unit has the structure shown in FIG. 7, inverse quantization is carried out as follows. An index number is decoded from the indices IND21, and a code vector having the number is selected from the code book 1502. It is assumed that the content of the code book 1502 is identical to that of the code book of the coding apparatus 1. From the selected code vector, a reproduced sub-vector 1503 is obtained, and this becomes an inversely quantized MDCT coefficient (i,j) 1504 in the inverse process of formula (12).

When the sub-quantization unit has the structure shown in FIG. 8, inverse quantization is carried out as follows. An index number k is decoded from the indices IND21 and IND3, and a code vector having the number u calculated in formula (17) is selected from the code book 1502.

$$u = \begin{cases} k & 0 \leq k < K \\ k - K & K \leq k < 2K \end{cases} \quad (17)$$

A reproduced sub-vector is generated using formula (18).

$$resi(j) = \begin{cases} C_u(j) & u = k \\ -C_u(j) & u \neq k \end{cases} \quad (18)$$

wherein the j-th element of the i-th reproduced sub-vector is res(j).

Figure 12:
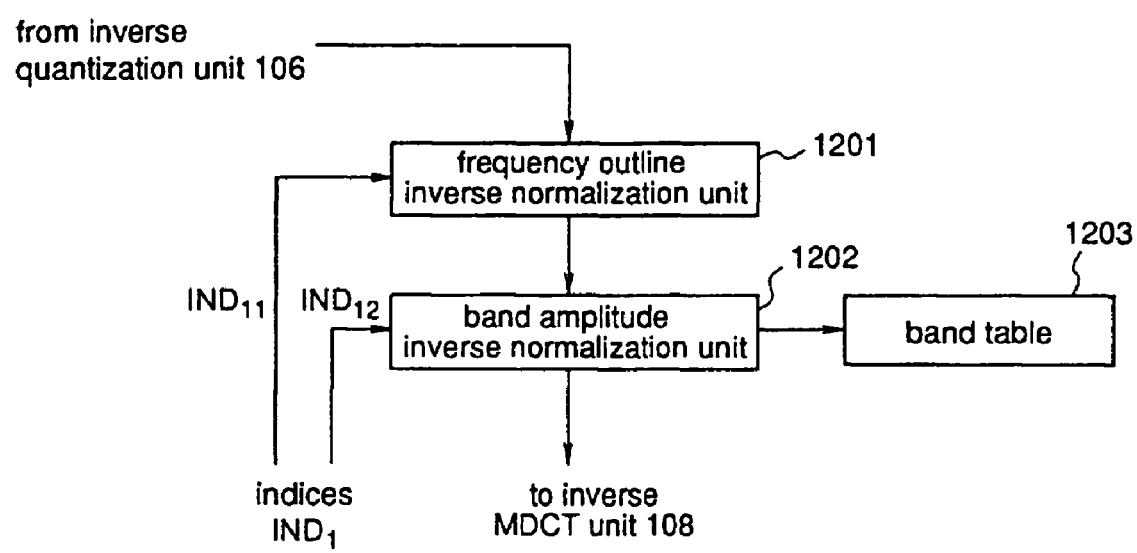
FIG. 12 is a block diagram illustrating an embodiment of an inverse normalization unit.

Next, a description is given of the detailed structure of the inverse normalization unit 107 as a constituent of the audio signal decoding apparatus 2, using FIG. 1 and FIG. 12. In FIG. 12, reference numeral 1201 denotes a frequency outline inverse quantization unit, 1202 denotes a band amplitude inverse normalization unit, and 1203 denotes a band table. The frequency outline inverse normalization unit 1201 receives the indices IND11 from the frequency outline normalization unit 201, reproduces the frequency outline, and multiplies the output from the inverse quantization unit 106 by the frequency outline. The band amplitude inverse normalization unit 1202 receives the indices IND12 from the band amplitude normalization unit 202, and restores the amplitude of each band shown in the band table 1203, by multiplication. Assuming that the value of each band restored using the indices IND12 from the band amplitude normalization unit 202 is qavej, the operation of the band amplitude inverse normalization unit 1202 is given by formula (19).

$$dct(i) = n\_dct(i) \cdot qave_j \quad bj\text{low} \leq i \leq bj\text{high} \quad (19)$$

wherein the output from the frequency outline inverse normalization unit 1201 is n_dct(i), and the output from the band amplitude inverse normalization unit 1202 is dct(i). In addition, the band table 1203 and the band table 203 are identical.

Figure 16:
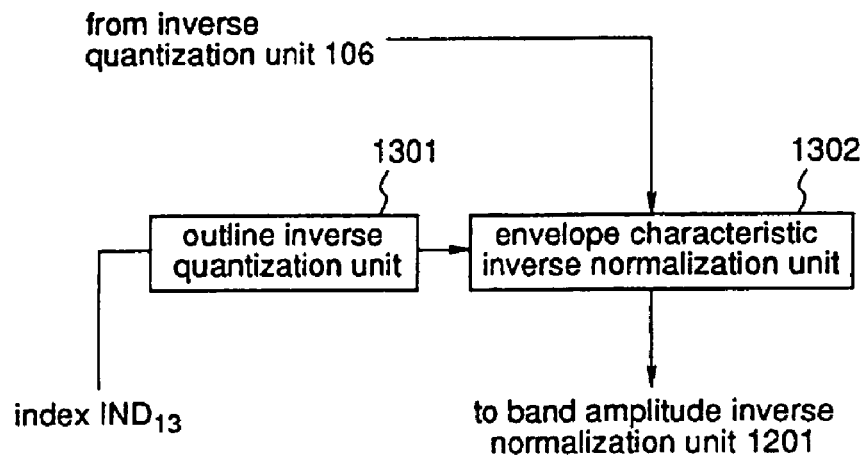
FIG. 16 is a block diagram illustrating an embodiment of a frequency outline inverse quantization unit.
Figure 17:
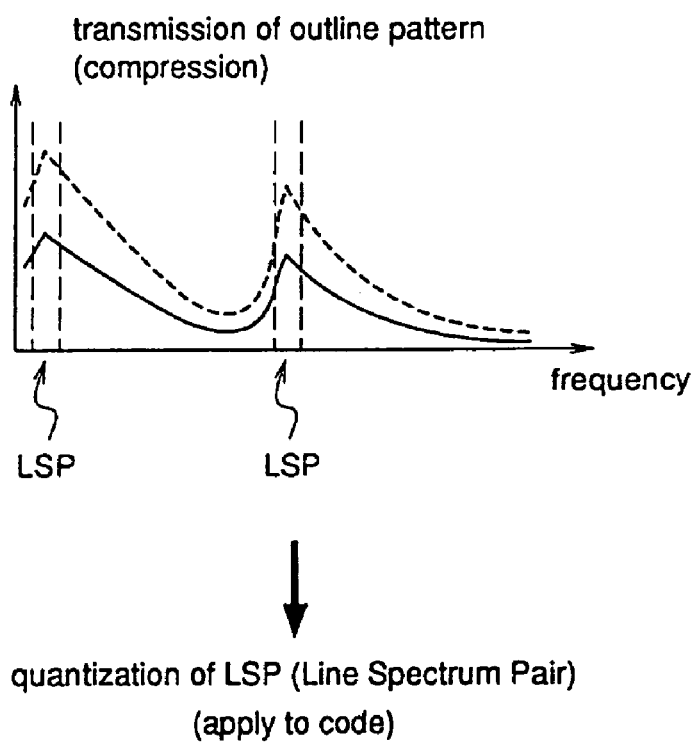
FIG. 17 is a diagram for explaining a quantization method employed in the audio signal coding apparatus according to the prior art and the present invention.

Next, a description is given of the detailed structure of the frequency outline inverse normalization unit 1201 as a constituent of the audio signal decoding apparatus 2, using FIG. 16. In FIG. 16, reference numeral 1301 designates an outline inverse quantization unit, and 1302 denotes an envelope characteristic inverse quantization unit. The outline inverse quantization unit 1301 restores parameters showing the frequency outline, for example, linear prediction coefficients, using the indices IND13 from the outline quantization unit 301 in the coding apparatus 1. When the restored coefficients are linear prediction coefficients, the quantized envelope characteristics E13 are restored by calculating them similarly in formula (8). When the restored coefficients are not linear prediction coefficients, for example, when they are LSP coefficients, the envelope characteristics E13 are restored by transforming them to frequency characteristics. The envelope characteristic inverse quantization unit 1302 multiplies the restored envelope characteristics E13 by the output IND16 from the inverse quantization unit 106 as shown in formula (20), and outputs the result toward the band amplitude inverse normalization unit 1201.

$$mdct(i) = fdct(i) \cdot env(i) \quad (20)$$

According to the fourth embodiment described above, a normalization means is provided before the quantization means, and normalization of an input audio signal is carried out before quantization. Therefore, the normalization means and the quantization means perform coding while exhibiting their full abilities, resulting in quantization of high efficiency, with less quantization error, without losing the data quantity possessed by the original audio signal. Further, when the data quantity at the receiving end is limited, inverse quantization is carried out only in a narrow band and a shallow region. However, by expanding the inverse quantization alternately in the direction to broaden the band and the direction to increase the depth of the inverse quantization to increase the data quantity at the receiving end, a desired quantity of data of the coded audio signal can be decoded regardless of the quantity of data transmitted from the coding apparatus 1. Accordingly, by varying the quantity of data to be decoded according to the communication environment or the like on the receiving end, high-definition sound quality can be obtained stably even when an ordinary public telephone network is used.

Embodiment 5

Next, an audio signal coding apparatus according to a fifth embodiment of the present invention will be described using FIG. 18. In this fifth embodiment, since only the structure of the quantization unit 105 in the coding apparatus 1 is different from those of the above-mentioned embodiments, only the structure of the quantization unit will be described, and description for other constituents is omitted.

Figure 18:
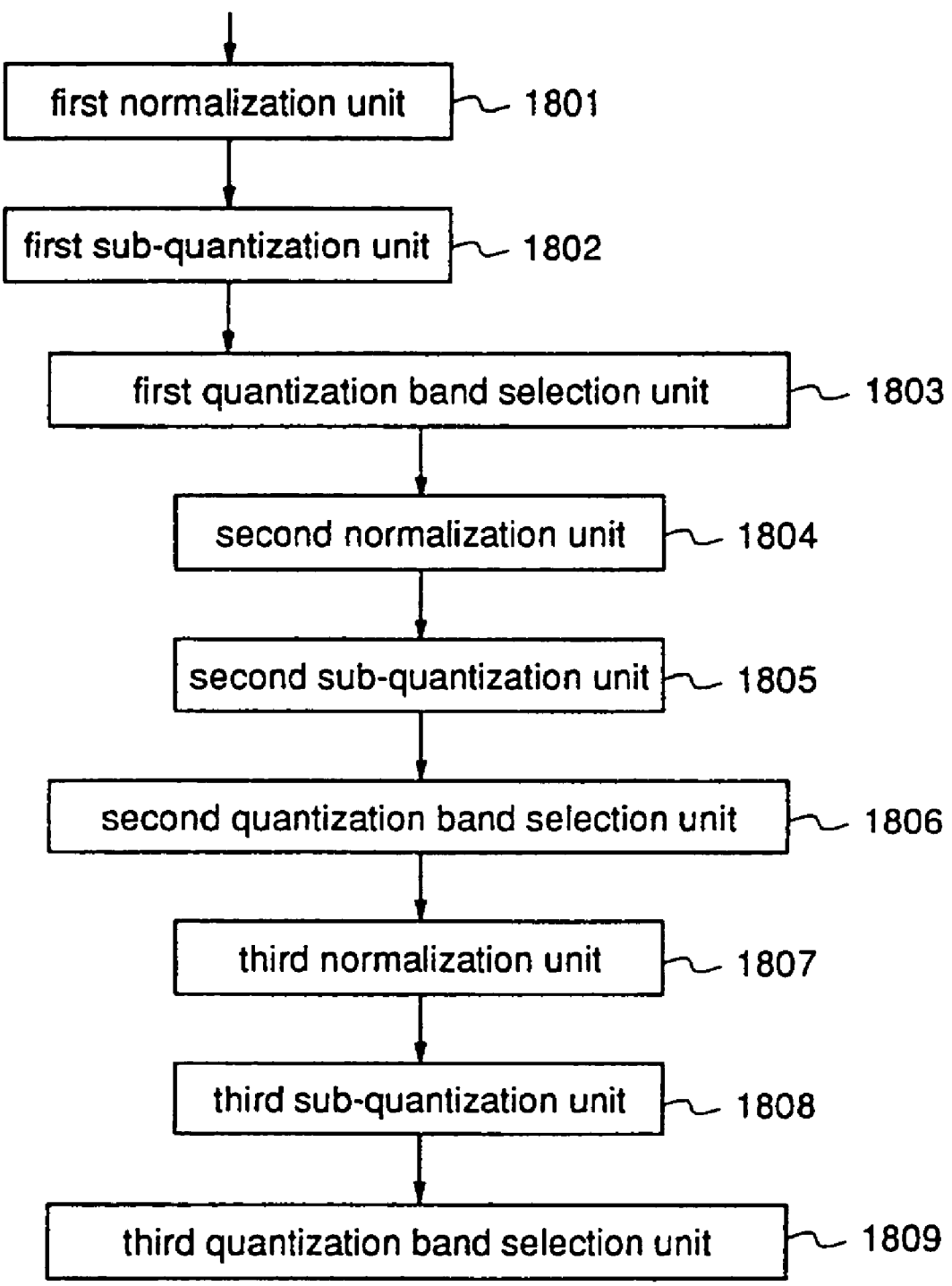
FIG. 18 is a block diagram illustrating a quantization unit in an audio signal coding apparatus according to a fifth embodiment of the present invention.

In FIG. 18, reference numeral 1801 denotes a first normalization unit, 1802 denotes a first sub-quantization unit, 1803 denotes a first quantization band selection unit, 1804 denotes a second normalization unit, 1805 denotes a second sub-quantization unit, 1806 denotes a second quantization band selection unit, 1807 denotes a third normalization unit, 1808 denotes a third sub-quantization unit, and 1809 denotes a third quantization band selection unit.

This fifth embodiment is different, in structure, from the third embodiment in that the second and third normalization units 1804 and 1807 are added.

Next, the respective constituents of the fifth embodiment will be described. The first, second, and third normalization units 1801, 1804, and 1807 are implemented by the same structure as the normalization unit 104 according to the first embodiment. The first, second, and third sub-quantization units 1802, 1805, and 1808 are implemented by the same structure as the first sub-quantization unit 601 according to the third embodiment. The first, second, and third quantization band selection units 1803, 1806, 1809 are implemented by the same structure as the first quantization band selection unit 602 according to the third embodiment. While in this fifth embodiment the coding apparatus has three sets of combinations each comprising a normalization unit, a sub-quantization unit, and a quantization band selection unit, the number of the sets is not restricted to three, it may be four or more, or it may be two. Further, the quantization band selection unit of the set in the final stage is not always necessary, i.e., it can be dispensed with.

Next, a description is given of the operation of the coding apparatus according to the fifth embodiment shown in FIG. 18.

In FIG. 18, MDCT coefficients of an audio signal input to the fifth embodiment are subjected to normalization in the first normalization unit 1801, and normalized MDCT coefficients are output. The first sub-quantization unit 1802 quantizes the normalized MDCT coefficients corresponding to a signal output from the first normalization unit 1801. The first sub-quantization unit 1802 outputs, as indices, parameters used for the quantization and, further, it outputs a quantization error generated in the quantization, toward the quantization band selection unit 1803 in the next stage. The first quantization band selection unit 1803 calculates a band, of which MDCT coefficients are to be quantized by the second sub-quantization unit 1805, using the output from the first sub-quantization unit 1802.

The second normalization unit 1804 normalizes the MDCT coefficients output from the first sub-quantization unit 1802, on the basis of the result selected by the first quantization band selection unit 1803, with respect to the selected band. The second sub-quantization unit 1805 quantizes the output from the second normalization unit 1804 and outputs, as indices, parameters used for the quantization, and a quantization error generated in the quantization. The second quantization band selection unit 1806 calculates a band, of which MDCT coefficients are to be quantized by the third sub-quantization unit 1808, using the output from the second sub-quantization unit 1805.

The third normalization unit 1807 normalizes the MDCT coefficients output from the second sub-quantization unit 1805, on the basis of the result selected by the second quantization band selection unit 1806, with respect to the selected band. The third sub-quantization unit 1808 quantizes the output from the third normalization unit 1807 and outputs, as indices, parameters used for the quantization, and a quantization error generated in the quantization.

The third quantization band selection unit 1809 shown in the figure is needed only when there is a fourth sub-quantization unit (not shown) in the subsequent stage. If the fourth sub-quantization unit is present, the third quantization band selection unit 1809 calculates a band, of which MDCT coefficients are to be quantized by the fourth sub-quantization unit, using the output from the third sub-quantization unit 1808. The first, second, and third normalization units 1801, 1804, and 1807 output, as indices, parameters used for normalization, like the normalization unit 105 according to the first embodiment.

Hereinafter, the operation and functional feature of the coding apparatus according to the fifth embodiment will be described in comparison with the coding apparatuses according to the first to third embodiments.

Figure 20A:
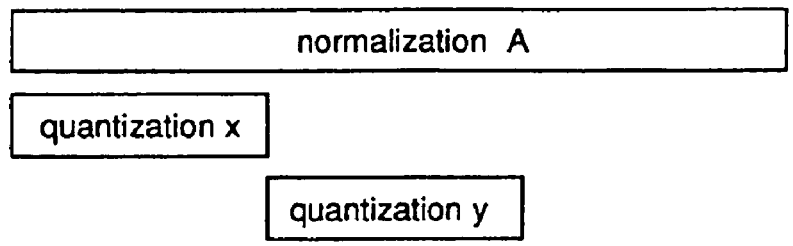
FIG. 20 is a diagram illustrating the outline structures of the audio signal coding apparatuses according to the first to third embodiments (20(a)) and the fifth embodiment (20(b), (c)) of the present invention.

In the structure having a normalization means in an audio signal coding apparatus according to any of the first to third embodiments, as shown in FIG. 19(a), an audio signal waveform on the time axis is transformed to a waveform on the frequency axis by MDCT, FFT, and the normalization means performs normalization A, i.e., outline extraction and division of the extracted outline by an amplitude value, for the entire frequency domain of the waveform on the frequency axis as shown in FIG. 20(a). Thereafter, the normalized output is subjected to quantization x,y,z for each of three frequency domains, i.e., low-band, intermediate-band, and high-band which are obtained by dividing the entire frequency domain, respectively, whereby a quantized output, A(x+y+z), is obtained.

Figure 20B:
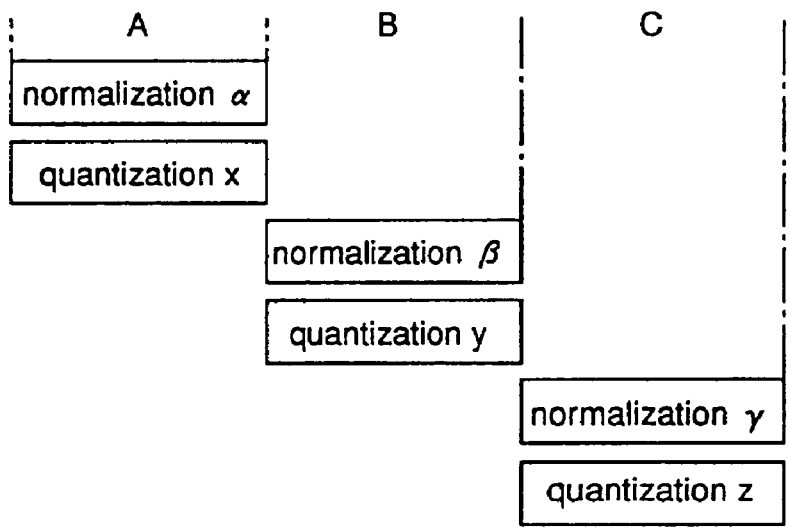
Figure 21:
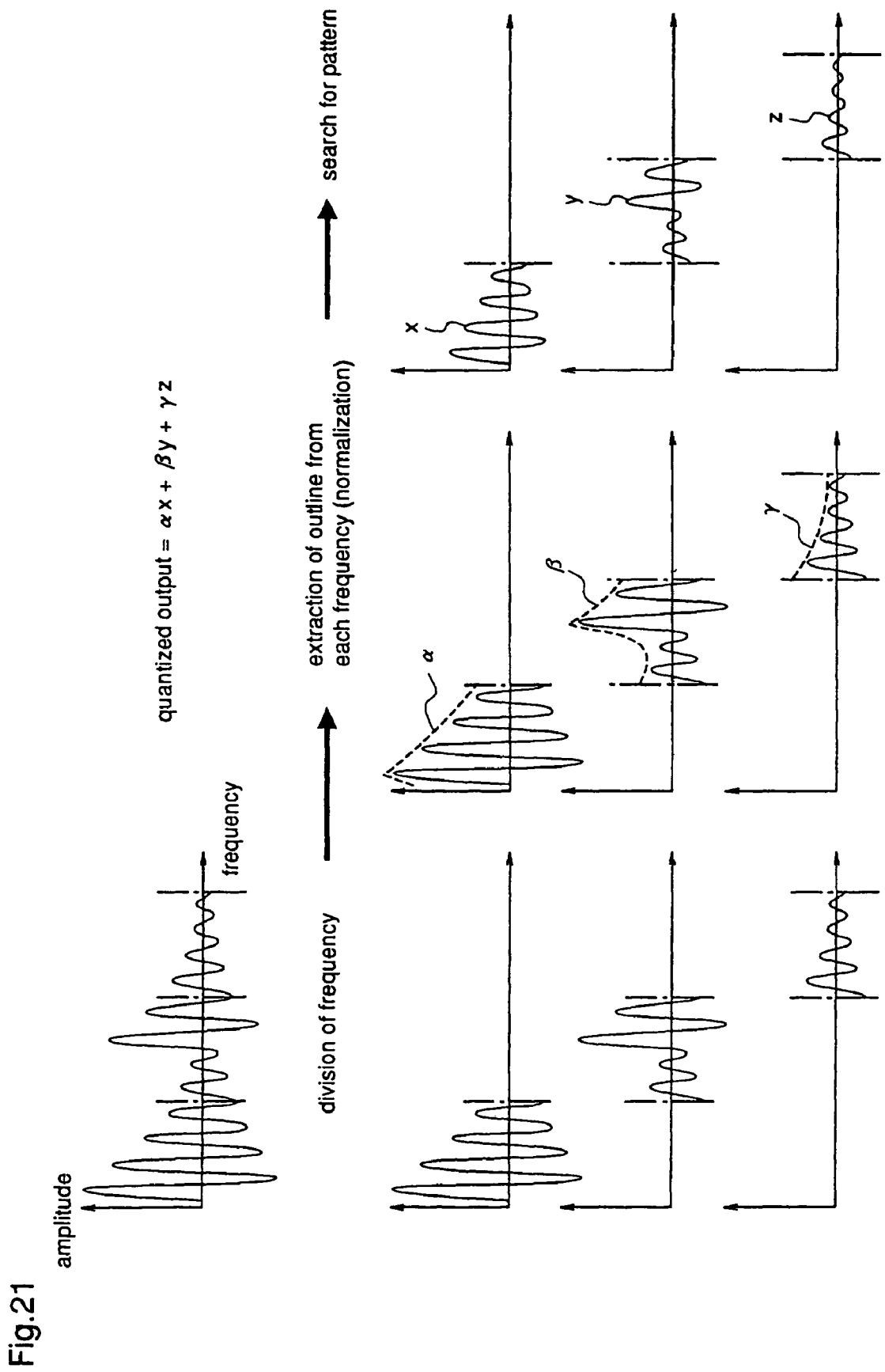
FIG. 21 is a waveform diagram for explaining the entire operation of the audio signal coding apparatus according to the fifth embodiment of the present invention.

On the other hand, in this fifth embodiment, as shown in FIG. 20(b), normalization means $\alpha$, $\beta$, and $\gamma$ are placed before the divided quantization means, respectively, and initially, as shown in FIG. 19(d), a waveform on the frequency axis is divided into a plurality of frequency bands. Thereafter, normalization and quantization are performed for each of the frequency bands and, as the result, a quantized output, $\alpha x+\beta y+\gamma z$, is obtained. The entire process is shown in FIG. 21.

Generally, when there is a considerable polarization of frequency characteristics of an audio signal, for example, when it is a signal of which frequency concentrates in the low-band like voice information, if this signal is entirely and roughly normalized, a characteristic portion in the low band cannot be preponderantly normalized and quantized. Namely, the entire and rough normalization does not take an envelope of a portion of the signal where the signal change is small, so that data in the portion where the signal change is small are lost. Therefore, when quantization is performed after such normalization, even though the quantizer exhibits its full ability, it merely performs quantization to the signal which does not have data in the portion where the signal change is small, i.e., it performs meaningless quantization. In other words, the quantizer performs quantization in which the effect by the normalization and the quantization combined is hardly obtained. As long as a normalization means is provided, it is desirable that both of the normalization means and the quantization means exhibit their full abilities. In contrast with this, when a very rough signal is input, even though all of this signal is roughly normalized, the result does not differ very much.

FIG. 20(a) shows the relationship between the normalization means and each quantization means in the audio signal coding apparatus having the normalization unit 104 shown in FIG. 1, according to any of the first to third embodiments. In such structure that the normalization means A normalizes the whole of frequency characteristic signal sequence of an input audio signal, when the input audio signal is a signal having a polarization with respect to frequency, for example, a signal of which frequency concentrates in the low-band, both of the normalization means and the quantization means cannot exhibit their full abilities.

In contrast with this, in the structure according to the fifth embodiment wherein the quantization means x, y, and z are provided with the previous-stage normalization means $\alpha$, $\beta$, and $\gamma$, since normalization is carried out for each object signal to be quantized by each quantization means, each normalization means performs appropriate normalization with regard to the load of each quantization means which performs quantization, i.e., normalization in which the level of signal to be quantized is brought to the level at which each quantization means can exhibit its full ability, whereby the maximum effect by the normalization means and the quantization means combined is provided.

To be specific, the structures of the normalization unit and the quantization unit in the coding apparatus according to the fifth embodiment are as shown in FIG. 20(b). Initially, for a coefficient stream in a frequency band A which is obtained by dividing a frequency characteristic signal sequence obtained by frequency transformation of an input audio signal or by dividing the frequency band of the frequency characteristic signal sequence, normalization and quantization are performed by the first-stage normalization means $\alpha$ and quantization means x. Then, by the second-stage normalization means $\beta$ and quantization means y, a coefficient stream in a frequency band B adjacent to the coefficient stream of the first-stage frequency band A is subjected to normalization and quantization. Further, by the third-stage normalization means $\gamma$ and quantization means z, a coefficient stream in a frequency band C adjacent to the coefficient stream of the frequency band B is subjected to normalization and quantization.

Figure 20C:
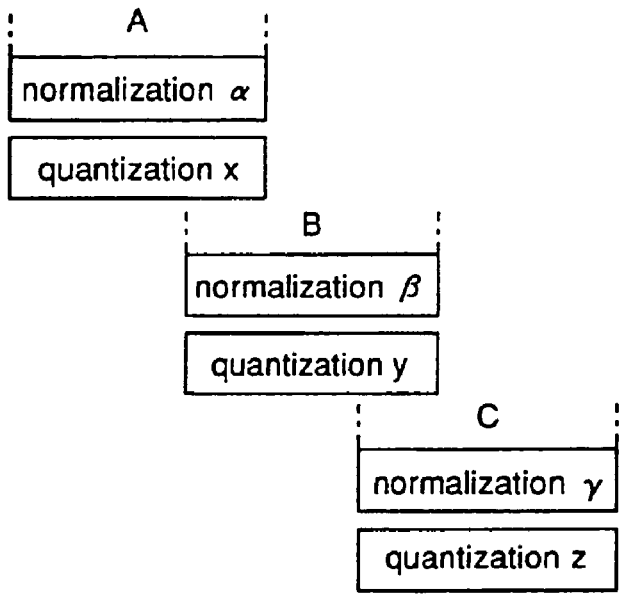

Alternatively, as shown in FIG. 20(c), the second-stage normalization means $\beta$ and quantization means y perform normalization and quantization for the frequency band B which is adjacent to and partially overlapped with the first-stage frequency band A so that the quantization error output from the first stage is normalized and quantized in the overlapped portion while the coefficient stream of the frequency band B of the frequency characteristic signal sequence is normalized and quantized in the other portion; and the third-stage normalization means $\gamma$ and quantization means z perform normalization and quantization for the frequency band C which is adjacent to and partially overlapped with the second-stage frequency band B so that the quantization error output from the second stage is normalized and quantized in the overlapped portion while the coefficient stream of the frequency band C of the frequency characteristic signal sequence is normalized and quantized in the other portion.

In the structure shown in FIG. 20(b) or 20(c), since normalization is carried out before each quantization by each quantization means, each normalization means performs normalization with regard to the load of each quantization means, whereby each normalization means and each quantization means can perform quantization while exhibiting their full abilities, resulting in significantly improved quantization efficiency.

The frequency bands processed by the normalization and quantization means in the respective stages and the quantization depths are not restricted to those shown in FIGS. 20(b) and 20(c). These bands and depths may be adjusted arbitrarily.

Figure 22:
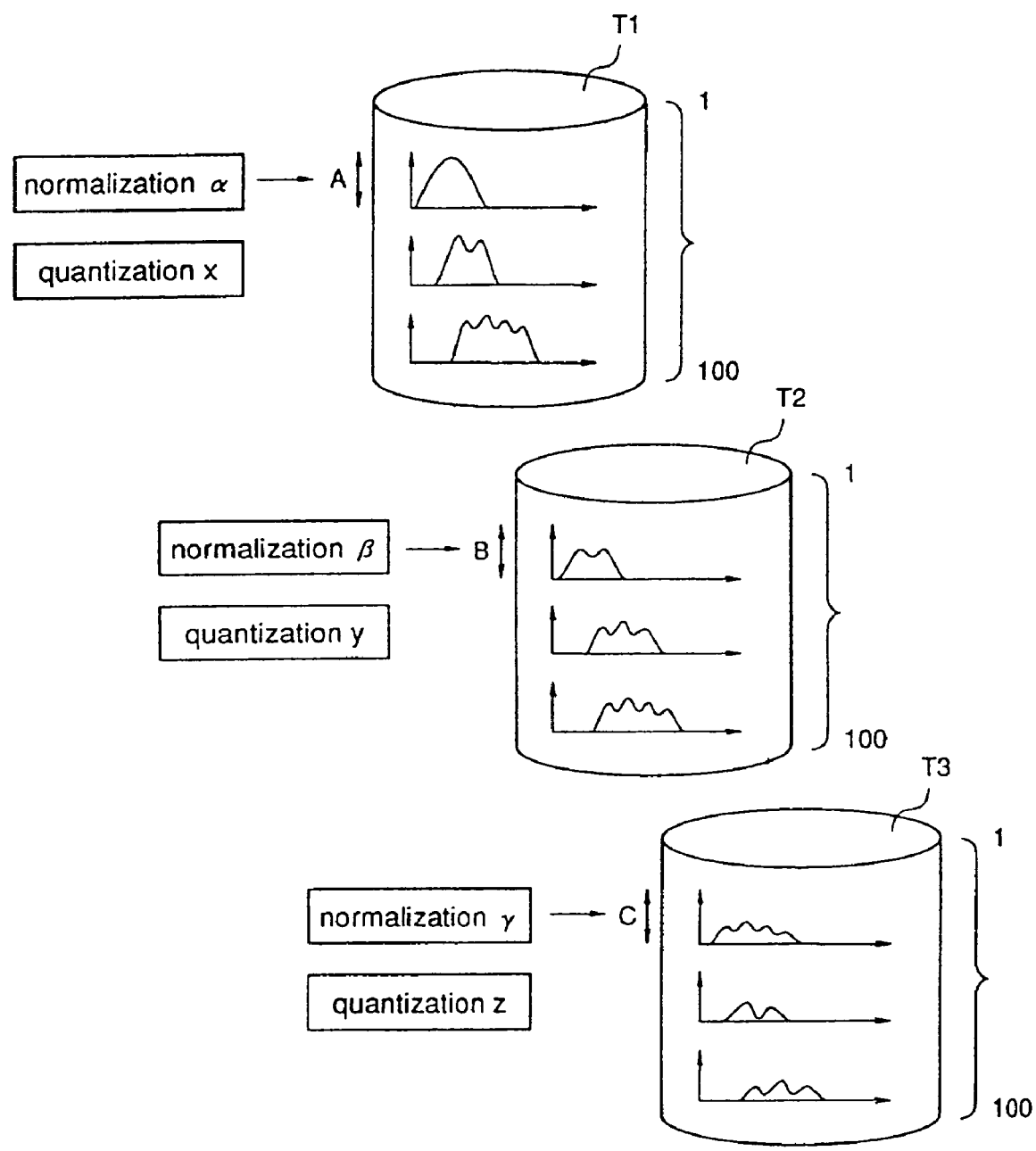
FIG. 22 is a diagram for explaining an example of normalization and quantization method by the first-stage to third-stage normalization and quantization means in the audio signal coding apparatus according to the fifth embodiment of the present invention.

Next, a description is given of an example of normalization and quantization method by the first-stage to third-stage normalization and quantization means, using FIGS. 18 and 22.

In this fifth embodiment, although the first, second, and third normalization units 1801, 1804, and 1807 are implemented by the same structure as the normalization unit 104 according to the first embodiment, these units may be implemented using a normalization parameter calculating method other than mentioned above. For example, the normalization units may be constructed using, as normalization parameters, LPC coefficients or LSP coefficients directly calculated from MDCT coefficients input to the respective normalization units. In FIG. 22, T1, T2, and T3 are tables for normalization used by the respective normalization means $\alpha$, $\beta$, and $\gamma$, and these tables are obtained in the following manner.

For MDCT coefficients of various kinds of sound source signals which can be input as an input audio signal, LPC (Linear Predictive Coding) analysis is performed to obtain LSP (Line Spectrum Pair) coefficients. This operation is repeated for each sound source, and LSP coefficients are obtained for all frames. Then, all the LSP coefficients are collected and subjected to cluster analysis to obtain a plurality of representative envelope patterns, and these envelope patterns are used as the normalization table T1 for the first-stage normalization means $\alpha$.

Using the plural envelope patterns so obtained, first-stage normalization and quantization are carried out, and the output from the first stage is subjected to the same process as the above-described process from the LPC analysis to obtain a plurality of envelope patterns, and these envelope patterns are used as the normalization table T2 for the second-stage normalization means $\beta$.

Thereafter, the normalization table T3 for the third-stage normalization means $\gamma$ is obtained in the same manner as described above.

In this way, the normalization tables T1, T2, and T3 for the normalization means are obtained, which tables enables the respective quantization means in the first to third stages to perform optimum quantization in which normalization and quantization exhibit their full abilities, with regard to the load of each quantization means.

In the audio signal coding apparatus so constructed, when an audio signal, which can be considered as being composed of various kinds of sound source signals, is input to this apparatus, the input audio signal is transformed from data on the time axis to data on the frequency axis by MDCT, FFT, as shown in FIGS. 19(*a*) through 19(*b*). The signal transformed to the data on the frequency axis is subjected to outline extraction as shown in FIGS. 19(*b*) through 19(*c*). This outline extraction is performed using the normalization table T1 of the first-stage normalization means a, and an outline obtained as the result is made of, for example, about 20 pieces of LSP polynomials. Then, the signal transformed to the data on the frequency axis is divided by the obtained outline, whereby normalization α is performed. After the normalization, the normalized signal is quantized by the quantization means x, thereby completing the first-stage normalization and quantization. As a result, efficient quantization is performed with regard to the features of the various kinds of sound source signals described above.

Next, by the second-stage normalization and quantization means, second-stage normalization and quantization are performed to a coefficient stream of a frequency band B different from a coefficient stream of a frequency band A which is divided from a frequency characteristic signal sequence and subjected to the first-stage normalization and quantization, or to a quantization error output as a result of the first-stage normalization and quantization, using the second-stage normalization table T2. Thereby, efficient quantization is performed with regard to the features of various kinds of sound source signals described above, giving priority to a desired frequency band or to a quantization depth of a desired frequency band portion.

Furthermore, by the third-stage normalization and quantization means, third-stage normalization and quantization are performed to a coefficient stream of a frequency band different from coefficient streams of frequency bands divided from the frequency characteristic signal sequence and subjected to the first-stage and second-stage normalization and quantization, or to a quantization error output as a result of the second-stage normalization and quantization, using the third-stage normalization table T3. Thereby, efficient quantization is performed with regard to the features of various kinds of sound source signals described above, giving priority to a desired frequency band or to a quantization depth of a desired frequency band portion.

As described above, since the normalization α and quantization x, the normalization β and quantization y, and the normalization γ and quantization z in the respective stages are carried out using the normalization table T1, T2, and T3 which are created by the above-described method, it is possible to perform normalization that reduces excessive burden on quantization, according to the characteristic of the object signal to be quantized, whereby the quantization efficiency is significantly improved and the quality at the reproduction end is significantly improved.

Figure 23A:
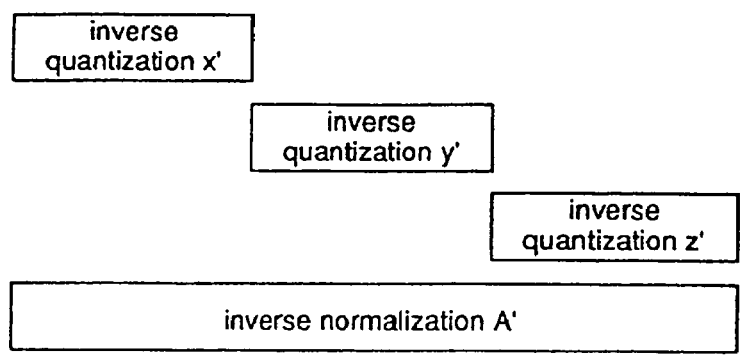
FIGS. 23(a)-23(c) are diagrams for explaining the structure of an audio signal decoding apparatus corresponding to the audio signal coding apparatus according to the fifth embodiment of the present invention.
Figure 23B:
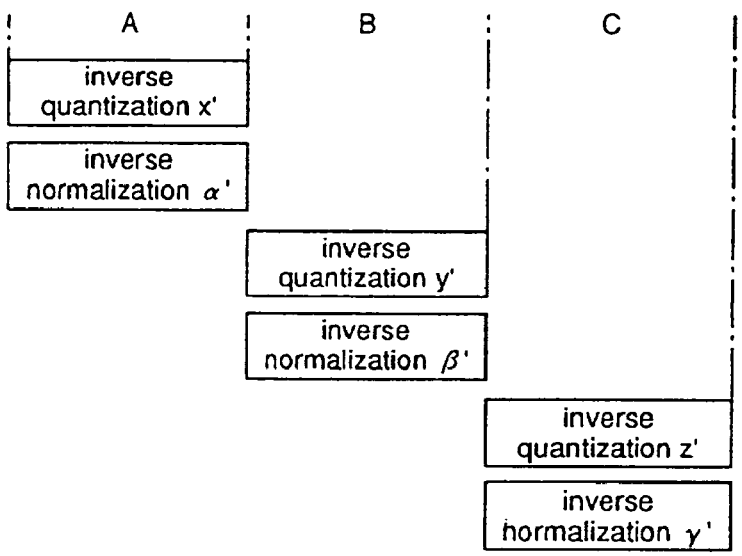
Figure 23C:
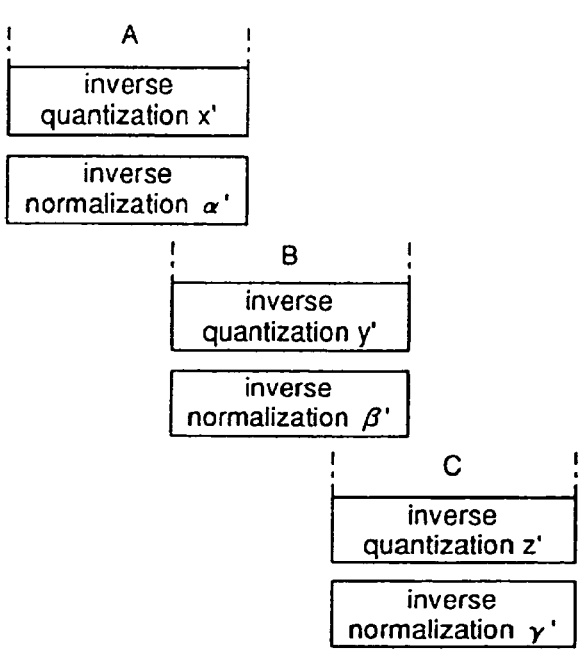
Figure 24:
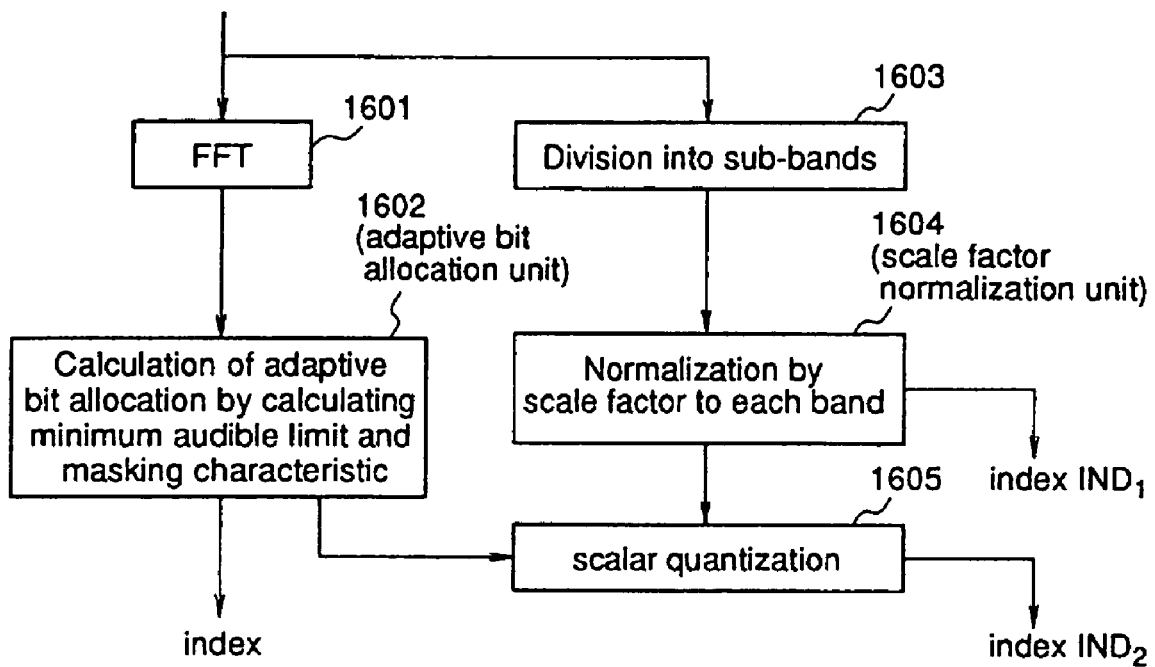
FIG. 24 is a diagram illustrating the structure of the conventional audio signal coding apparatus.

Furthermore, the structure of a decoding apparatus corresponding to the coding apparatus according to the fifth embodiment is shown in FIGS. 23(*b*) and 23(*c*). Corresponding to the structure of the coding apparatus shown in FIGS. 20(*b*) and 20(*c*), it is provided with inverse quantization units x', y', and z' which receive signals output from the respective quantizers of the quantization unit of the audio signal coding apparatus, and reproduce signals corresponding to the coefficient streams of the respective frequency bands into which the frequency characteristic signal sequence is divided; a plurality of inverse normalization units α', β', and γ' which are provided for the respective inverse quantization units, multiply the coefficient streams of the frequency characteristic signal sequence output from the inverse quantization units by normalized components which are reproduced on the basis of codes relating to normalization output from the audio signal coding apparatus, and output signals corresponding to the respective coefficient streams of the frequency characteristic signal sequence before being coded; and an inverse frequency transformation unit (not shown) which receives the outputs from the respective inverse normalization units and outputs a signal corresponding to the original audio signal.

Moreover, when the inverse normalization and inverse quantization in the decoding apparatus are performed directed to, alternately, extending the band to be quantized and increasing the depth of quantization, as described for the fourth embodiment, a desired quantity of data of the coded audio signal can be decoded regardless of the quantity of data transmitted from the coding apparatus. That is, the quantity of data to be decoded can be varied according to the communication environment or the like on the receiving end, and high-definition sound quality can be obtained stably even when an ordinary public telephone network is used.

In this fifth embodiment, each of the first, second, and third quantization band selection units 1803, 1806, and 1809 may be constructed so that it outputs a frequency band to be quantized that is set in advance. In this case, in each of the first, second, and third quantization band selection units 1803, 1806, and 1809, calculation to obtain a band to be quantized is not executed and a previously set frequency band to be quantized is output, whereby the structure is simplified.

Furthermore, each of the first, second, and third quantization band selection units 1803, 1806, and 1809 may be constructed so that it performs band selection using two characteristics, i.e., the minimum audible characteristic in silence and the masking characteristic which makes sounds of frequency components in the vicinity of a specific input frequency component inaudible, in order to obtain, as an output, a frequency band to be quantized, on the basis of the auditive characteristic of human beings.

According to the audio signal coding apparatus of the fifth embodiment, a normalization means is provided before each of quantization means performing multiple-stage quantization, and normalization is performed for each of divided frequencies and for each stage of quantization, followed by quantization. Therefore, normalization for each frequency domain enables appropriate coding according to the quantity of data possessed by the audio signal in each frequency domain, that is, the normalization means and the quantization means perform coding while exhibiting their full abilities, whereby quantization of high efficiency is performed without losing the data quantity possessed by the original audio signal and, therefore, with less quantization error, with the result that high-definition sound quality is obtained stably.

In the first to fifth embodiments, the multiple-stage quantization means has, at least, a first-stage vector quantizer for vector-quantizing the frequency characteristic signal sequence or a portion thereof, and a second-stage vector quantizer for vector-quantizing a quantization error component from the first-stage vector quantizer; and each stage of the multiple-stage quantization means is provided with at least one divided vector quantizer which vector-quantizes a coefficient stream of any of plural frequency bands which are obtained by dividing the frequency characteristic signal sequence into at least two frequency bands which may have an overlapped portion between the plural stages, according to a division manner for each stage. However, each quantization means of the multiple-stage quantization means may be an entire-band vector quantizer that vector-quantizes all of the entire frequency characteristic signal sequence or all of quantization error components from the previous-stage quantization means. Even when multiple-stage quantization is carried out by the entire-band vector quantizer to code an audio signal at a low bit rate, i.e., at a high compression ratio as described above, or even though coding and decoding are carried out without a fixed data quantity, a high-definition sound can be reproduced at the receiving end.

Embodiment 6

Figure 25:
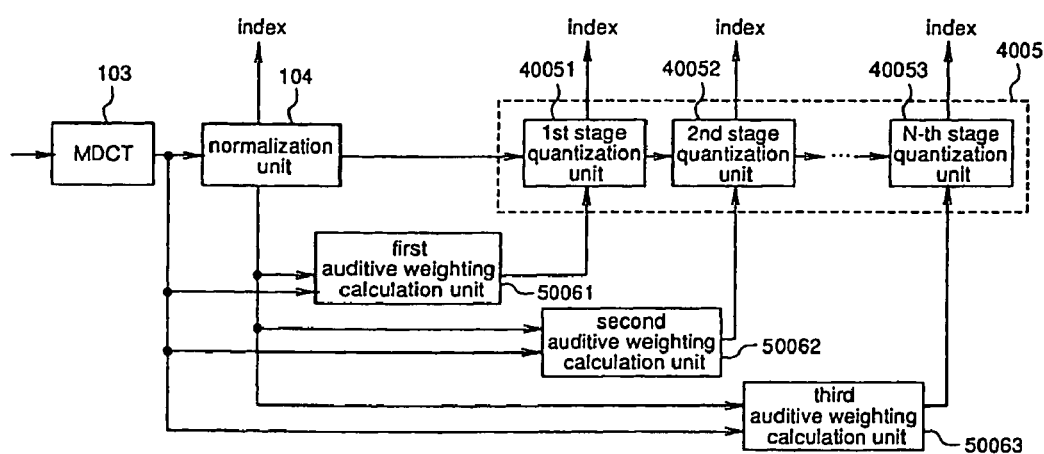
FIG. 25 is a block diagram illustrating the structure of an audio signal coding apparatus according to a sixth embodiment of the present invention.

FIG. 25 is a block diagram illustrating the structure of an audio signal coding apparatus according to a sixth embodiment of the invention. Reference numeral 4005 denotes a multistage quantization unit that performs vector quantization to the frequency characteristic signal sequence (MDCT coefficient stream) leveled by the normalization unit 104. The multistage quantization unit 4005 includes a first stage quantization unit 40051, a second stage quantization unit 40052, . . . , an N-stage quantization unit 40053 which are connected in a column. In FIG. 25, reference numeral 50061 denotes a first auditive weight calculation unit that provides a weighting coefficient to be used by the first stage quantization unit 40051 in the multistage quantization unit 4005, on the basis of the spectrum of the input audio signal, the auditive sensitivity characteristic showing the auditive nature of human beings, and the LPC spectral envelope; 50062 denotes a second auditive weight calculation unit that provides a weighting coefficient to be used by the second stage quantizer 40052 in the multistage quantization means 4005, on the basis of the spectrum of input audio signal, the auditive sensitivity characteristic showing the auditive nature of human beings, and the LPC spectral envelope; and 50063 denotes a third auditive weight calculation unit that provides a weighting coefficient to be used by the N-th stage quantization unit 40053 in the multistage quantization unit 4005, on the basis of the spectrum of input audio signal, the auditive sensitivity characteristic showing the auditive nature of human beings, and the LPC spectral envelope.

In the audio signal coding apparatus according to this sixth embodiment, the plural stages of vector quantizers in the multistage quantization unit 4005 perform quantization using individual weighting coefficients obtained in the first to third auditive weight calculation units 50061, 50062, and 50063, respectively. In this audio signal coding apparatus according to the sixth embodiment, it is possible to perform quantization by weighting according to the frequency weighting characteristic obtained in the auditive weighting units 50061 to 50063 on the basis of the auditive nature so that an error due to quantization in each stage of the multistage quantization unit 4005 is minimized. For example, a weighting coefficient is calculated on the basis of the spectral envelope in the first auditive weighting calculation unit 50061, a weighting coefficient is calculated on the basis of the minimum audible limit characteristic in the second auditive weighting unit 50062, and a weighting coefficient is calculated on the basis of the auditive masking characteristic in the third auditive weighting calculation unit 50063.

As described above, according to the audio signal coding apparatus of the sixth embodiment, since the plural-stages of quantization units 40051 to 40053 in the multistage quantization unit 4005 perform quantization using the individual weighting coefficients obtained in the auditive weight calculation units 50061 to 50063, respectively, efficient quantization can be performed by effectively utilizing the auditive nature of human beings.

Embodiment 7

Figure 26:
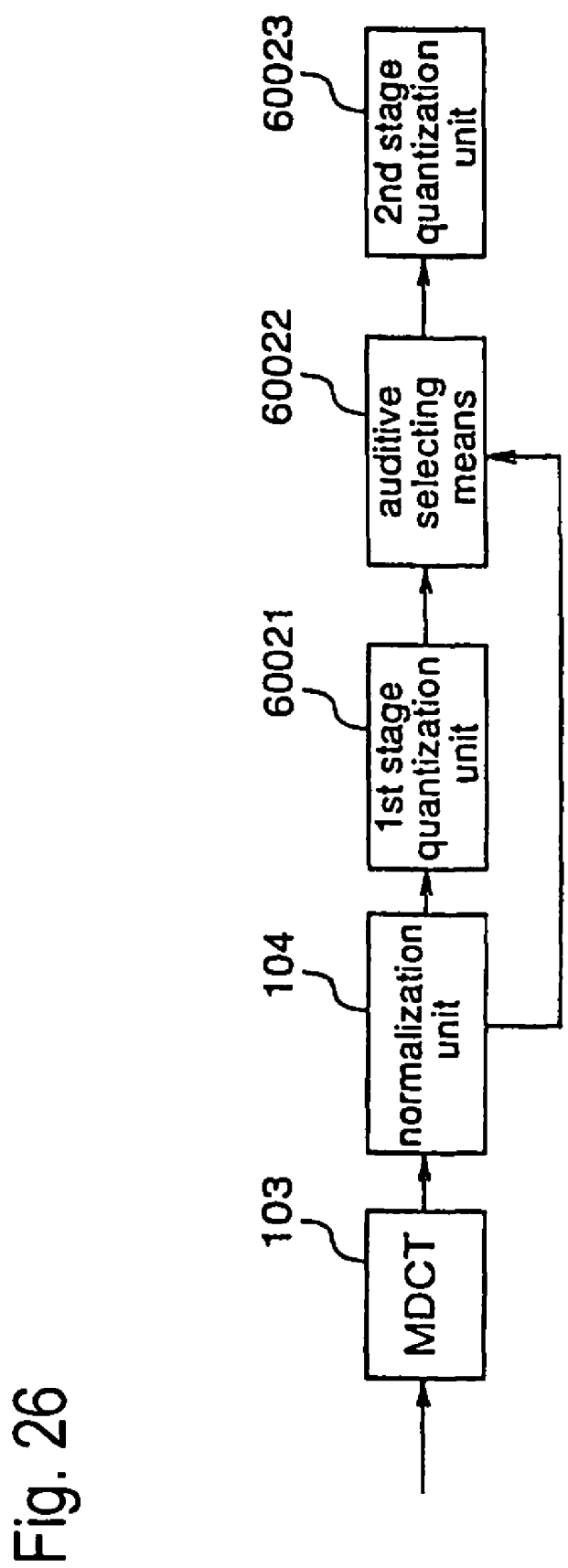
FIG. 26 is a block diagram illustrating the structure of an audio signal coding apparatus according to a seventh embodiment of the present invention.

FIG. 26 is a block diagram illustrating the structure of an audio signal coding apparatus according to a seventh embodiment of the invention. In FIG. 26, reference numeral 60021 denotes a first-stage quantization unit that vector-quantizes a normalized MDCT signal; 60023 denotes a second-stage quantization unit that quantizes a quantization error signal caused by the quantization in the first-stage quantization unit 60021; and 60022 denotes an auditive selection means that selects, from the quantization error caused by the quantization in the first-stage quantization unit 60021, a frequency band of highest importance to be quantized in the second-stage quantization unit 60023, on the basis of the auditive sensitivity characteristic.

A description is given of the operation. The normalized MDCT coefficients are subjected to vector quantization in the first-stage quantization unit 60021. In the auditive selection means 60022, a frequency band, in which an error signal due to the vector quantization is large, is decided on the basis of the auditive scale, and a block thereof is extracted. In the second-stage quantization unit 60023, the error signal of the selected block is subjected to vector quantization. The results obtained in the respective quantization units are output as indices.

Figure 27:
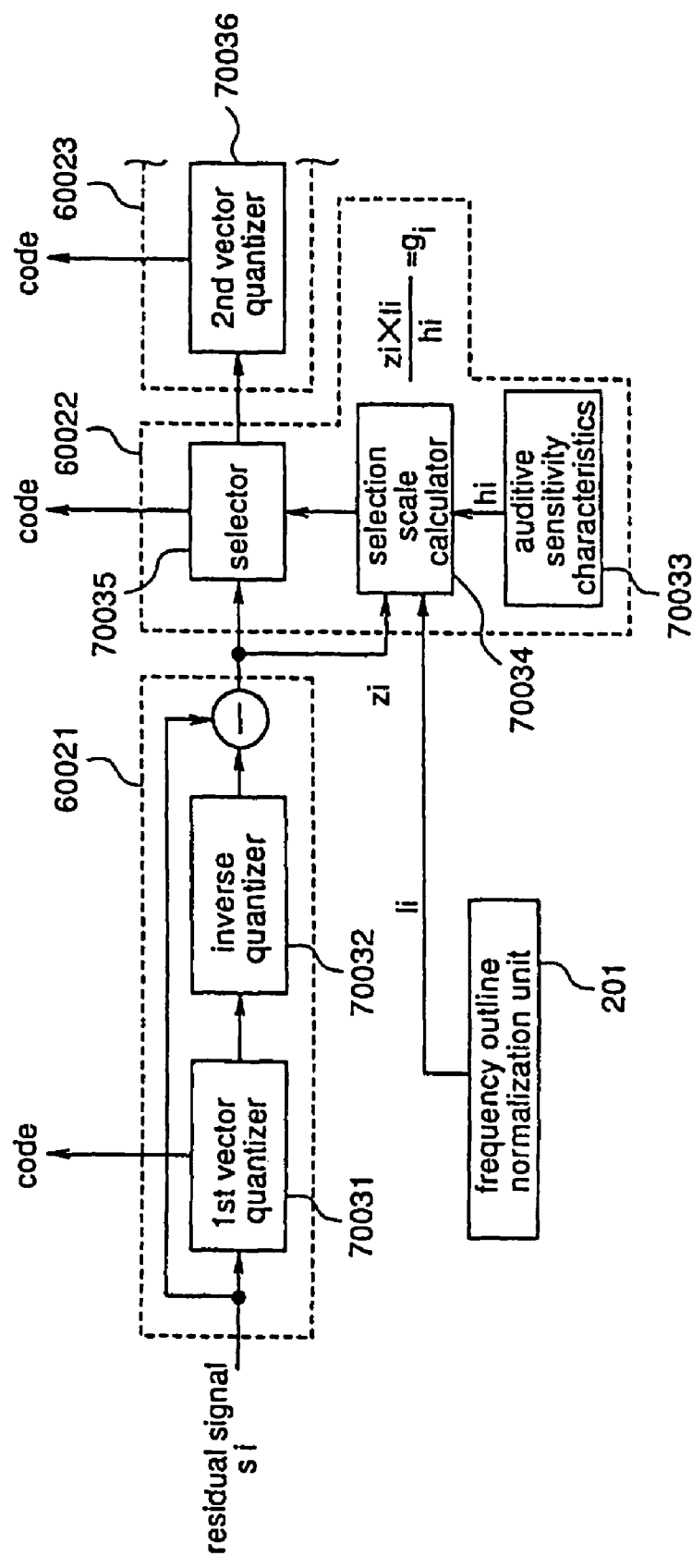
FIG. 27 is a block diagram illustrating the detailed structures of a quantization unit and an auditive selection unit in each stage of the audio signal coding apparatus shown in FIG. 26.

FIG. 27 is a block diagram illustrating, in detail, the first and second stage quantization units and the auditive selection unit, included in the audio signal coding apparatus shown in FIG. 26. In FIG. 27, reference numeral 70031 denotes a first vector quantizer that vector-quantizes the normalized MDCT coefficients; and 70032 denotes an inverse quantizer that inversely quantizes the quantization result of the first quantizer 70031, and a quantization error signal zi due to the quantization by the first quantizer 70031 is obtained by obtaining a difference between the output from the inverse quantizer 70032 and a residual signal si. Reference numeral 70033 denotes auditive sensitivity characteristic hi showing the auditive nature of human beings, and the minimum audible limit characteristic is used here. Reference numeral 70035 denotes a selector that selects a frequency band to be quantized by the second vector quantizer 70036, from the quantization error signal zi due to the quantization by the first quantizer 70031. Reference numeral 70034 denotes a selection scale calculator that calculates a selection scale for the selecting operation of the selector 70035, on the basis of the error signal zi, the LPC spectral envelope li, and the auditive sensitivity characteristic hi.

Next, the selecting operation of the auditive selection unit will be described in detail.

Figure 28A:
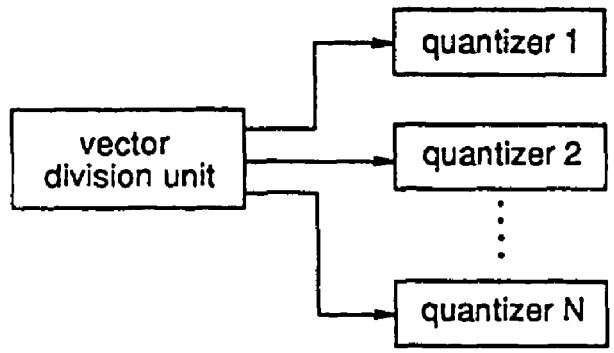
FIGS. 28a and 28b are diagrams for explaining the quantizing operation of the vector quantizer.
Figure 28B:
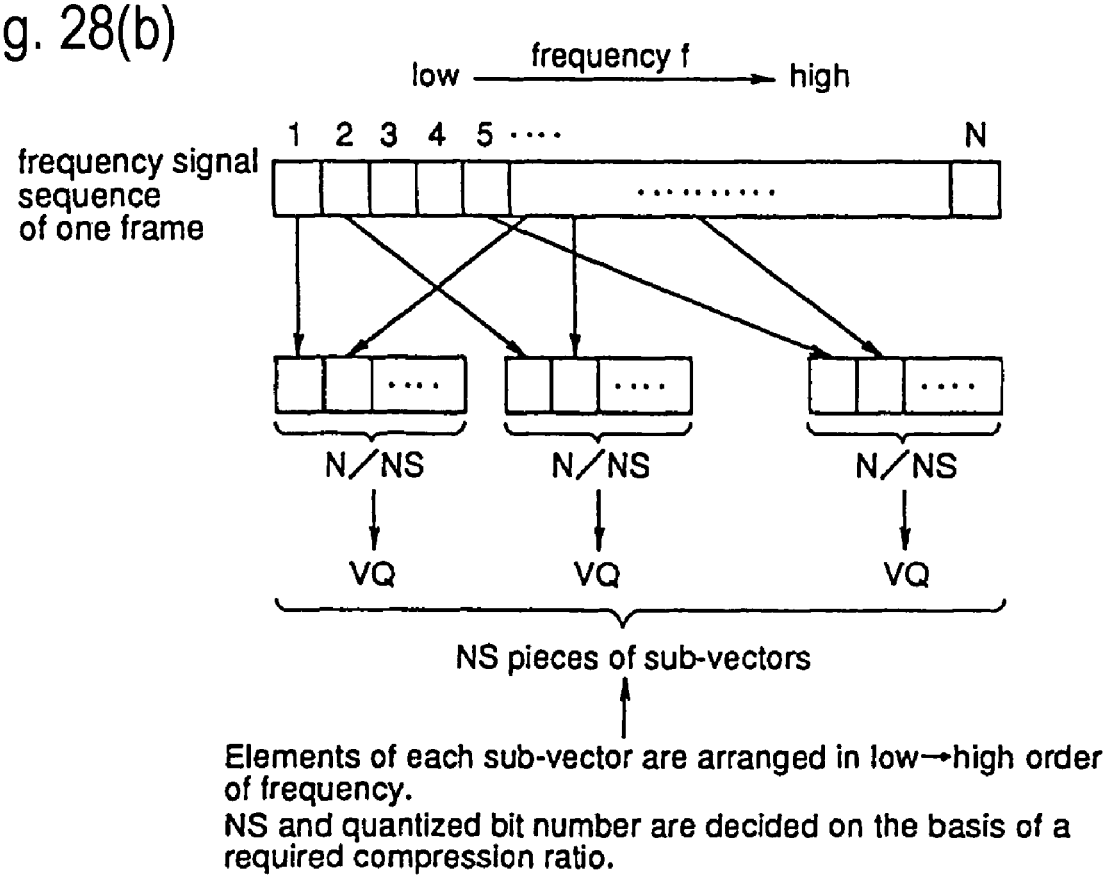

In the first vector quantizer 70031, first of all, a residual signal in one frame comprising N pieces of elements is divided into plural sub-vectors by a vector divider in the first vector quantizer 70031 shown in FIG. 28(a), and the respective sub-vectors are subjected to vector quantization by the N pieces of quantizers 1~N in the first vector quantizer 70031. The method of vector division and quantization is as follows. For example, as shown in FIG. 28(b), N pieces of elements being arranged in ascending order of frequency are divided into NS pieces of sub-blocks at equal intervals, and NS pieces of sub-vectors comprising N/NS pieces of elements, such as a sub-vector comprising only the first elements in the respective sub-blocks, a sub-vector comprising only the second elements thereof, . . . , are created, and vector quantization is carried out for each sub-vector. The division number and the like are decided on the basis of the requested coding rate.

After the vector quantization, the quantized code is inversely quantized by the inverse quantizer 70032 to obtain a difference from the input signal, thereby providing an error signal zi in the first vector quantizer 70031 as shown in FIG. 29(*a*).

Next, in the selector 70035, from the error signal zi, a frequency block to be quantized more precisely by the second vector quantizer 70036 is selected on the basis of the result selected by the selection scale calculator 70034.

In the selection scale calculator 70034, using the error signal Zi, the LPC spectral envelope li as shown in FIG. 29(*b*) obtained in the LPC analysis unit, and the auditive sensitivity characteristic hi, for each element in the frame divided into N elements on the frequency axis, $$g=(zi*li)/hi$$

is calculated.

As the auditive sensitivity characteristic hi, for example, the minimum audible limit characteristic shown in FIG. 29(*c*) is used. This is a characteristic showing a region that cannot be heard by human beings, and is obtained experimentally. Therefore, it may be said that 1/hi, which is the inverse number of the auditive sensitivity characteristic hi, shows the auditive importance of human beings. In addition, it may be said that the value g, which is obtained by multiplying the error signal zi, the spectral envelope li, and the inverse number of the auditive sensitivity characteristic hi, shows the importance of precise quantization at the frequency.

Figure 30:
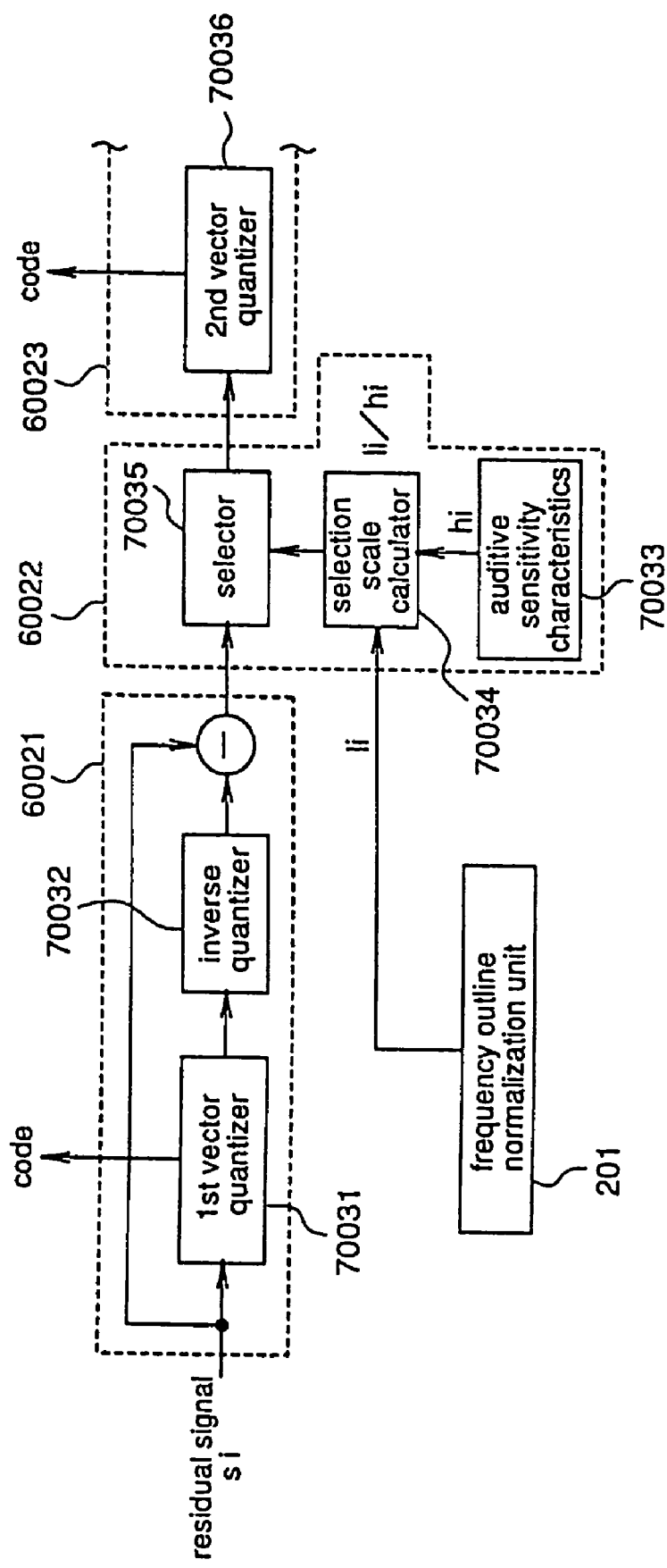
FIG. 30 is a block diagram illustrating the detailed structures of other examples of each quantization unit and an auditive selection unit included in the audio signal coding apparatus shown in FIG. 26.

FIG. 30 is a block diagram illustrating, in detail, other examples of the first and second stage quantization units and the auditive selection unit, included in the audio signal coding apparatus shown in FIG. 26. In FIG. 30, the same reference numerals as those in FIG. 27 designate the same or corresponding parts. In the example shown in FIG. 30, the selection scale (importance) g is obtained using the spectral envelope li and the auditive sensitivity characteristic hi, without using the error signal zi, by calculating, $$g=li/hi$$

Figure 31:
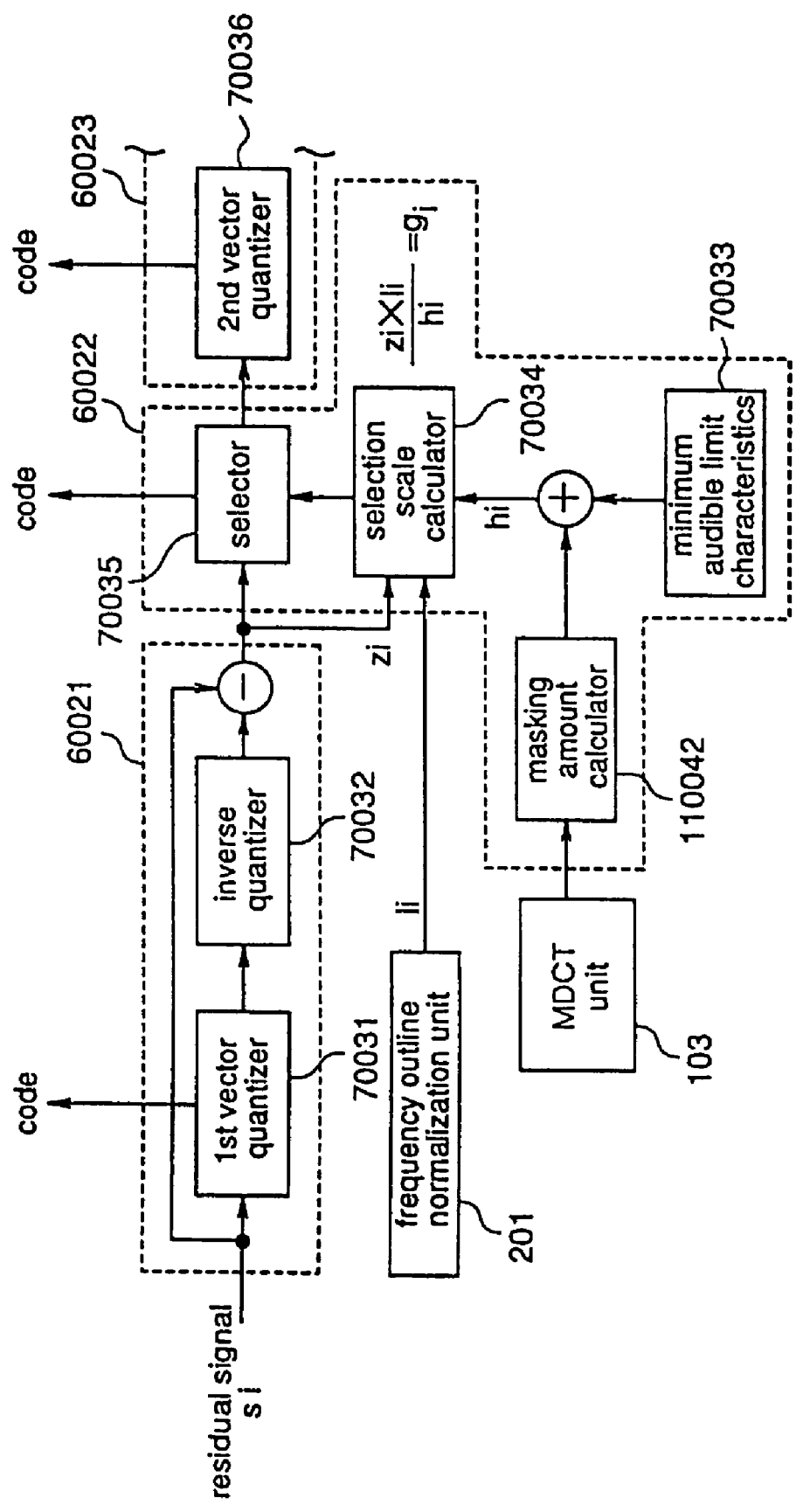
FIG. 31 is a block diagram illustrating the detailed structures of still other examples of each quantization unit and an auditive selection unit included in the audio signal coding apparatus shown in FIG. 26.

FIG. 31 is a block diagram illustrating, in detail, still other examples of the first and second stage quantization units and the auditive selection unit, included in the audio signal coding apparatus shown in FIG. 26. In FIG. 31, the same reference numerals as those shown in FIG. 27 designate the same or corresponding parts, and reference numeral 110042 denotes a masking amount calculator that calculates an amount to be masked by the auditive masking characteristic, from the spectrum of the input audio frequency which has been MDCT-transformed in the time-to-frequency transform unit.

In the example shown in FIG. 31, the auditive sensitivity characteristic hi is obtained frame by frame according to the following manner. That is, the masking characteristic is calculated from the frequency spectral distribution of the input signal, and the minimum audible limit characteristic is added to the masking characteristic, thereby to obtain the auditive sensitivity characteristic hi of the frame. The operation of the selection scale calculator 70034 is identical to that described with respect to FIG. 30.

Figure 32:
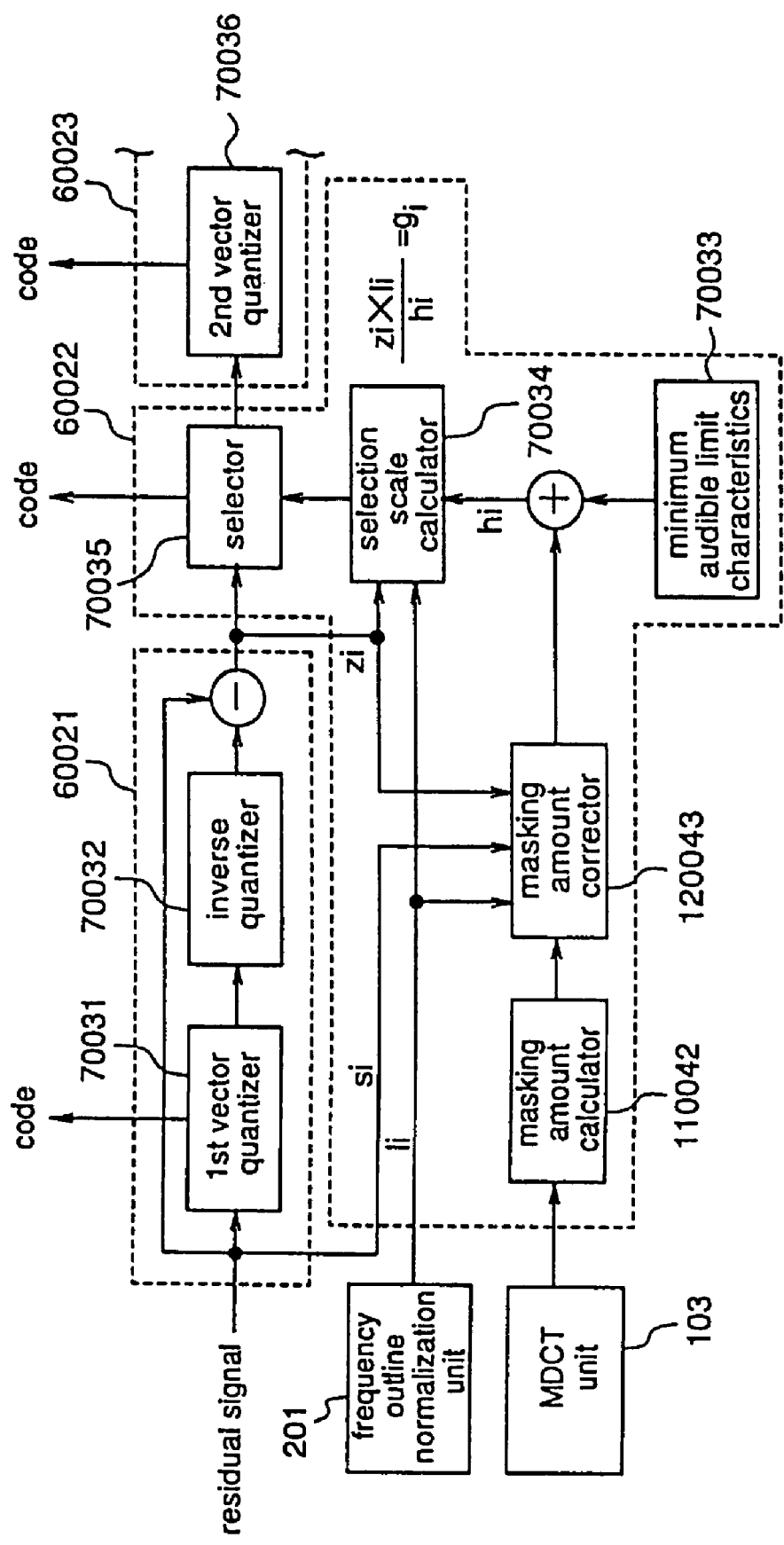
FIG. 32 is a block diagram illustrating the detailed structures of further examples of each quantization unit and an auditive selection unit included in the audio signal coding apparatus shown in FIG. 26.

FIG. 32 is a block diagram illustrating, in detail, still other examples of the first and second stage quantization units and the auditive selection unit, included in the audio signal coding apparatus shown in FIG. 26. In FIG. 32, the same reference numerals as those shown in FIG. 27 designate the same or corresponding parts, and reference numeral 120043 denotes a masking amount corrector that corrects the masking characteristic obtained in the masking amount calculator 110042, using the spectral envelope li, the residual signal si, and the error signal zi.

In the example shown in FIG. 32, the auditive sensitivity characteristic hi is obtained frame by frame in the following manner. Initially, the masking characteristic is calculated from the frequency spectral distribution of the input signal in the masking amount calculator 110042. Next, in the masking amount correction unit 120043, the calculated masking characteristic is corrected according to the spectral envelope li, the residual signal si, and the error signal zi. The audio sensitivity characteristic hi of the frame is obtained by adding the minimum audible limit characteristic to the corrected masking characteristic. An example of a method of correcting the masking characteristic will be described hereinafter.

Initially, a frequency (fm) at which the characteristic of masking amount Mi, which has already been calculated, attains the maximum value is obtained. Next, how precisely the signal having the frequency fm is reproduced is obtained from the spectral intensity of the frequency fm at the input and the size of the quantization error spectrum. For example, $$\gamma = 1-(\text{gain of quantization error of } fm)/(\text{gain of } fm \text{ at input})$$

When the value of γ is close to 1, it is not necessary to transform the masking characteristic already obtained. However, when it is close to 0, the masking characteristic is corrected so as to be decreased. For example, the masking characteristic can be corrected by transforming it by raising it to a higher power with the coefficient γ, as follows.

$$hi=Mi^\gamma \qquad (21)$$

Next, a description is given of the operation of the selector 70035.

Figure 33:
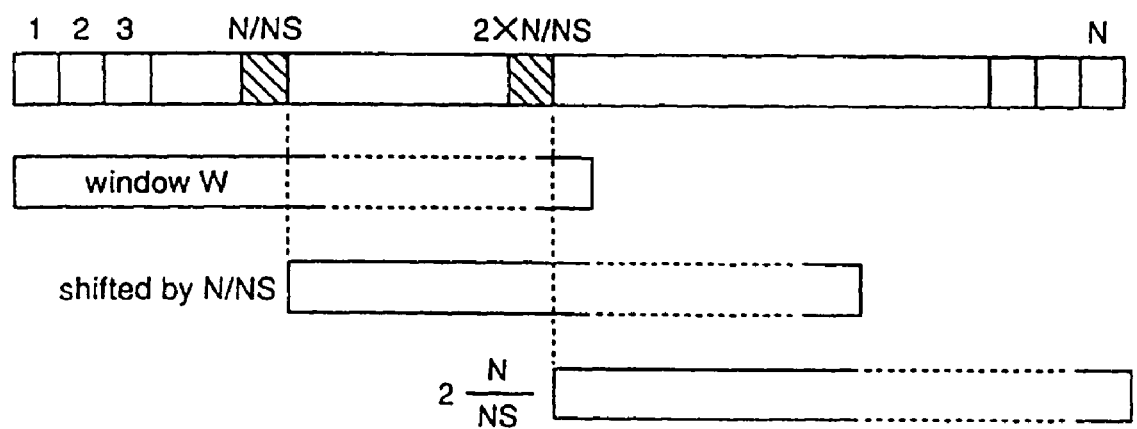
FIG. 33 is a diagram illustrating an example of selection of a frequency block having the highest importance (length w).

In the selector 70035, each of continuous elements in a frame is multiplied by a window (length W), and a frequency block in which a value G obtained by accumulating the values of importance g within the window attains the maximum is selected. FIG. 33 is a diagram showing an example where a frequency block (length W) of highest importance is selected. For simplification, the length of the window should be set at integer multiples of N/NS (FIG. 33 shows one which is not an integer multiple.) While shifting the window by N/NS pieces, the accumulated value G of the importance g within the window frame is calculated, and a frequency block having a length W that gives the maximum value of G is selected.

In the second vector quantizer 70036, the selected block in the window frame is subjected to vector quantization. Although the operation of the second vector quantizer 70036 is identical to that of the first vector quantizer 70031, since only the frequency block selected by the selector 70035 from the error signal zi is quantized as described above, the number of elements in the frame to be vector-quantized is small.

Finally, in the case of using the code of the spectral envelope coefficient, the codes corresponding to the quantization results of the respective vector quantizers, and the selection scale g obtained in any of the structures shown in FIGS. 27, 31 and 32, information showing from which element does the block selected by the selector 70035 start, is output as an index.

On the other hand, in the case of using the selection scale g obtained in the structure shown in FIG. 30, since only the spectral envelope li and the auditive sensitivity characteristic hi are used, the information, i.e., from which element does the selected block start, can be obtained from the code of the spectral envelope coefficient and the previously known auditive sensitivity characteristic hi when inverse quantization is carried out. Therefore, it is not necessary to output the information relating to the block selection as an index, resulting in an advantage with respect of compressibility.

As described above, according to the audio signal coding apparatus of the seventh embodiment, on the basis of the spectrum of the input audio signal and the auditive sensitivity characteristic showing the auditive nature of human beings, a frequency block of highest importance for quantization is selected from the frequency blocks of quantization error component in the first vector quantizer, and the quantization error component of the first quantizer is quantized with respect to the selected block in the second vector quantizer, whereby efficient quantization can be performed utilizing the auditive nature of human beings. Further, in the structures shown in FIGS. 27, 31 and 32, when the frequency block of highest importance for quantization is selected, the importance is calculated on the basis of the quantization error in the first vector quantizer. Therefore, it is avoided that a portion favorably quantized in the first vector quantizer is quantized again and an error is generated inversely, whereby quantization maintaining high quality is performed.

Further, when the importance g is obtained in the structure shown in FIG. 30, as compared with the case of obtaining the importance g in the structure shown in any of FIGS. 27, 31 and 32, the number of indices to be output is decreased, resulting in increased compression ratio.

In this seventh embodiment, the quantization unit has the two-stage structure comprising the first-stage quantization unit 60021 and the second-stage quantization unit 60023, and the auditive selection means 60022 is disposed between the first-stage quantization unit 60021 and the second-stage quantization unit 60023. However, the quantization unit may have a multiple-stage structure of three or more stages and the auditive selection means may be disposed between the respective quantization units. Also in this structure, as in the seventh embodiment mentioned above, efficient quantization can be performed utilizing the auditive nature of human beings.

Embodiment 8

Figure 34:
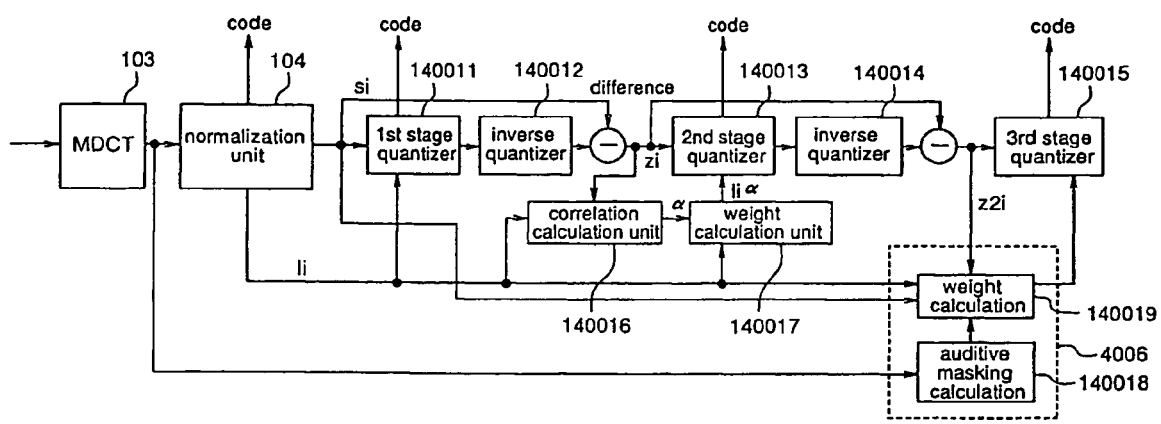
FIG. 34 is a block diagram illustrating the structure of an audio signal coding apparatus according to an eighth embodiment of the present invention.

FIG. 34 is a block diagram illustrating a structure of an audio signal coding apparatus according to an eighth embodiment of the present invention. In this embodiment, only the structure of the quantization unit 105 in the coding apparatus 1 is different from that of the above-mentioned embodiment and, therefore, only the structure of the quantization unit will be described hereinafter. In the figure, reference numeral 140011 denotes a first-stage quantizer that vector-quantizes the MDCT signal si output from the normalization unit 104, using the spectral envelope value li as a weight coefficient. Reference numeral 140012 denotes an inverse quantizer that inversely quantizes the quantization result of the first-stage quantizer 140011, and a quantization error signal zi of the quantization by the first-stage quantizer 140011 is obtained by taking a difference between the output of this inverse quantizer 140012 and a residual signal output from the normalization unit 104. Reference numeral 140013 denotes a second-stage quantizer that vector-quantizes the quantization error signal zi of the quantization by the first-stage quantizer 140011 using, as a weight coefficient, the calculation result obtained in a weight calculation unit 140017 described later. Reference numeral 140014 denotes an inverse quantizer that inversely quantizes the quantization result of the second-stage quantizer 140013, and a quantization error signal z2i of the quantization by the second-stage quantizer 140013 is obtained by taking a difference between the output of this inverse quantizer 140014 and the quantization error signal of the quantization by the first-stage quantizer 140011. Reference numeral 140015 denotes a third-stage quantizer that vector-quantizes the quantization error signal z2i of the quantization by the second-stage quantizer 140013 using, as a weight coefficient, the calculation result obtained in the auditive weight calculating unit 14006. Reference numeral 140016 denotes is a correlation calculation unit that calculates a correlation between the quantization error signal zi of the quantization by the first-stage quantizer 140011 and the spectral envelope value li. Reference numeral 140017 denotes a weight calculation unit that calculates the weighting coefficient used in the quantization by the second-stage quantizer 140013.

A description is given of the operation. In the audio signal coding apparatus according to this fourth embodiment, three stages of quantizers are employed, and vector quantization is carried out using different weights in the respective quantizers.

Initially, in the first-stage quantizer 140011, the input residual signal si is subjected to vector quantization using, as a weight coefficient, the LPC spectral envelope value li obtained in the outline quantization unit 302. Thereby, a portion in which the spectral energy is large (concentrated) is subjected to weighting, resulting in an effect that an auditively important portion is quantized with higher efficiency. As the first-stage vector quantizer 140011, for example, a quantizer identical to the first vector quantizer 70031 according to the third embodiment may be used.

The quantization result is inversely quantized in the inverse quantizer 140012 and, from a difference between this and the input residual signal si, an error signal zi due to the quantization is obtained.

This error signal zi is further vector-quantized by the second-stage quantizer 140013. Here, on the basis of the correlation between the LPC spectral envelope li and the error signal zi, a weight coefficient is calculated by the correlation calculation unit 140016 and the weight calculation unit 140017.

To be specific, in the correlation calculation unit 140016, $$\alpha = (\Sigma li * zi)/(\Sigma li * li)$$

is calculated. This $\alpha$ takes a value in $0<\alpha<1$ and shows the correlation between them. When a is close to 0, it shows that the first-stage quantization has been carried out precisely on the basis of the weighting of the spectral envelope. When a is close to 1, it shows that quantization has not been precisely carried out yet. So, using this $\alpha$, as a coefficient for adjusting the weighting degree of the spectral envelope li, $$li^\alpha \qquad (22)$$

is obtained, and this is used as a weighting coefficient for vector quantization. The quantization precision is improved by performing weighting again using the spectral envelope according to the precision of the first-stage quantization and then performing quantization as mentioned above.

The quantization result by the second-stage quantizer 140013 is inversely quantized in the inverse quantizer 140014 in similar manner, and an error signal z2i is extracted, and this error signal z2i is vector-quantized by the third-stage quantizer 140015. The auditive weight coefficient at this time is calculated by the weight calculator 140019 in the auditive weighting calculating unit 14006. For example, using the error signal z2i, the LPC spectral envelope li, and the residual signal si, $$N = \Sigma z2i * li$$

$$S = \Sigma si * li$$

$$\beta = 1 - (N/S)$$

are obtained.

On the other hand, in the auditive masking calculator 140018 in the auditive weighting calculating unit 14006, the auditive masking characteristic mi is calculated according to, for example, an auditive model used in an MPEG audio standard method. This is overlapped with the above-described minimum audible limit characteristic hi to obtain the final masking characteristic Mi.

Then, the final masking characteristic Mi is raised to a higher power using the coefficient β calculated in the weight calculator unit 140019, and the inverse number of this value is multiplied by 1 to obtain $$1/Mi^\beta \qquad (23)$$

and this is used as a weight coefficient for the third-stage vector quantization.

As described above, in the audio signal coding apparatus according to this eighth embodiment, the plural quantizers 140011, 140013, and 140015 perform quantization using different weighting coefficients, including weighting in view of the auditive sensitivity characteristic, whereby efficient quantization can be performed by effectively utilizing the auditive nature of human beings.

Embodiment 9

Figure 35:
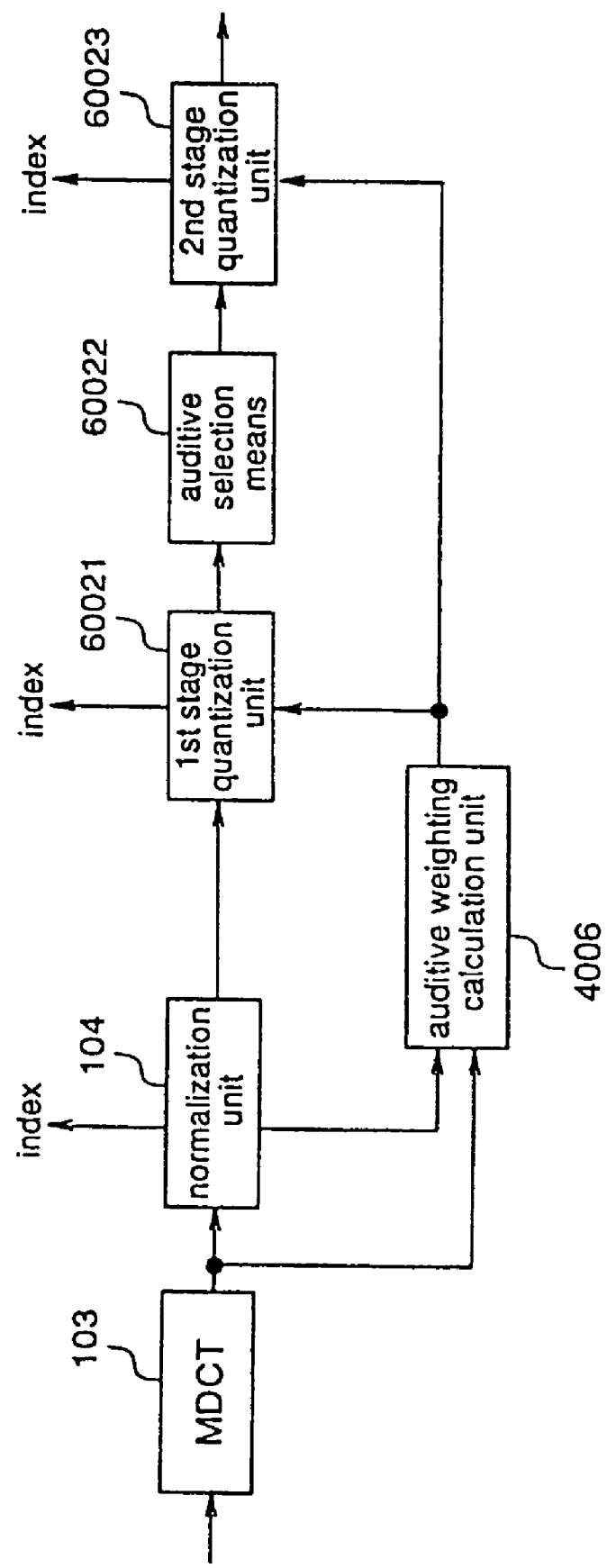
FIG. 35 is a block diagram illustrating the structure of an audio signal coding apparatus according to a ninth embodiment of the present invention.

FIG. 35 is a block diagram illustrating the structure of an audio signal coding apparatus according to a ninth embodiment of the present invention.

The audio signal coding apparatus according to this fifth embodiment is a combination of the seventh embodiment shown in FIG. 26 and the first embodiment and, in the audio signal coding apparatus according to the seventh embodiment shown in FIG. 26, a weighting coefficient, which is obtained by using the auditive sensitivity characteristic in the auditive weighting calculating unit 14006, is used when quantization is carried out in each quantization unit. Since the audio signal coding apparatus according to this fifth embodiment is so constructed, both of the effects provided by the first embodiment and the third embodiment are obtained.

Further, likewise, the seventh embodiment shown in FIG. 26 may be combined with the structure according to the sixth embodiment or the eighth embodiment, and an audio signal coding apparatus obtained by each combination can provide both of the effects provided by the sixth embodiment and the seventh embodiment or both of the effects provided by the eighth embodiment and the seventh embodiment.

While in the aforementioned embodiments the multistage quantization unit has two or three stages of quantization units, it is needless to say that the number of stages of the quantization unit may be four or more.

Furthermore, the order of the weight coefficients used for vector quantization in the respective stages of the multistage quantization unit is not restricted to that described for the aforementioned embodiments. For example, the weighting coefficient in view of the auditive sensitivity characteristic may be used in the first stage, and the LPC spectral envelope may be used in and after the second stage.

Embodiment 10

Figure 36:
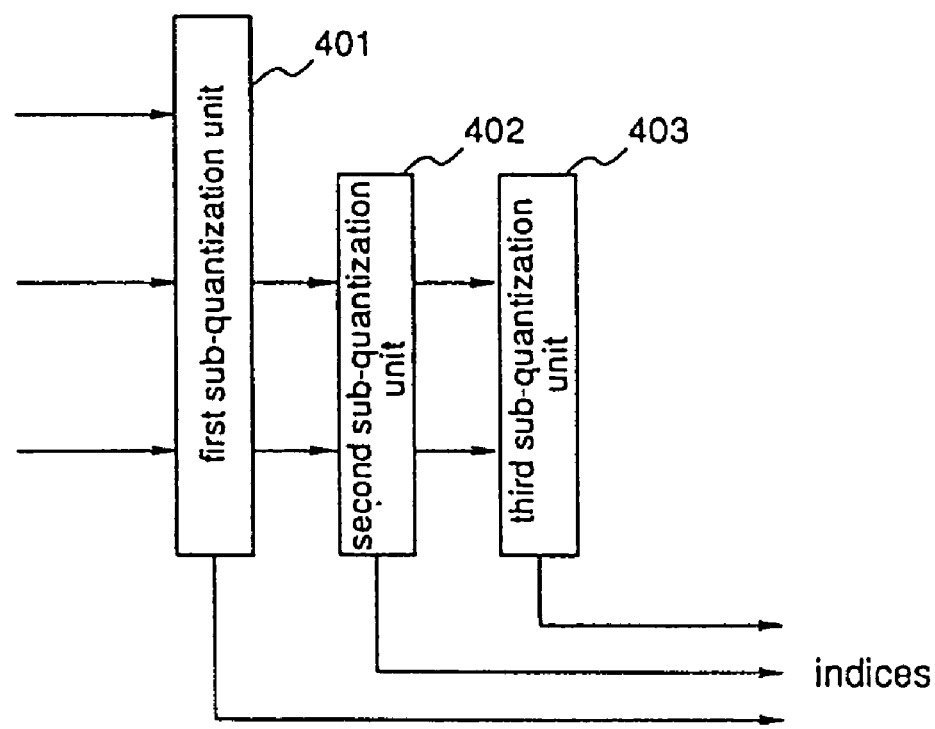
FIG. 36 is a block diagram illustrating the structure of an audio signal coding apparatus according to a tenth embodiment of the present invention.

FIG. 36 is a block diagram illustrating an audio signal coding apparatus according to a tenth embodiment of the present invention. In this embodiment, since only the structure of the quantization unit 105 in the coding apparatus 1 is different from that of the above-mentioned embodiment, only the structure of the quantization unit will be described hereinafter.

In FIG. 36, reference numeral 401 denotes a first sub-quantization unit 401, 402 denotes a second sub-quantization unit that receives an output from the first sub-quantization unit 401, and 403 denotes a third sub-quantization unit that receives the output from the second sub-quantization unit 402.

Next, a description is given of the operation of the quantization unit 105. A signal input to the first sub-quantization unit 401 is the output from the normalization unit 104 of the coding apparatus, i.e., normalized MDCT coefficients. However, in the structure having no normalization unit 104, it is the output from the MDCT unit 103. In the first sub-quantization unit 401, the input MDCT coefficients are subjected to scalar quantization or vector quantization, and indices expressing the parameters used for the quantization are encoded. Further, quantization errors with respect to the input MDCT coefficients due to the quantization are calculated, and they are output to the second sub-quantization unit 402. In the first sub-quantization unit 401, all of the MDCT coefficients may be quantized, or only a portion of them may be quantized. Of course, when only a portion thereof is quantized, quantization errors in the bands which are not quantized by the first sub-quantization unit 401 will become input MDCT coefficients of the not-quantized bands.

Next, the second sub-quantization unit 402 receives the quantization errors of the MDCT coefficients obtained in the first sub-quantization unit 401 and quantizes them. For this quantization, like the first sub-quantization unit 401, scalar quantization or vector quantization may be used. The second sub-quantization unit 402 codes the parameters used for the quantization as indices. Further, it calculates quantization errors due to the quantization, and outputs them to the third sub-quantization unit 403. This third sub-quantization unit 403 is identical in structure to the second sub-quantization unit.

The numbers of MDCT coefficients, i.e., band widths, to be quantized by the first sub-quantization unit 401, the second sub-quantization unit 402, and the third sub-quantization unit 403 are not necessarily equal to each other, and the bands to be quantized are not necessarily the same. Considering the auditive characteristic of human beings, it is desired that both of the second sub-quantization unit 402 and the third sub-quantization unit 403 are set so as to quantize the band of the MDCT coefficients showing the low-frequency component.

As described above, according to the tenth embodiment of the invention, when quantization is performed, the quantization unit is provided in stages, and the band width to be quantized by the quantization unit is varied between the adjacent stages, whereby coefficients in an arbitrary band among the input MDCT coefficients, for example, coefficients corresponding to the low-frequency component which is auditively important for human beings, are quantized. Therefore, even when an audio signal is coded at a low bit rate, i.e., a high compression ratio, it is possible to perform high-definition audio reproduction at the receiving end.

Embodiment 11

Figure 37:
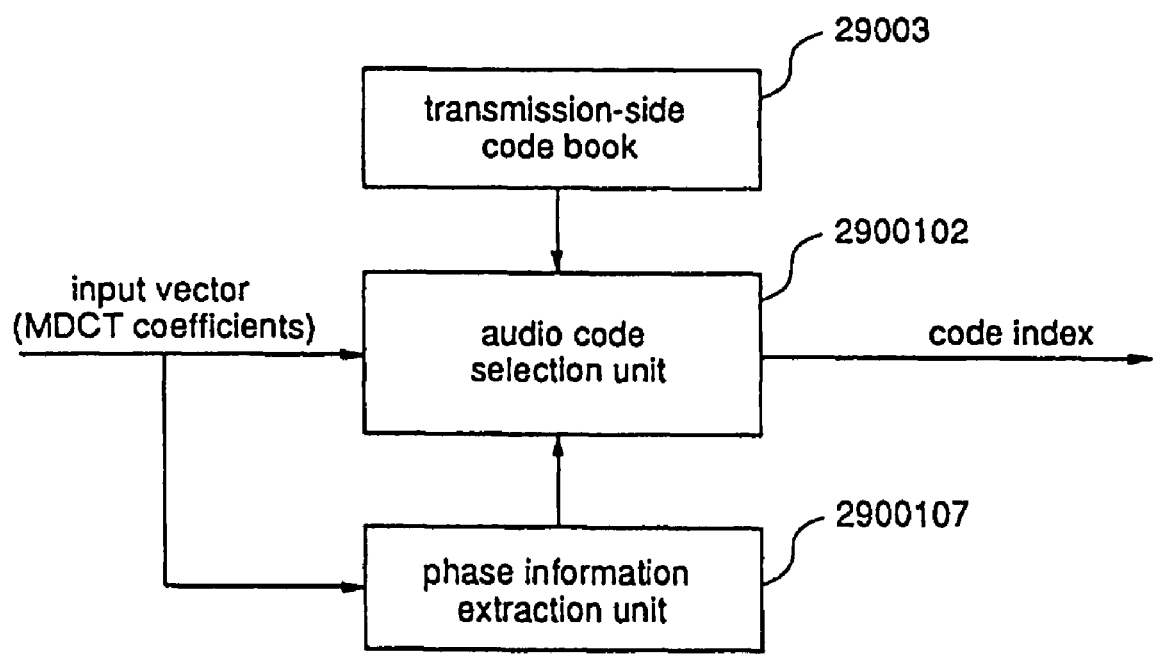
FIG. 37 is a diagram illustrating the structure of an audio signal coding apparatus according to an eleventh embodiment of the present invention.

Hereinafter, an audio signal coding apparatus according to an eleventh embodiment of the present invention will be described with reference to the drawings. FIG. 37 is a diagram illustrating the detailed structure of an audio signal coding apparatus according to the tenth embodiment. In the figure, reference numeral 29003 denotes a transmission-side code book having a plurality of audio codes which are representative values of feature amounts of audio signal, 2900102 denotes an audio code selection unit, and 2900107 denotes a phase information extraction unit.

Hereinafter, a description is given of the operation.

Although MDCT coefficients are regarded as an input signal in this case, DFT (discrete Fourier transform) coefficients or the like may be used as long as it is a time-to-frequency transformed signal.

Figure 38A:
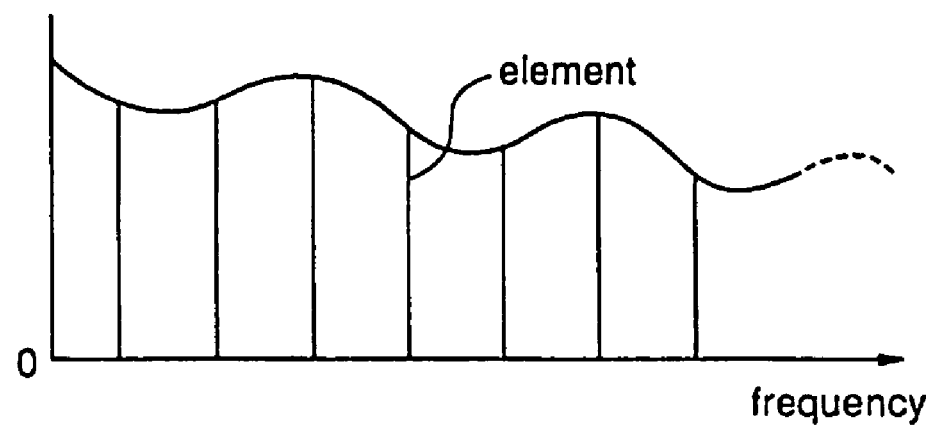
FIGS. 38(a)-(b) are diagrams for explaining the structure of an audio feature vector in the audio signal coding apparatus according to the eleventh embodiment.
Figure 38B:
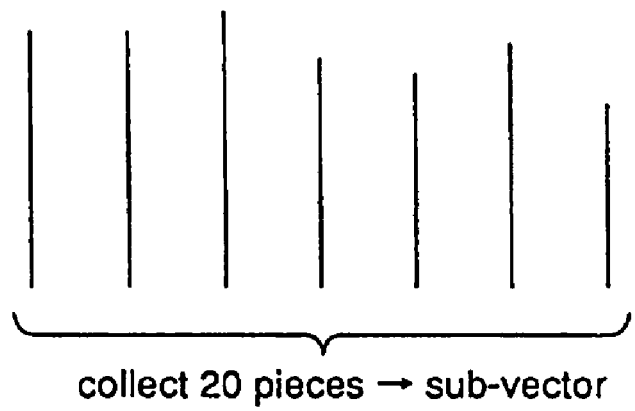

As shown in FIGS. 38(a) and 38(b), when data on the frequency axis is regarded as one sound source vector, some elements are extracted from the sound source vector to form a sub-vector. When this sub-vector is regarded as the input vector shown in FIG. 37, the audio code selection unit 2900102 calculates distances between the input vector and the respective codes in the transmission-side code book 29003, selects a code having a minimum distance, and outputs the code index of the selected coded in the transmission-side code book 29003.

Figures 39A, 39B:
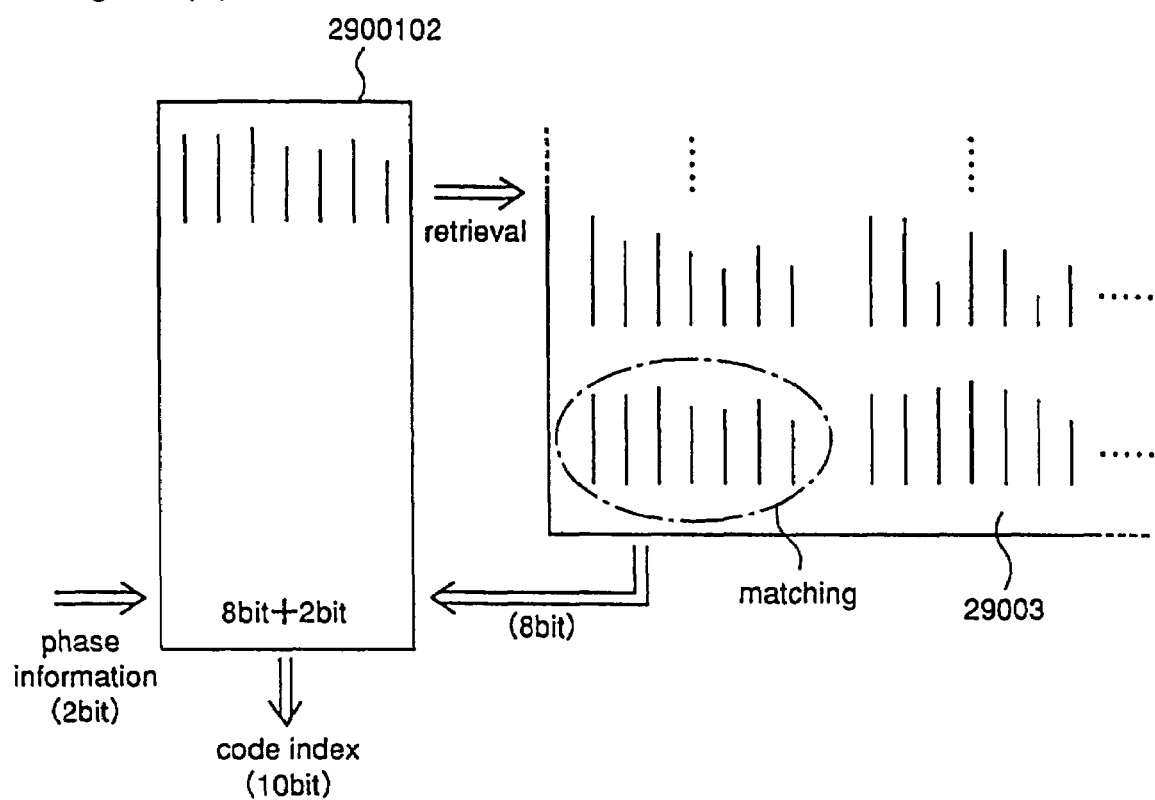
FIGS. 39(a)-(b) are diagrams for explaining the processing of the audio signal coding apparatus according to the eleventh embodiment.

A description is given of the detailed operation of the coding apparatus using FIG. 37 and FIGS. 39(a) and 39(b). It is assumed that coding is carried out with 10 bits because it is intended for 20 KHz. Further, in the phase information extraction unit 2900107, phases are extracted from two elements on the low-frequency side, i.e., 2 bits. The input to the audio code selection unit 2900102 is a sub-vector obtained as follows. When coefficients obtained by MDCT are regarded as one vector, this vector is divided into plural sub-vectors so that each sub-vector is composed of some elements, for example, about 20 elements. In this case, the sub-vector is expressed by X0~X19, and a sub-vector element, of which number appended to X is smaller, corresponds to an MDCT coefficient having a lower frequency component. The low frequency component is auditively important information for human beings and, therefore, to perform coding of these elements with priority results in that the degradation in sound quality is hardly sensed by human beings when being reproduced.

The audio code selection unit 2900102 calculates distances between the feature vector and the respective codes in the transmission-side code book 29003. For example, when the code index is i, the distance Di of a code having the code index i is calculated in formula (24).

$$D_i = \sum_{i=0}^{N} \sum_{j=0}^{M} \{abs(Cij) - abs(Xj)\}^P + \sum_{i=0}^{N} \sum_{j=M+1}^{19} \{Cij - Xj\}^P \quad (24)$$

where N is the number of all codes in the transmission-side code book 29003, Cij is the value of the j-th element in code index I. In this eleventh embodiment, M is a number smaller than 19, for example, 1. P is the norm for distance calculation and, for example, it is 2. Further, abs( ) means absolute calculation.

The phase information extraction unit 2900107 outputs the coded index i giving a minimum distance Di, and M pieces of phase information Ph(j) j=0 to M. The phase information Ph(j) is expressed by formula (25).

$$Ph(j) = \begin{cases} 1 atCji * Xj \geq 0 \\ -1 atCji * Xj < 0 \end{cases} \quad (25)$$

When the input vector is a sub-vector of a vector obtained by subjecting an audio signal to MDCT, generally, the auditive importance of the coefficient is higher as the appended character j of Xj is smaller. So, in this structure, with respect to the phases (negative or positive) corresponding to the elements of the low-frequency components of each sub-vector, these data are not considered when code retrieval is carried out, but added separately after the retrieval. To be specific, as shown in FIG. 39(a), the input sub-vector is pattern-compared with the codes possessed by the transmission-side code book 29003, without regard for the signs (negative or positive) of the 2-bit elements on the low-frequency side of each sub-vector. For example, there are stored 256 codes together with the low-frequency side 2-bit elements, both being positive, and the audio code selection unit 2900102 retrieves the input sub-vector and the 256 codes possessed by the transmission-side code book 29003. Then, any of the combinations shown in FIG. 39(b), which is extracted by the phase information extraction unit 2900107, is added to the selected code, as signs of the 2 bits on the low-frequency side of the sub-vector, and a code index of 10 bits in total is output.

Thereby, the code index output from the audio coding apparatus remains as in the conventional apparatus, i.e., 10 bits (1024 pieces), but the code stored in the transmission-side code book 3 can be 8 bits (256 pieces). Assuming that the total of the data quantities of the code index and the phase information is equal to the data quantity of the code index for distance calculation shown in formula (26), when the synthesis sound decoded in formula (26) is compared with the synthesis sound according to the embodiment structure, approximately equal subjective evaluation results are obtained.

$$D_i = \sum_{i=0}^{N} \sum_{j=0}^{19} \{Cij - Xj\}^P \quad (26)$$

Table 3 shows the relationship between the calculation amount and the memory amount in the case where the embodiment structure and formula (27) are used. It can be seen from Table 3 that the structure of this embodiment reduces the code book to ¼, and reduces the calculation amount to 256 ways of retrieval processes (whereas 1024 ways of retrieval processes are needed in the conventional structure) and a process of adding two codes to the retrieval result, whereby the calculation amount and the memory are significantly reduced.

TABLE 3

| method, | formula 3 | formula 1 |
|---|---|---|
| transmission data quantity | 9 bits | 9 bits |
| code book (number of codes) | 512 (9 bits) | 64 (6 bits) |

TABLE 3-continued

| method, | formula 3 | formula 1 |
|---|---|---|
| data for code transmission | 0 | 3 codes (3 bits) |
| calculation amount | 512-codes retrieval | 64-codes retrieval + 3-codes addition |

As described above, according to the tenth embodiment of the invention, when selecting an audio code having a minimum distance among the auditive distances between subvectors produced by dividing an input vector and audio codes in the transmission-side code book 29003, a portion corresponding to an element of a sub-vector of a high auditive importance is treated in the audio code selection unit 2900102 while neglecting the positive and negative codes indicating its phase information, and subjected to comparative retrieval with respect to the audio codes in the transmission-side code book 29003. Then, phase information corresponding to an element portion of the sub-vector extracted in the phase information extraction unit 2900107 is added to the result obtained, and the result is output as a code index. Therefore, the calculation amount in the audio code selection unit 2900102 and the number of codes required in the code book 29003 are reduced without degrading the sensible sound quality.

Embodiment 12

Figure 40A:
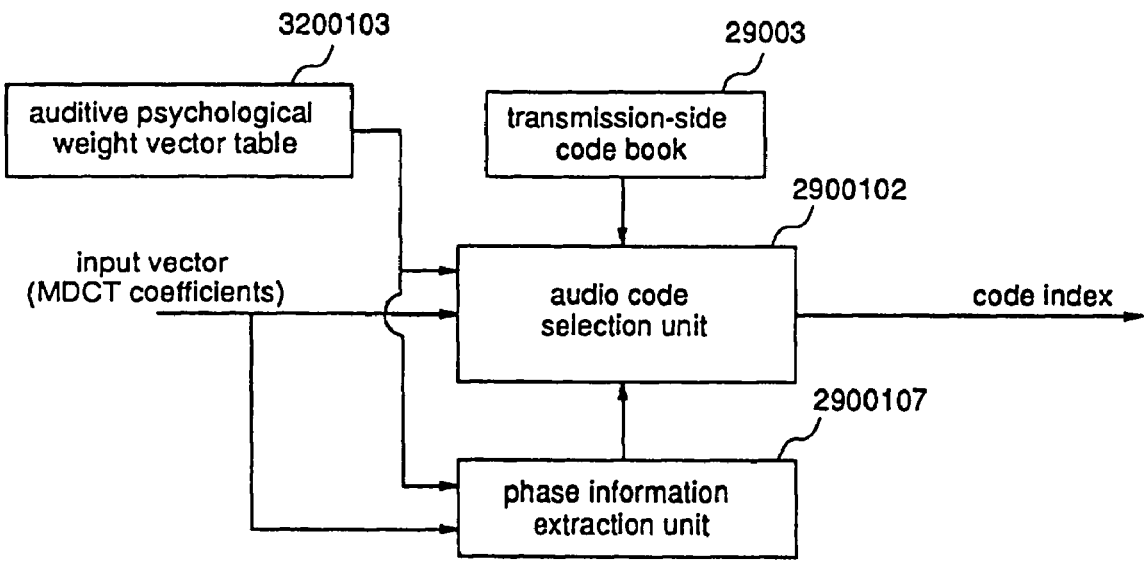
FIGS. 40(a)-(b) are diagrams illustrating the detailed structure of an audio signal coding apparatus according to a twelfth embodiment of the present invention, and an example of an auditive psychological weight vector table.
Figure 40B:
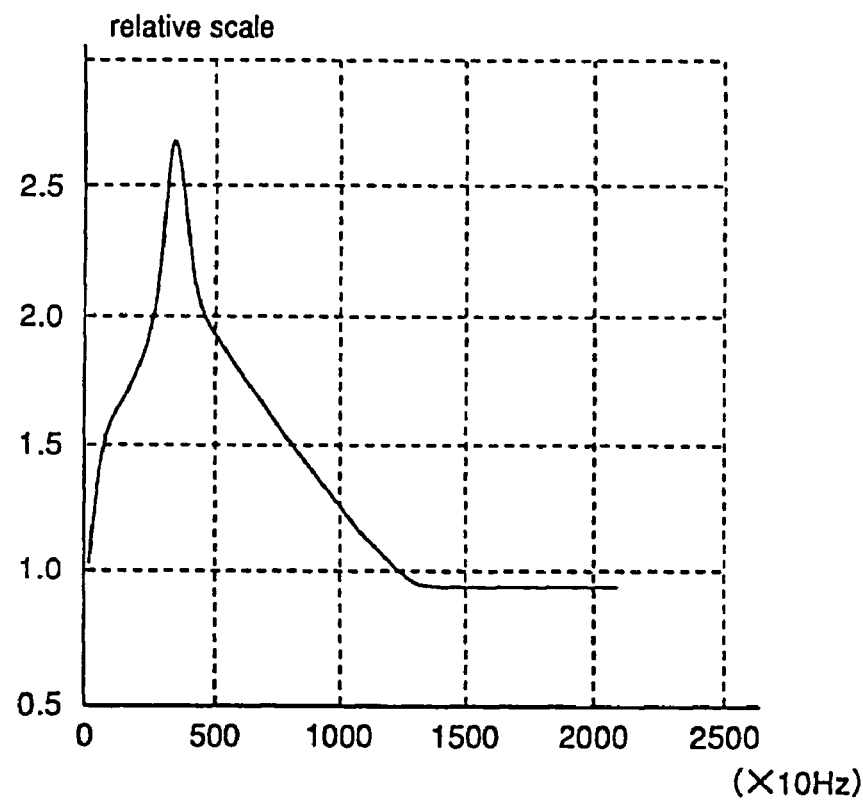

Hereinafter, an audio signal coding apparatus according to a twelfth embodiment of the present invention will be described with reference to the drawings. FIG. 40(*a*) is a diagram showing the structure of an audio signal coding apparatus according to this eleventh embodiment. In FIG. 40, reference numeral 3200103 denotes an auditive psychological weight vector table that stores a table of relative auditive psychological amounts at the respective frequencies, with regard to the auditive psychological characteristic of human beings.

Hereinafter, a description is given of the operation. This twelfth embodiment is different from the eleventh embodiment in that the auditive psychological weight vector table 3200103 is newly added. The auditive psychological weight vectors are obtained by collecting elements in the same frequency band corresponding to the respective elements of the input vector of this embodiment from, for example, an auditive sensitivity table defined as auditive sensitivity characteristic to frequencies, on the basis of the auditive psychological model of human beings, and then transforming these elements to vectors. As shown in FIG. 40(*b*), this table has a peak about a frequency of 2.5 KHz, and this means that the elements at the lowest position of frequency are not always important for the auditive sense of human beings.

To be specific, in this twelfth embodiment, using MDCT coefficients as input vectors to the audio code selection unit 2900102, and the auditive psychological weight vector table 3200103 as weights for code selection, auditive distances between the input vectors and the respective codes in the transmission-side code book 29003 are calculated, and a code index of a code having a minimum distance is output. When the code index is i, the distance scale Di for code selection in the audio code selection unit 2900102 becomes, for example, $$D_i = \sum_{i=0}^{N} \sum_{j=0}^{M} Wj\{abs(Cij) - abs(Xj)\}^P + \sum_{i=0}^{N} \sum_{j=M+1}^{19} Wj\{Cij - Xj\}^P \quad (27)$$

where N is the number of all codes in the transmission-side code book 29003, and Cij is the value of the j-th element in the code index i. In this embodiment, M is a number smaller than 19, for example, 1. P is the norm in the distance calculation, for example, 2. Wj is the j-th element of the auditive psychological weight vector table 3200103. Further, abs( ) means absolute operation.

The phase information extraction unit 2900107 decides that phase information of an element corresponding to an audio feature vector of which frequency is extracted the auditive psychological weight vector table 3200103, and outputs a code index I having a minimum Di in the range and M pieces of phase information Ph(j) j=0 to M.

As described above, according to the twelfth embodiment, when selecting an audio code having a minimum distance among the auditive distances between sub-vectors produced by dividing an input vector and audio codes in the transmission-side code book 29003, a portion corresponding to an element of a sub-vector of a high auditive importance is treated in the audio code selection unit 2900102 while neglecting the positive and negative codes indicating their phase information, and subjected to comparative retrieval with respect to the audio codes in the transmission-side code book C3. Then, phase information corresponding to an element portion of the sub-vector extracted in the phase information extraction unit 2900107 is added to the result obtained, and the result is output as a code index. Therefore, the calculation amount in the audio code selection unit 2900102 and the number of codes required in the code book 29003 are reduced without degrading the sensible sound quality.

Further, the audio feature vector, which is treated in the audio code selection unit 2900102 while neglecting the positive and negative codes indicating its phase information, is selected after being weighted using the auditive psychological weight vector table 3200103 that stores a table of relative auditive psychological amounts at the respective frequencies in view of the auditive psychological characteristic of human beings. Thereby, as compared with the eleventh embodiment in which a prescribed number of vectors are simply selected from a low band, quantization with more sensible sound quality is realized.

Embodiment 13

Figure 41A:
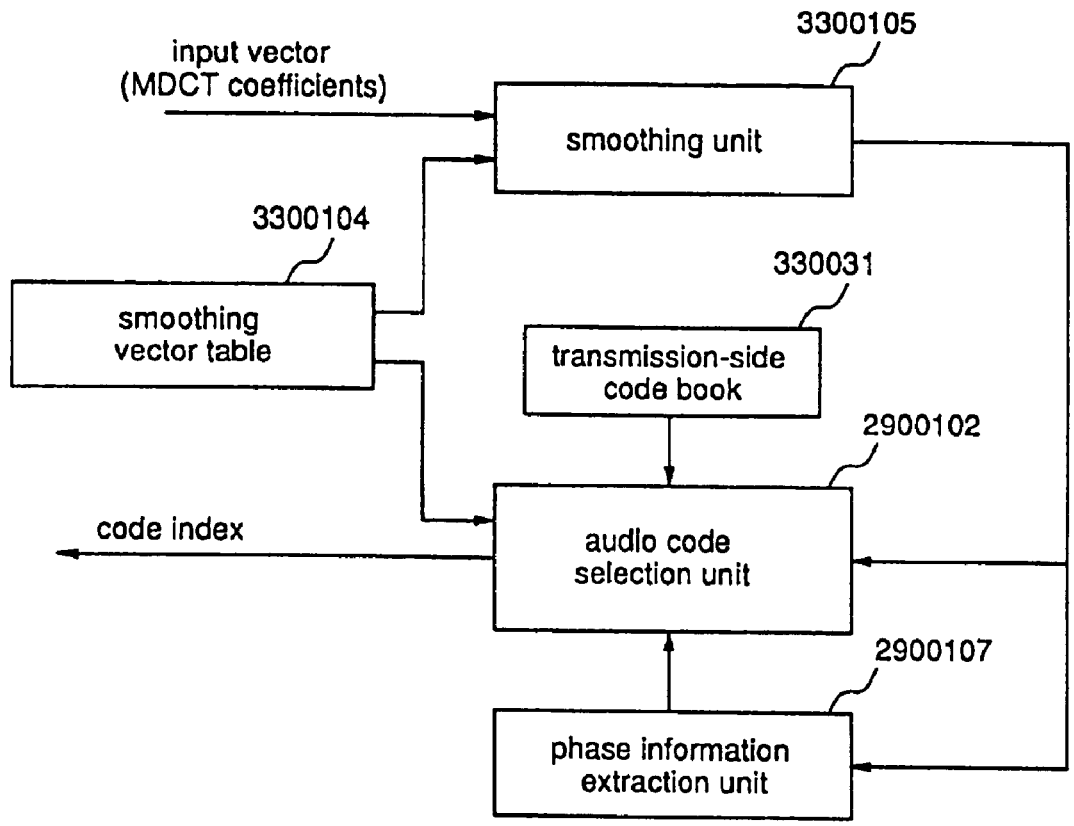
FIGS. 41(a)-(b) are diagrams illustrating the detailed structure of an audio signal coding apparatus according to a thirteenth embodiment of the present invention, and for explaining the processing of a smoothing unit.
Figure 41B:
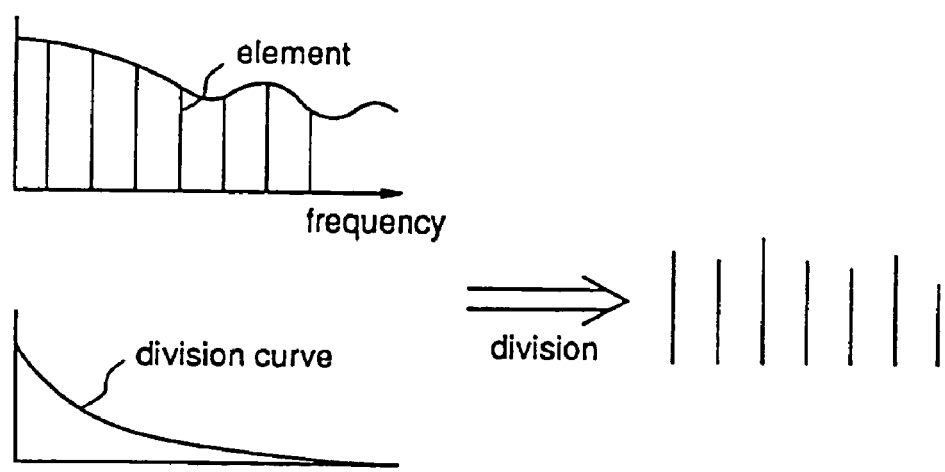

Hereinafter, an audio signal coding apparatus according to a thirteenth embodiment of the present invention will be described with reference to the drawings. FIG. 41(*a*) is a diagram illustrating the structure of an audio signal quantization apparatus according to this thirteenth embodiment. In the figure, reference numeral 3300104 denotes a smoothing vector table in which data, such as a division curve, are actually stored. Reference numeral 3300105 denotes a smoothing unit that smoothes an input vector by division of corresponding vector elements, using the smoothing vector stored in the smoothing vector table 3300104.

Hereinafter, a description is given of the operation. To the smoothing unit 3300105, MDCT coefficients or the like are input as an input vector, as in the audio signal coding apparatus according to the tenth or eleventh embodiment.

The smoothing unit 3300105 subjects the input vector to smoothing operation using a division curve which is a smoothing vector stored in the smoothing vector table 3300104. This smoothing operation is expressed by formula (28) when the input vector is X, the smoothing vector 3300104 is F, the output from the smoothing unit 3300105 is Y, and the I-th element of each vector is Xi,Fi,Yi.

$$Yi = Xi/Fi \quad (28)$$

When the input vector is MDCT coefficients, The smoothing vector table 3300104 is a value that reduces the dispersion of the MDCT coefficients. FIG. 41(*b*) schematically shows the above-described smoothing process, and the range of data quantity per frequency can be reduced by performing division of two elements from the low-band side, among the elements transformed to a sub-vector.

The output from the smoothing unit 3300105 is input to the audio code selection unit 2900102. In the phase information extraction unit 2900107, from the smoothed input vector, phase information of two elements from the lower-frequency side is extracted. On the other hand, in the audio code selection unit 2900102, the smoothed input vector and the 256 codes stored in the transmission-side code book 330031 are retrieved. Since a correct retrieval result is not obtained if a code index (8 bits) corresponding to the obtained retrieval result is output as it is, information relating to the smoothing process is obtained from the smoothing vector table 3300104, and the scaling is adjusted. Thereafter, a code index (8 bits) corresponding to the retrieval result is selected, and phase information of 2 bits is added to the obtained result, thereby to output a coded index I of 10 bits.

The distance Di between the input vector and the code stored in the transmission-side code book 330031 is expressed by, for example, formula (29) with each i-th element in the smoothing vector table 3300104 being Fi.

$$D_i = \sum_{i=0}^{N} \sum_{j=0}^{M} Fj\{\text{abs}(Cij) - \text{abs}(Xj)\}^P + \sum_{i=0}^{N} \sum_{j=M+1}^{19} Fj\{Cij - Xj\}^P \quad (29)$$

where N is the number of all codes in the transmission-side code book 330031, and Cij is the value of the j-th element in the code index i. In this embodiment, M is a number smaller than 19, for example, 1. P is the norm in the distance calculation, for example, 2. Wj is the j-th element of the auditive psychological weight vector table 3200103. Further, abs( ) means absolute operation. The phase information extraction unit 2900107 outputs a code index i having a minimum Di, and M pieces of phase information Ph(j) j=0 to M. The phase information Ph(j) is defined similarly in formula (27).

As described above, according to the thirteenth embodiment, when selecting an audio code having a minimum distance among the auditive distances between sub-vectors produced by dividing an input vector and audio codes in the transmission-side code book 330031, a portion corresponding to an element of a sub-vector of a high auditive importance is treated in the audio code selection unit 2900102 while neglecting the positive and negative codes indicating their phase information, and subjected to comparative retrieval with respect to the audio codes in the transmission-side code book 330031. Then, phase information corresponding to an element portion of the sub-vector extracted in the phase information extraction unit 2900107 is added to the result obtained, and the result is output as a code index. Therefore, the calculation amount in the audio code selection unit 2900102 and the number of codes required in the code book 330031 are reduced without degrading the sensible sound quality.

Further, since the input vector is smoothed using the smoothing table 3300104 and the smoothing unit 3300105, the quantity of data per frequency, which data are stored in the transmission-side code book 330031 to be referred to when the audio code selection unit 2900102 performs retrieval, is reduced as a whole.

Embodiment 14

Figure 42:
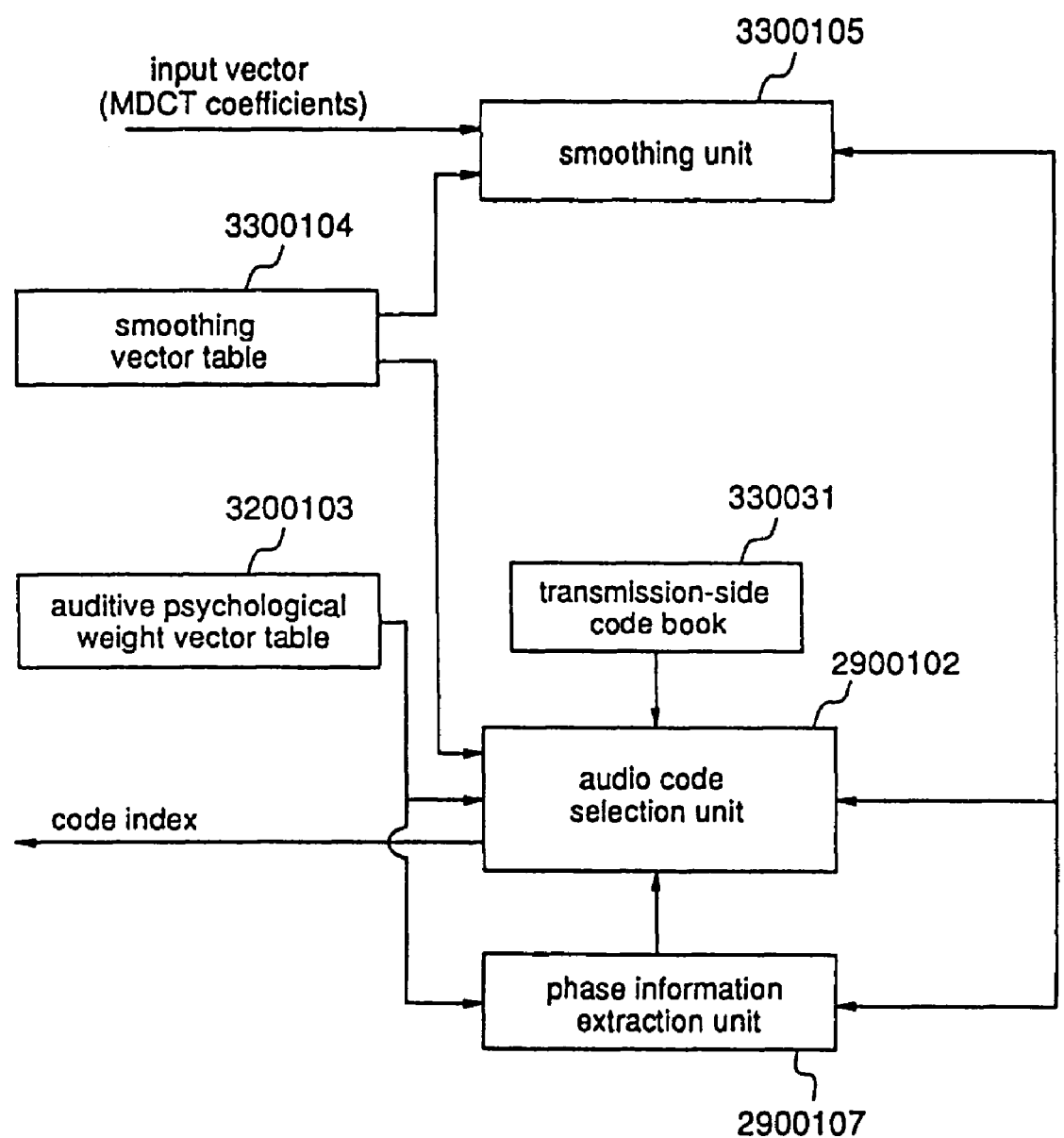
FIG. 42 is a diagram illustrating the detailed structure of an audio signal coding apparatus according to a fourteenth embodiment of the present invention.

Hereinafter, an audio signal coding apparatus according to a fourteenth embodiment of the present invention will be described with reference to the drawings. FIG. 42 is a diagram illustrating the structure of an audio signal coding apparatus according to this fourteenth embodiment. In the figure, this fourteenth embodiment is different from the embodiment 13 shown in FIG. 41 in that, when the audio code selection unit 2900102 performs code selection, in addition to the smoothing vector table 3300104, the auditive psychological weight vector table 3200103 used for the eleventh embodiment is used as well.

Hereinafter, a description is given of the operation. As in the eleventh embodiment, MDCT coefficients or the like are input, as an input vector, to the smoothing unit 3300105, and the output from the smoothing unit 3300105 is input to the audio code selection unit 2900102. In the audio code selection unit 2900102, the distances between the respective codes in the transmission-side code book 330031 and the output from the smoothing unit 3300105 are calculated, on the basis of the information about the smoothing process output from the smoothing vector table 3300104, while adding the weighting by the auditive psychological weight vector in the auditive psychological weight vector table 3200103 and considering the scaling in the smoothing process. Using an expression similar to those of the tenth and eleventh embodiments, the distance Di is expressed as, for example, formula (30).

$$D_i = \sum_{i=0}^{N} \sum_{j=0}^{M} WjFj\{\text{abs}(Cij) - \text{abs}(Xj)\}^P + \sum_{i=0}^{N} \sum_{j=M+1}^{19} WjFj\{Cij - Xj\}^P \quad (30)$$

where N is the number of all codes in the transmission-side code book 330131, and Cij is the value of the j-th element in the code index i. In this embodiment, M is a number smaller than 19, for example, 1. P is the norm in the distance calculation, for example, 2. Wj is the j-th element of the auditive psychological weight vector table 3200103. Further, abs( ) means absolute operation. The phase information extraction unit 2900107 outputs a code index I having a minimum Di, and M pieces of phase information Ph(j) j=0 to M. The phase information Ph(j) is defined similarly in formula (25).

As described above, according to the fourteenth embodiment, when selecting an audio code having a minimum distance among the auditive distances between sub-vectors produced by dividing an input vector and audio codes in the transmission-side code book 330031, a portion corresponding to an element of a sub-vector of a high auditive importance is treated in the audio code selection unit 2900102 while neglecting the positive and negative codes indicating their phase information, and subjected to comparative retrieval with respect to the audio codes in the transmission-side code book 330031. Then, phase information corresponding to an element portion of the sub-vector extracted in the phase information extraction unit 2900107 is added to the result obtained, and the result is output as a code index. Therefore, the calculation amount in the audio code selection unit 2900102 and the number of codes required in the code book 330031 are reduced without degrading the sensible sound quality.

Further, the audio feature vector, which is treated in the audio code selection unit 2900102 while neglecting the positive and negative codes indicating its phase information, is selected after being weighted using the auditive psychological weight vector table 3200103 that stores a table of relative auditive psychological amounts at the respective frequencies in view of the auditive psychological characteristic of human beings. Thereby, as compared with the eleventh embodiment in which a prescribed number of vectors are simply selected from a low band, quantization with more sensible sound quality is realized.

Further, since the input vector is smoothed using the smoothing table 3300104 and the smoothing unit 3300105, the quantity of data per frequency, which data are stored in the transmission-side code book 330031 to be referred to when the audio code selection unit 2900102 performs retrieval, is reduced as a whole.

Embodiment 15

Figure 43:
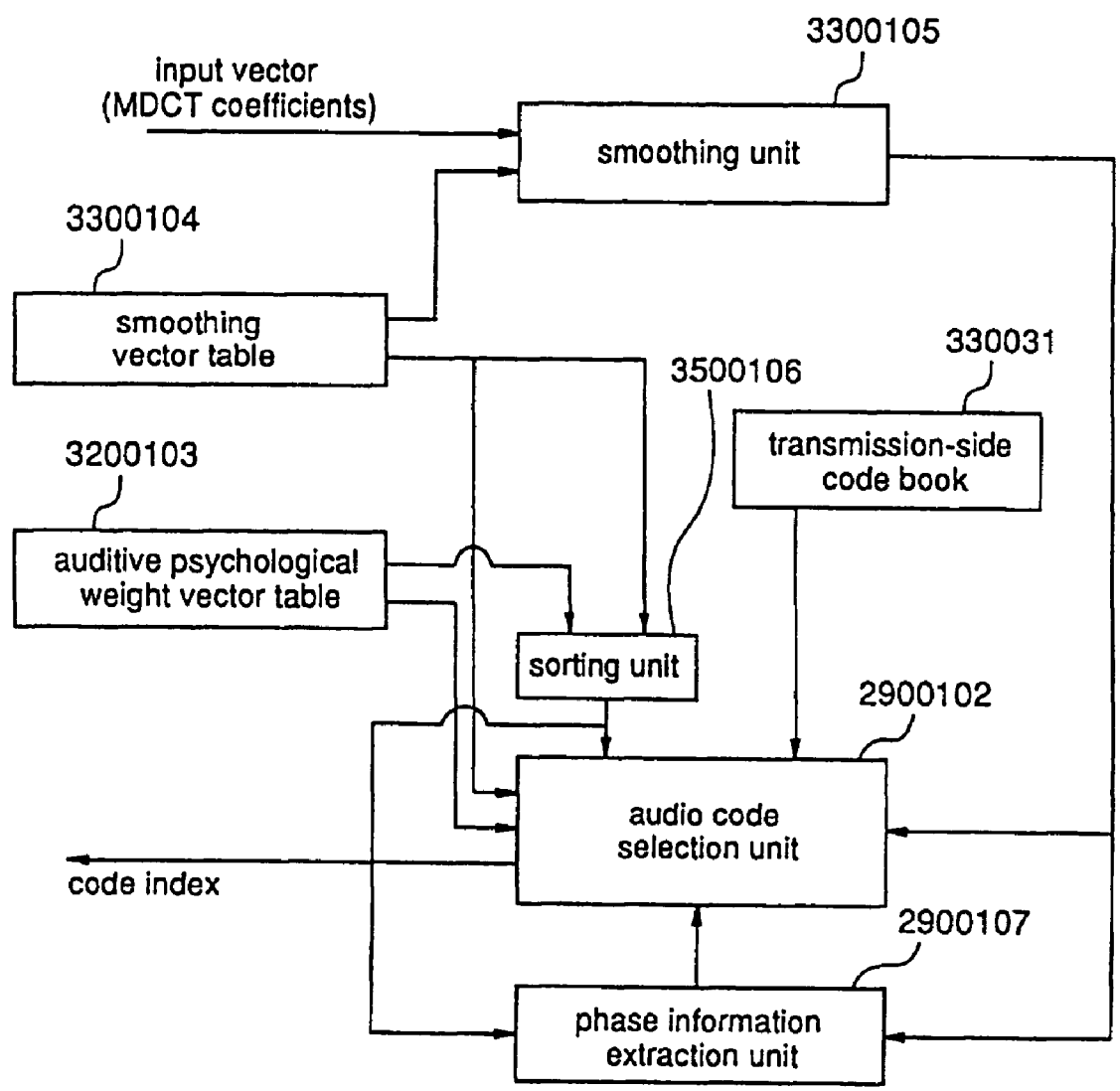
FIG. 43 is a diagram illustrating the detailed structure of an audio signal coding apparatus according to a fifteenth embodiment of the present invention.

Hereinafter, an audio signal coding apparatus according to fifteenth embodiment of the present invention will be described with reference to the drawings. FIG. 43 is a diagram illustrating the structure of an audio signal coding apparatus according to this fifteenth embodiment. In the figure, reference numeral 3500106 denotes a sorting unit which receives the output from the auditive psychological weight vector table 3200103 and the output from the smoothing vector, selects a plurality of largest elements among the calculated vectors, and outputs these elements.

Hereinafter, a description is given of the operation. This fifteenth embodiment is different from the fourteenth embodiment in that the sorting unit 3500106 is added, and in the method of selecting and outputting a code index by the audio code selection unit 2900102.

To be specific, the sorting unit 3500106 receives the outputs from the auditive psychological weight vector table 3200103 and the smoothing vector table 3300104 and, when the j-th element of a vector WF is defined as WFj, it is expressed by formula (31).

$$Wfj = \operatorname{abs}(Wj * Fj) \quad (31)$$

The sorting unit 3500106 calculates R pieces of largest elements from the respective elements WFj of the vector WF, and outputs the numbers of the R pieces of element. The audio code selection unit 2900102 calculates the distance Di, as in the aforementioned embodiments. The distance Di is expressed by, for example, formula (32).

$$D_i = \sum_{i=0}^{N} \sum_{j=0}^{19} FUNCW$$

-continued
$$FUNCW = \begin{cases} Wj * Fj * \{\operatorname{abs}(Cij) - \operatorname{abs}(Xj)\}^P & \text{at } Rj = 1 \\ Wj * Fj * \{Cij - Xj\}^P & \text{at } Rj = 0 \end{cases} \quad (32)$$

where, when Rj is the element number output from the sorting unit 3500106, Rj is equal to 1 and, when Rj is not the output element number, Rj is equal to 0. N is the number of all codes in the transmission-side code book 330031, and Cij is the value of the j-th element in the code index i. In this embodiment, M is a number smaller than 19, for example, 1. P is the norm in the distance calculation, for example, 2. Wj is the j-th element of the auditive psychological weight vector table 3200103. Further, abs( ) means absolute operation. The phase information extraction unit 2900107 outputs a code index I having a minimum Di, and M pieces of phase information Ph(j) j=0 to M. The phase information Ph(j) is defined in formula (33).

$$Ph(j) = \begin{cases} 1 & \text{at } Cji * Xj \geq 0 \\ -1 & \text{at } Cji * Xj < 0 \end{cases} \quad (33)$$

However, Ph(j) is calculated for only those corresponding to the element numbers output from the sorting unit 3500106. In this embodiment, (R+1) pieces are calculated. In the case of employing the structure of this fifteenth embodiment, it is necessary to provide the sorting unit 3500106 when decoding this index.

As described above, according to the fifteenth embodiment, in the fourteenth embodiment described above, the output from the smoothing vector table 3300104 and the output from the auditive psychological weight vector table 3200103 are receives and, from these output results, a plurality of largest elements among the vectors, i.e., elements having large weight absolute values, are selected to be output to the audio code selection unit 2900102. Therefore, a code index can be calculated while considering both of the elements being significant for the auditive characteristic of human beings and the physically important elements, whereby coding of a higher-quality audio signal is realized.

While in this fifteenth embodiment R pieces of elements are selected from elements having large weight absolute values with regard to both of the smoothing vector and the auditive psychological weight vector, this number may be equal to M used for the tenth to thirteenth embodiments.

Embodiment 16

Figure 44:
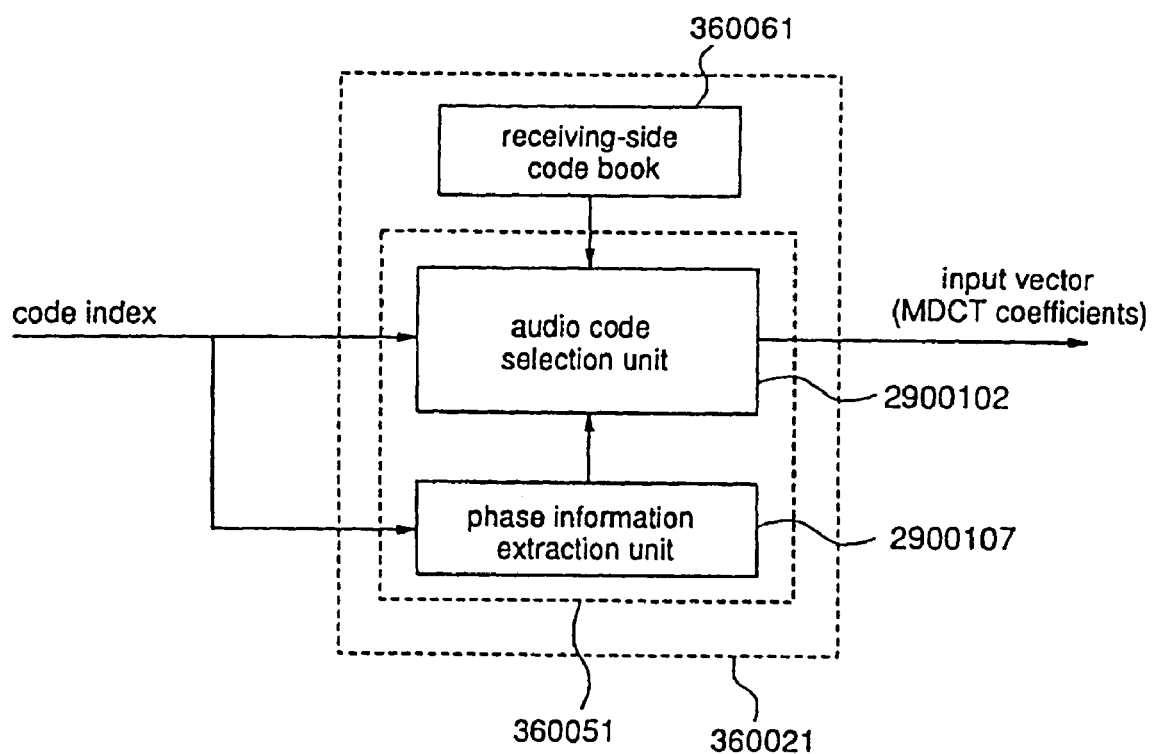
FIG. 44 is a diagram illustrating the structure of an audio signal decoding apparatus according to a sixteenth embodiment of the present invention.

Hereinafter, an audio signal decoding apparatus according to a sixteenth embodiment of the present invention will be described with reference to the drawings. FIG. 44 is a diagram illustrating the structure of an audio signal decoding apparatus according to the fifteenth embodiment. In FIG. 44, reference numeral 360021 denotes a decoding apparatus which comprises a receiving-side code book 360061, and a code decoding unit 360051. The code decoding unit 360051 comprises an audio code selection unit 2900102 and a phase information extraction unit 2900107.

Hereinafter, a description is given of the operation. In this sixteenth embodiment, when decoding a code index received, the coding method according to any of the eleventh to fifteenth embodiments is applied. To be specific, in the audio code selection unit 2900102, for example, elements corresponding to 2 bits from the low-band side, which are auditively important for human beings, are excluded from the 10-bit code index received, and the remaining elements corresponding to 8 bits are subjected to comparative retrieval with the codes stored in the receiving-side code book 360061. With respect to the excluded 2-bit elements, the phase information thereof is extracted using the phase information extraction unit 2900107, and added to the retrieval result, whereby an audio feature vector is reproduced, i.e., inversely quantized.

Thereby, the receiving-side code book stores only 256 pieces of codes corresponding to the 8-bit elements, whereby the data quantity stored in the receiving-side code book 360061 can be reduced. In addition, the operation in the audio code selection unit 2900102 is 256 times of code retrieval, and addition of 2 codes to each retrieval result, whereby the operation amount is significantly reduced.

While in this sixteenth embodiment the structure according to the eleventh embodiment is applied to the receiving-side structure, any of the structures according to the sixth to ninth embodiments can be applied. Further, when it is used, not independently on the receiving side, but combined with any of the eleventh to fifteenth embodiments, it is possible to construct an audio data transmitting/receiving system that can smoothly perform compression and expansion of an audio signal.

As described above, according to the audio signal coding apparatus, and decoding apparatus, or coding and decoding method of the present invention, provided for quantization is a structure capable of performing quantization even at a high data compression ratio by using, for example, a vector quantization method, and employed for allocation of data quantity during quantization is to allocate, alternately, data quantity contributing to expansion of a reproduced band and data quantity contributing to improvement of quality. First of all, in the coding apparatus, as the first stage, an input audio signal is transformed to a signal in the frequency domain, and a portion of the frequency signal is coded; in the second stage, a portion of the frequency signal uncoded and a quantization error signal in the first stage are coded and added to the codes obtained in the first stage; in the third stage, the other portion of the frequency signal uncoded, and quantization error signals in the first and second stages are coded and added to the codes obtained in the first and second stages; followed by similar coding in forward stages. On the other hand, in the decoding apparatus, any of the following decoding manners is possible: decoding using only the codes coded in the first stage, decoding using the codes decoded in the first and second stages, and decoding using the codes decoded in stages from the first stage to the third or more stage. The decoding order is to decode, alternately, codes contributing to band expansion and codes contributing to quality improvement. Therefore, satisfactory sound quality is obtained even though coding and decoding are carried out without a fixed data quantity. Further, a high-quality sound is obtained at a high compression ratio.

Furthermore, according to the audio signal coding apparatus, and decoding apparatus, or coding and decoding method of the present invention, a normalization means is provided before the quantization means, and normalization of an input audio signal is carried out before quantization. Therefore, the normalization means and the quantization means perform coding while exhibiting their full abilities, whereby highly efficient quantization is carried out without losing the data quantity possessed by the original audio signal and, therefore, with less quantization error, and the effect is dramatically heightened according to the kind of the audio signal. Furthermore, as described above, allocation of data quantity during quantization is carried out so as to allocate, alternately, data quantity contributing to expansion of a reproduced band and data quantity contributing to improvement of quality. When the data quantity at the receiving end is limited, inverse quantization is carried out only in a narrow band and a shallow region. However, by expanding the inverse quantization alternately in the direction to broaden the band and the direction to increase the depth of the inverse quantization to increase the data quantity at the receiving end, a desired quantity of data of the coded audio signal can be decoded regardless of the quantity of data transmitted from the coding apparatus. Accordingly, by varying the quantity of data to be decoded according to the communication environment or the like on the receiving end, high-definition sound quality can be obtained stably even when an ordinary public telephone network is used.

Furthermore, according to the audio signal coding apparatus, and decoding apparatus, or coding and decoding method of the present invention, a normalization means is provided before each of quantization means performing multiple-stage quantization, and normalization is performed for each of divided frequencies and for each stage of quantization, followed by quantization. Therefore, normalization for each frequency domain enables appropriate coding according to the quantity of data possessed by the audio signal in each frequency domain, that is, the normalization means and the quantization means perform coding while exhibiting their full abilities, whereby quantization of high efficiency is performed without losing the data quantity possessed by the original audio signal and, therefore, with less quantization error, with the result that high-definition sound quality is obtained stably, and the effect is dramatically heightened according to the kind of the audio signal. Further, at the decoding end, when inverse normalization and inverse quantization are carried out in both of the direction to broaden the quantization band and the direction to increase the quantization depth, alternately, a desired quantity of data of the coded audio signal can be decoded regardless of the quantity of data transmitted from the coding apparatus. Accordingly, by varying the quantity of data to be decoded according to the communication environment or the like on the receiving end, high-definition sound quality can be obtained stably even when an ordinary public telephone network is used.

APPLICABILITY IN INDUSTRY

As described above, according to audio signal coding apparatus, and decoding apparatus, or coding and decoding method of the present invention, even though coding and decoding are carried out without a fixed data quantity, satisfactory sound quality is obtained and, further, a high-quality sound is obtained at a high compression ratio.

Furthermore, normalization for each frequency band enables appropriate coding according to the data quantity possessed by the audio signal in each frequency band, whereby normalization means and quantization means perform coding while exhibiting their full abilities, and highly efficient quantization is carried out without losing the data quantity possessed by the original audio signal and, therefore, with less quantization error. This effect is dramatically heightened according to the kind of the audio signal. Accordingly, by varying the quantity of data to be decoded according to the communication environment or the like on the receiving end, high-definition sound quality can be obtained stably even when an ordinary public telephone network is used.

The invention claimed is:

1. An audio signal coding apparatus which receives an audio signal which is subjected to time-frequency transform to output index information, comprising:
   a plurality of stages of sub-quantization units, at least the i-th stage sub-quantization unit including a plurality of band division quantizers each of which being operable to perform coding using vector quantization for a respective part of a divided frequency band;
   each of the (i+1)th and subsequent stage sub-quantization units being operable to perform coding using vector quantization on a quantization error of the band division quantizer that has performed decoding on a part of the band at the previous stage; and
   a quantization band selection unit operable to select the parts of the divided frequency band for quantization by the band division quantizers in the (i+1)th and subsequent stage sub-quantization units, on the basis of the magnitude of the quantization errors from a previous stage sub-quantization unit;
   wherein:
   the index information includes a stage-specific index indicating a vector coded by the sub-quantization unit of each stage; and
   the stage-specific index includes a band-specific index for each part of the divided frequency band at the stage in which codings with dividing the frequency band are performed by the plurality of band division quantizers.

2. An audio signal decoding apparatus for decoding index information into an audio signal, comprising
   a plurality of stages of sub inverse quantization units, at least the i-th stage sub inverse quantization unit including a plurality of band division inverse quantizers each of which being operable to perform decoding using vector inverse quantization for a respective part of a divided frequency band;
   each of the (i+1)th and subsequent stage sub inverse quantization units being operable to perform decoding using vector inverse quantization on a quantization error of the band division inverse quantizer that has performed decoding on a part of the band at the previous stage;
   wherein:
   the index information includes a stage-specific index indicating a vector for each stage;
   the stage-specific index includes a band-specific index for each part of the divided frequency band at the stage in which decoding with dividing the frequency band is performed; and
   after decoding by a first band division inverse quantizer in the i-th stage sub inverse quantization unit is performed, and before decoding by a second band division inverse quantizer in the i-th stage sub inverse quantization unit is performed, decoding by the (i+1)th stage sub inverse quantization unit is performed.

3. An audio signal decoding method for decoding index information into an audio signal, comprising:
   a plurality of stages of sub inverse quantization steps, at least the i-th stage sub inverse quantization step including a plurality of band division inverse quantization steps to perform decoding using vector inverse quantization for a respective part of a divided frequency band;
   in the (i+1)th and subsequent stage sub inverse quantization steps, decoding using vector inverse quantization is performed on a quantization error generated in the band division inverse quantization step that has performed decoding on a part of the band at the previous stage;
   wherein:
   the index information includes a stage-snecific index indicating a vector at each stage;
   the stage-specific index includes a band-specific index for each nart of the divided frequency band at the stage in which decoding with dividing the frequency band is performed; and
   after decoding by a first band division inverse quantization step in the i-th stage sub inverse quantization step is performed, and before decoding by a second band division inverse quantization step in the i-th stage sub inverse quantization step is performed, decoding by the (i+1)th stage sub inverse quantization step is performed.

* * * * *